(12) United States Patent
Paiz

(10) Patent No.: US 12,737,353 B1
(45) Date of Patent: Sep. 15, 2026

(54) SITE RANK CODEX SEARCH PATTERNS

(71) Applicant: Richard Paiz, N. Miami Beach, FL (US)

(72) Inventor: Richard Paiz, N. Miami Beach, FL (US)

( * ) Notice: Subject to any disclaimer, the term of this patent is extended or adjusted under 35 U.S.C. 154(b) by 0 days.

(21) Appl. No.: 18/361,862

(22) Filed: Jul. 30, 2023

Related U.S. Application Data

(60) Division of application No. 17/752,412, filed on May 24, 2022, now Pat. No. 11,741,090, which is a division of application No. 16/802,526, filed on Feb. 26, 2020, now Pat. No. 11,379,473, which is a continuation-in-part of application No. 16/129,784, filed on Sep. 12, 2018, now Pat. No. 10,936,687, which is a continuation-in-part of application No. 15/944,770, filed on Apr. 3, 2018, now abandoned, which is a division of application No. 15/889,150, filed on Feb. 5, 2018, now Pat. No. 11,048,765, which is a division of application No. 15/829,963, filed on Dec. 3, 2017, now abandoned, which is a division of application No. 15/829,916, filed on Dec. 2, 2017, now abandoned, which is a division of application (Continued)

(51) Int. Cl.

| | |
|---|---|
| ***G06F 7/00*** | (2006.01) |
| ***G06F 16/242*** | (2019.01) |
| ***G06F 16/951*** | (2019.01) |
| ***H04L 67/52*** | (2022.01) |
| *H04L 67/02* | (2022.01) |

(52) U.S. Cl.
CPC .......... *G06F 16/243* (2019.01); *G06F 16/951* (2019.01); *H04L 67/52* (2022.05); *H04L 67/02* (2013.01)

(58) Field of Classification Search
CPC ..... G06F 16/243; G06F 16/951; H04L 67/52; H04L 67/02
See application file for complete search history.

(56) References Cited

U.S. PATENT DOCUMENTS

| | | | |
|---|---|---|---|
| 4,974,191 A | 11/1990 | Amirghodsi et al. |
| 5,025,369 A | 6/1991 | Schwartz |

(Continued)

FOREIGN PATENT DOCUMENTS

| | | |
|---|---|---|
| EP | 0448800 A1 | 7/2021 |

OTHER PUBLICATIONS

Robertson, et al. “Cone Trees: Animated Visualization of Hierarchical Information”, issr.

(Continued)

*Primary Examiner* — Mohammed R Uddin
(74) *Attorney, Agent, or Firm* — Frank L. Kubler; Oltmann, Flynn & Kubler

(57) ABSTRACT

A Codex system of computers linked into a neural network continuously scans and gathers information from, understands, and interacts with, an environment, an optimizer software executing software instructions based on rules of grammar and semantics searches a encyclopedia of human knowledge to transform input into a search pattern. Then the Codex monetizes and commercializes each transformed input and corresponding optimal output. An artificial intelligence interaction software, hereinafter referred to as virtual maestro, uses the search pattern and optimal output to interact and engage scripted communication with the end user.

20 Claims, 15 Drawing Sheets

Related U.S. Application Data

No. 15/708,122, filed on Sep. 18, 2017, now abandoned, which is a division of application No. 15/644,713, filed on Jul. 7, 2017, now abandoned, which is a division of application No. 15/494,497, filed on Apr. 22, 2017, which is a division of application No. 15/486,276, filed on Apr. 12, 2017, now Pat. No. 10,922,363, which is a continuation-in-part of application No. 15/390,713, filed on Dec. 26, 2016, now Pat. No. 10,915,523, which is a continuation-in-part of application No. 15/352,555, filed on Nov. 15, 2016, now abandoned, which is a division of application No. 15/264,996, filed on Sep. 14, 2016, which is a division of application No. 15/246,446, filed on Aug. 24, 2016, now Pat. No. 10,959,090, which is a division of application No. 15/175,861, filed on Jun. 7, 2016, now Pat. No. 11,281,664, which is a division of application No. 14/682,052, filed on Apr. 8, 2015, now abandoned, which is a division of application No. 14/623,559, filed on Feb. 17, 2015, which is a division of application No. 14/582,236, filed on Dec. 24, 2014, now Pat. No. 11,468,128.

(56) References Cited

U.S. PATENT DOCUMENTS 5,063,506 A 11/1991 Brockwell et al.
5,278,980 A 1/1994 Pedersen et al.
5,394,509 A 2/1995 Winston
5,488,725 A 1/1996 Turtle et al.
5,504,889 A 4/1996 Burgess
5,585,839 A 12/1996 Ishida et al.
5,659,766 A 8/1997 Saund et al.
5,671,363 A 9/1997 Cristofich et al.
5,677,835 A 10/1997 Carbonell et al.
5,706,497 A 1/1998 Takahashi et al.
5,762,552 A 6/1998 Vuong et al.
5,790,935 A 8/1998 Payton
5,794,210 A 8/1998 Goldhaber et al.
5,809,282 A 9/1998 Cooper
5,812,549 A 9/1998 Sethu
5,819,258 A 10/1998 Vaithyanathan
5,832,069 A 11/1998 Waters
5,852,734 A 12/1998 Komatsu et al.
5,873,076 A 2/1999 Barr et al.
5,873,099 A 2/1999 Hogan et al.
5,878,113 A 3/1999 Bhusri
5,878,127 A 3/1999 Fleischer, III
5,881,269 A 3/1999 Dobbelstein
5,892,913 A 4/1999 Adiga et al.
5,910,981 A 6/1999 Bhagat et al.
5,917,899 A 6/1999 Moss et al.
5,918,010 A 6/1999 Appleman et al.
5,920,856 A * 7/1999 Syeda-Mahmood ... G06F 16/40
5,931,901 A 8/1999 Wolfe et al.
5,978,780 A 11/1999 Watson
5,983,214 A 11/1999 Lang et al.
5,987,446 A * 11/1999 Corey ................ G06F 16/9538 707/999.005
5,995,920 A 11/1999 Carbonell et al.
6,006,225 A 12/1999 Bowman et al.
6,009,310 A 12/1999 Motohashi
6,028,924 A 2/2000 Ram et al.
6,064,951 A 5/2000 Park et al.
6,069,310 A 5/2000 James
6,078,657 A 6/2000 Alfieri et al.
6,088,733 A 7/2000 Kikuchi
6,108,640 A * 8/2000 Slotznick ............ G06Q 20/102 705/40
6,128,378 A 10/2000 Diener et al.
6,182,085 B1 * 1/2001 Eichstaedt ........... G06F 16/951 707/999.102
6,219,652 B1 4/2001 Carter et al.
6,233,545 B1 5/2001 Datig
6,243,480 B1 6/2001 Zhao et al.
6,256,627 B1 7/2001 Beattie et al.
6,264,560 B1 7/2001 Goldberg et al.
6,279,038 B1 8/2001 Hogan et al.
6,282,653 B1 8/2001 Berstis et al.
6,285,999 B1 9/2001 Page
6,330,672 B1 12/2001 Shur
6,345,182 B1 2/2002 Fabritius et al.
6,356,899 B1 3/2002 Chakrabarti et al.
6,363,253 B1 3/2002 Valentine et al.
6,366,956 B1 4/2002 Krishnan
6,377,993 B1 4/2002 Brandt et al.
6,381,594 B1 4/2002 Eichstaedt et al.
6,385,602 B1 5/2002 Tso et al.
6,385,619 B1 5/2002 Eichstaedt et al.
6,408,282 B1 6/2002 Buist
6,415,319 B1 7/2002 Ambroziak
6,418,433 B1 7/2002 Chakrabarti et al.
6,421,675 B1 7/2002 Ryan et al.
6,427,132 B1 7/2002 Bowman-Amuah
6,442,169 B1 8/2002 Lewis
6,445,785 B1 9/2002 Chan et al.
6,453,315 B1 9/2002 Weissman et al.
6,463,275 B1 10/2002 Deakin
6,490,345 B2 12/2002 Fleischer, III et al.
6,507,841 B2 1/2003 Riverieulx de Varax
6,508,709 B1 1/2003 Karmarkar
6,510,419 B1 1/2003 Gatto
6,516,337 B1 2/2003 Tripp et al.
6,519,616 B1 2/2003 Zamora-McKelvy et al.
6,526,440 B1 2/2003 Bharat
6,529,592 B1 3/2003 Khan
6,529,878 B2 3/2003 De Rafael et al.
6,546,388 B1 4/2003 Edlund et al.
6,601,044 B1 7/2003 Wallman
6,606,659 B1 * 8/2003 Hegli ................... H04L 63/102 726/28
6,614,781 B1 9/2003 Elliott et al.
6,629,890 B2 10/2003 Johnson
6,661,884 B2 12/2003 Shaffer et al.
6,714,979 B1 3/2004 Brandt et al.
6,754,873 B1 6/2004 Law et al.
6,782,430 B1 8/2004 Cragun
6,839,680 B1 1/2005 Liu et al.
6,915,268 B2 7/2005 Riggs et al.
6,947,540 B2 9/2005 Madoch et al.
6,963,867 B2 * 11/2005 Ford ..................... G06Q 30/02 707/769
7,006,988 B2 2/2006 Lin et al.
7,058,628 B1 6/2006 Page
7,059,515 B2 6/2006 White
7,103,536 B1 9/2006 Kanno
7,149,732 B2 12/2006 Wen et al.
7,194,483 B1 3/2007 Mohan et al.
7,216,123 B2 5/2007 Kamvar et al.
7,225,182 B2 5/2007 Paine et al.
7,225,249 B1 5/2007 Barry et al.
7,257,766 B1 * 8/2007 Koppel ................ G06F 16/951 715/205
7,269,643 B2 * 9/2007 Spaid .................... G06F 16/958 709/227
7,353,246 B1 * 4/2008 Rosen ................ G06F 16/9558 709/217
7,451,388 B1 * 11/2008 Henzinger ............ G06F 16/951 715/208
7,499,914 B2 3/2009 Diab et al.
7,505,964 B2 3/2009 Tong et al.
7,552,395 B2 6/2009 Neale et al.
7,590,620 B1 9/2009 Pike et al.
7,660,815 B1 * 2/2010 Scofield ............. G06F 16/9538 707/999.102
7,725,465 B2 5/2010 Liao et al.
7,739,281 B2 6/2010 Najork
7,756,850 B2 7/2010 Keith, Jr.
7,756,919 B1 7/2010 Dean et al.
7,800,526 B2 9/2010 Nitta et al.
7,805,382 B2 9/2010 Rosen et al.

(56) References Cited

U.S. PATENT DOCUMENTS 7,822,705 B2 * 10/2010 Xia ........................ G06F 16/22 707/791
7,836,039 B2 * 11/2010 Clark .................... G06F 16/951 707/706
7,890,526 B1 2/2011 Brewer et al.
7,895,235 B2 2/2011 Baeza-Yates et al.
7,908,263 B1 3/2011 Paiz
8,015,172 B1 * 9/2011 Cave .................. G06F 16/9537 707/723
8,224,836 B1 7/2012 Piratla
8,291,080 B2 * 10/2012 Miyakawa ............. G06Q 30/02 709/225
8,301,639 B1 10/2012 Myllymaki et al.
8,311,973 B1 11/2012 Zadeh
8,386,456 B1 2/2013 Paiz
8,392,435 B1 3/2013 Yamauchi
8,452,765 B2 5/2013 Hoffman et al.
8,504,437 B1 * 8/2013 Agarwal ............. G06F 16/9535 705/14.54
8,527,269 B1 9/2013 Kapur et al.
8,548,995 B1 10/2013 Curtiss
8,560,562 B2 10/2013 Kanefsky
8,583,675 B1 11/2013 Haahr et al.
8,615,442 B1 12/2013 Kapur et al.
8,620,951 B1 12/2013 He et al.
8,630,975 B1 1/2014 Guo et al.
8,645,393 B1 2/2014 Kolak et al.
8,661,029 B1 2/2014 Kim et al.
8,676,667 B1 * 3/2014 Paiz ...................... G06F 16/951 707/706
8,682,892 B1 3/2014 Panda et al.
8,700,653 B2 4/2014 Hansson et al.
8,719,276 B1 5/2014 Haahr et al.
8,874,600 B2 10/2014 Gupta et al.
8,903,800 B2 12/2014 Kakade et al.
8,903,810 B2 12/2014 Ismalon
8,924,379 B1 12/2014 Kim et al.
8,990,200 B1 3/2015 Christensen et al.
9,009,146 B1 4/2015 Lopatenko et al.
9,031,929 B1 5/2015 Lehman et al.
9,053,156 B1 6/2015 He et al.
9,118,655 B1 8/2015 Paczkowski et al.
9,135,307 B1 9/2015 Panda et al.
9,183,499 B1 11/2015 Krivokon et al.
9,191,522 B1 11/2015 Krieger et al.
9,195,944 B1 11/2015 Ofitserov
9,218,392 B1 12/2015 Zgraggen et al.
9,256,682 B1 2/2016 Li et al.
9,323,808 B1 4/2016 Kanefsky
9,355,352 B1 5/2016 Paiz
9,390,174 B2 7/2016 Zhou et al.
9,449,271 B2 9/2016 Wang et al.
9,514,404 B1 12/2016 Corrado et al.
9,514,405 B2 12/2016 Chen et al.
9,563,692 B1 2/2017 Haahr et al.
9,590,915 B2 3/2017 Cai et al.
9,612,883 B2 4/2017 Dean et al.
10,025,858 B2 7/2018 Blass et al.
10,289,739 B1 5/2019 Docherty et al.
10,430,410 B2 10/2019 Briggs et al.
11,017,426 B1 * 5/2021 Garg .................. G06Q 30/0244
11,423,018 B1 * 8/2022 Paiz ...................... G06F 16/243
2001/0028301 A1 10/2001 Geiger et al.
2001/0049677 A1 12/2001 Talib et al.
2002/0042793 A1 4/2002 Choi
2002/0046209 A1 4/2002 De Bellis
2002/0049622 A1 4/2002 Lettich et al.
2002/0073079 A1 6/2002 Terheggen
2002/0137217 A1 9/2002 Rowe
2002/0143940 A1 * 10/2002 Chi ..................... G06F 16/9538 709/225
2002/0173971 A1 11/2002 Stirpe et al.
2003/0005038 A1 * 1/2003 Codella ............... G06F 16/9574 709/217
2003/0018547 A1 1/2003 Steele
2003/0036898 A1 2/2003 Duan et al.
2003/0050719 A1 * 3/2003 Bao-Liang ........ G06F 18/24317 700/91
2003/0050819 A1 3/2003 Koenigbauer et al.
2003/0163454 A1 8/2003 Jacobsen et al.
2003/0217056 A1 * 11/2003 Allen .................. G06F 16/9535
2003/0226100 A1 12/2003 Farahat et al.
2004/0024739 A1 2/2004 Copperman et al.
2004/0093325 A1 5/2004 Banerjee et al.
2004/0122656 A1 * 6/2004 Abir ....................... G06N 5/022 704/4
2004/0133671 A1 * 7/2004 Taniguchi ............... H04L 67/51 709/224
2004/0181407 A1 9/2004 Trinkel et al.
2004/0230564 A1 11/2004 Simon et al.
2004/0260688 A1 12/2004 Gross
2005/0004889 A1 * 1/2005 Bailey .................... G06Q 40/04
2005/0102259 A1 5/2005 Kapur
2005/0114324 A1 5/2005 Mayer
2005/0132305 A1 * 6/2005 Guichard ............. G06F 16/954 707/E17.119
2005/0144162 A1 * 6/2005 Liang .................... G06F 16/355
2005/0165753 A1 7/2005 Chen et al.
2005/0171946 A1 * 8/2005 Maim ................. G06F 16/9558 707/999.005
2005/0229094 A1 * 10/2005 Friedl ................ G06Q 30/0201 715/255
2006/0026147 A1 2/2006 Cone et al.
2006/0041562 A1 * 2/2006 Paczkowski ........ G06F 16/9562
2006/0047649 A1 * 3/2006 Liang .................... G06F 16/338
2006/0064411 A1 3/2006 Gross et al.
2006/0174120 A1 8/2006 Rippy et al.
2006/0235745 A1 10/2006 Yano
2006/0242098 A1 10/2006 Wnek
2006/0248073 A1 11/2006 Jones et al.
2006/0253345 A1 * 11/2006 Heber ............. G06Q 10/06395 705/26.1
2006/0294124 A1 * 12/2006 Cho ...................... G06F 16/951
2007/0005530 A1 1/2007 Baartman et al.
2007/0033275 A1 * 2/2007 Toivonen ............ G06F 16/9562 709/224
2007/0050393 A1 3/2007 Vogel et al.
2007/0061242 A1 3/2007 Ramer et al.
2007/0067297 A1 * 3/2007 Kublickis ............. G06Q 30/02 707/999.009
2007/0078828 A1 4/2007 Parikh et al.
2007/0088683 A1 4/2007 Feroglia et al.
2007/0094251 A1 4/2007 Lu et al.
2007/0255702 A1 * 11/2007 Orme .................... G06F 16/951 707/999.005
2008/0027936 A1 * 1/2008 Liu ....................... G06F 16/951
2008/0059486 A1 3/2008 Pappas
2008/0065596 A1 * 3/2008 Shadmon ............. G06F 16/835
2008/0077880 A1 3/2008 Oygard
2008/0097993 A1 4/2008 Nanba
2008/0126538 A1 * 5/2008 Uyama ................... H04L 43/00 709/224
2008/0159622 A1 7/2008 Agnihotri et al.
2008/0168013 A1 7/2008 Cadaret
2008/0168033 A1 7/2008 Ott et al.
2008/0195477 A1 8/2008 Kennedy et al.
2008/0228675 A1 * 9/2008 Duffy .................... G06F 40/295 707/999.005
2008/0228695 A1 9/2008 Sifry et al.
2008/0231443 A1 9/2008 Kotter et al.
2008/0270377 A1 * 10/2008 Liu ....................... G06F 16/951 707/999.005
2009/0030800 A1 1/2009 Grois
2009/0048941 A1 * 2/2009 Strassmann ........ G06Q 30/0625 705/26.62
2009/0100125 A1 4/2009 McDowell
2009/0106081 A1 * 4/2009 Burgess ............ G06Q 30/0277 705/14.73
2009/0106100 A1 4/2009 Mashinsky
2009/0106224 A1 4/2009 Roulland et al.
2009/0119248 A1 5/2009 Sundaresan et al.
2009/0132233 A1 5/2009 Etzioni et al.

(56) References Cited

U.S. PATENT DOCUMENTS

2009/0132524 A1* 5/2009 Stouffer .............. G06F 16/9535 707/999.005
2009/0150156 A1 6/2009 Kennewick et al.
2009/0240683 A1 9/2009 Lazier et al.
2009/0248510 A1 10/2009 Ahluwalia
2009/0282022 A1 11/2009 Bennett
2009/0287657 A1* 11/2009 Bennett .............. G06F 16/9535 715/810
2009/0287671 A1* 11/2009 Bennett .............. G06F 16/9574
2009/0313635 A1 12/2009 Dasdan
2010/0017267 A1 1/2010 Negron
2010/0058204 A1* 3/2010 Wilson .............. G06F 16/9535 715/760
2010/0070448 A1* 3/2010 Omoigui .............. H01L 27/1463 706/55
2010/0094878 A1* 4/2010 Soroca .............. G06Q 30/0267 707/812
2010/0114862 A1* 5/2010 Young .............. G06F 16/951 707/711
2010/0122065 A1 5/2010 Dean et al.
2010/0138426 A1* 6/2010 Nakayama .............. G06F 16/334 707/E17.084
2010/0145947 A1 6/2010 Kolman et al.
2010/0153008 A1* 6/2010 Schwartz .............. G01C 21/20 705/14.27
2010/0185689 A1* 7/2010 Hu .............. G06F 40/30 707/E17.108
2010/0241664 A1* 9/2010 LeVasseur .............. H04M 7/0036 707/E17.014
2010/0333194 A1 12/2010 Ricordi et al.
2011/0055185 A1* 3/2011 Bitan .............. G06F 16/9538 707/706
2011/0093852 A1 4/2011 Li et al.
2011/0112897 A1 5/2011 Tietzen et al.
2011/0125724 A1 5/2011 Mo
2011/0125743 A1 5/2011 Immonen
2011/0137881 A1 6/2011 Cheng et al.
2011/0145088 A1 6/2011 Bonner et al.
2011/0202526 A1 8/2011 Lee et al.
2011/0208947 A1 8/2011 Lin et al.
2011/0213761 A1* 9/2011 Song .............. G06F 16/9535 707/723
2011/0219295 A1 9/2011 Adams et al.
2011/0238500 A1 9/2011 Kim
2011/0258258 A1 10/2011 Briere et al.
2011/0276789 A1 11/2011 Chambers et al.
2011/0307819 A1 12/2011 Vadlamani et al.
2011/0313995 A1 12/2011 Lederman et al.
2012/0047134 A1 2/2012 Hansson et al.
2012/0075168 A1 3/2012 Osterhout et al.
2012/0158633 A1 6/2012 Eder
2012/0203754 A1* 8/2012 Biran .............. G06F 16/90344 707/706
2012/0278302 A1 11/2012 Choudhury et al.
2012/0284305 A1 11/2012 Kawai
2012/0323908 A1 12/2012 Herbert, Jr. et al.
2012/0330919 A1 12/2012 Chen et al.
2013/0110804 A1 5/2013 Davis et al.
2013/0110823 A1 5/2013 Su et al.
2013/0159286 A1* 6/2013 Manzano Macho .............. G06F 16/24552 707/718
2013/0179466 A1 7/2013 Mizobuchi et al.
2013/0246328 A1* 9/2013 Sweeney .............. G06N 5/02 706/50
2013/0275164 A1* 10/2013 Gruber .............. G06F 16/2457 705/5
2013/0304623 A1 11/2013 Kumar et al.
2013/0305333 A1 11/2013 Katzer et al.
2014/0012563 A1 1/2014 Caskey et al.
2014/0032306 A1 1/2014 Sukornyk et al.
2014/0059028 A1 2/2014 Chen et al.
2014/0101126 A1 4/2014 Kasterstein et al.
2014/0201126 A1 7/2014 Zadeh et al.
2014/0214790 A1* 7/2014 Vaish .............. G06F 16/9535 707/709
2014/0279774 A1 9/2014 Wang et al.
2014/0280011 A1 9/2014 Zhou et al.
2014/0280017 A1 9/2014 Indarapu et al.
2014/0280307 A1 9/2014 Gupta et al.
2014/0365452 A1 12/2014 Ma et al.
2014/0372425 A1 12/2014 Ayoub et al.
2015/0012467 A1* 1/2015 Greystoke .............. G06Q 30/0619 706/12
2015/0019537 A1 1/2015 Neels et al.
2015/0032740 A1 1/2015 Rao et al.
2015/0120466 A1 4/2015 Redlich
2015/0178302 A1 6/2015 Plakhov et al.
2015/0186497 A1 7/2015 Patton et al.
2015/0269231 A1 9/2015 Huynh et al.
2015/0278355 A1 10/2015 Hassanpour et al.
2015/0331866 A1 11/2015 Shen et al.
2015/0331877 A1 11/2015 Lou et al.
2016/0034462 A1 2/2016 Brewer
2016/0034463 A1 2/2016 Brewer
2016/0041986 A1 2/2016 Nguyen
2016/0063071 A1 3/2016 Guy et al.
2016/0070807 A1 3/2016 Epstein
2016/0078860 A1 3/2016 Paulik et al.
2016/0299899 A1 10/2016 Logachev
2017/0083508 A1 3/2017 Dixon et al.
2017/0357721 A1 12/2017 Chernenkov et al.
2018/0011927 A1 1/2018 Lee et al.
2018/0101399 A1 4/2018 Jain et al.
2018/0165375 A1 6/2018 Silkey et al.
2018/0181662 A1 6/2018 Mashiach et al.
2018/0182170 A1 6/2018 Lim et al.
2018/0227273 A1 8/2018 Shumsker et al.
2018/0232451 A1 8/2018 Lev-Tov et al.
2018/0267958 A1 9/2018 Danielyan et al.
2018/0293327 A1 10/2018 Miller et al.
2019/0347358 A1 11/2019 Mishra et al.
2021/0209118 A1* 7/2021 Reuther .............. G06F 16/242

OTHER PUBLICATIONS

"Hearst, et al. ""Cat-a-Cone: An Interactive Interface for Specifying Searches andViewing Retrieval Results using a Large Category Hierarchy"", 1997.".

Zamir, et at. "Grouper: A Dynamic Clustering Interface to Web Search Results", 1999.

Dumais, et at. "Hierarchical Classification of Web Content", 2000.

Wen, et al. "Clustering User Queries of a Search Engine", 2001.

"Yue, et al., ""A Video Summarization Tool Using Two-Level RedundancyDetection for Personal Video recorders"", 2010".

"Unknown, American Banker, ""Chemical Buys Trading Software fromReuters"", ( v 154, n 145, p. 14, Dialog file 9, Accession No. 00500233), 1994".

Croneliusson, Roy, SAP-R3, Jan. 1999. Downloaded from https. Ilqupea. ub.gu .se/dspace/bitstream/2077 /i 359/1 /hattab, IA7 400. pdf downloaded on Mar. 26, 2008 47 pages.

"SAP-CAPS, 1999. Downloaded from http://web.archive.org/web/19991105101002/www.caps.com/products/sap/sapr3.htm,3 Pages".

"RoutePro, 1999, Downloaded from http://web.archive.org/web/20010627035933/www.caps.com/products/rprodsgrfrpdsgrfeal2 pages.".

"Paiz, Richard, Designing Hot Billinq Systems for Large Volume and/or Complex NetvDoctoral Dissertation, California Coast University, Nov. i999".

* cited by examiner

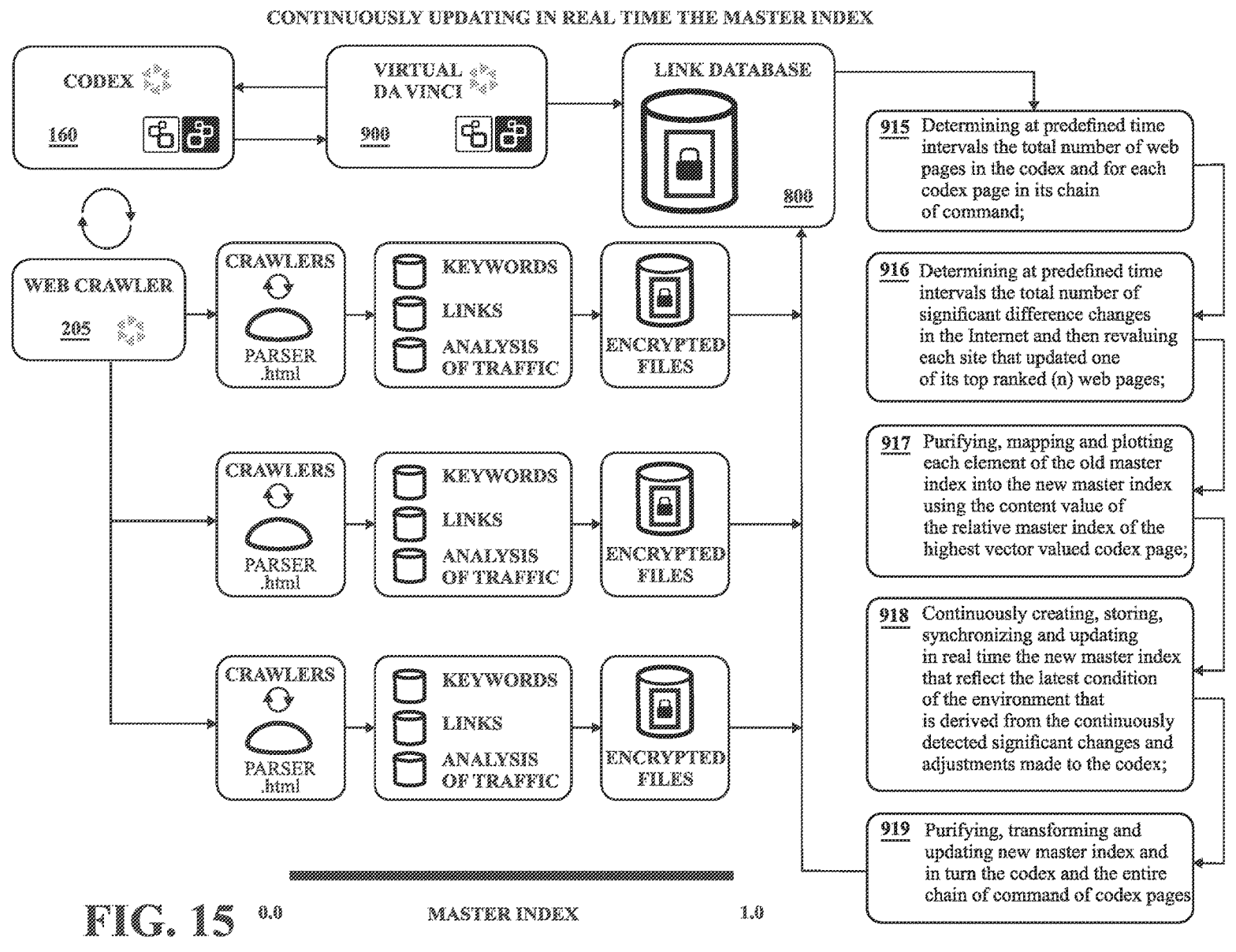

CONTINUOUSLY UPDATING IN REAL TIME THE MASTER INDEX

CODEX 160

VIRTUAL DA VINCI 900

LINK DATABASE 800

WEB CRAWLER 205

CRAWLERS PARSER .html

KEYWORDS LINKS ANALYSIS OF TRAFFIC

ENCRYPTED FILES

CRAWLERS PARSER .html

KEYWORDS LINKS ANALYSIS OF TRAFFIC

ENCRYPTED FILES

CRAWLERS PARSER .html

KEYWORDS LINKS ANALYSIS OF TRAFFIC

ENCRYPTED FILES

915 Determining at predefined time intervals the total number of web pages in the codex and for each codex page in its chain of command;

916 Determining at predefined time intervals the total number of significant difference changes in the Internet and then revaluing each site that updated one of its top ranked (n) web pages;

917 Purifying, mapping and plotting each element of the old master index into the new master index using the content value of the relative master index of the highest vector valued codex page;

918 Continuously creating, storing, synchronizing and updating in real time the new master index that reflect the latest condition of the environment that is derived from the continuously detected significant changes and adjustments made to the codex;

919 Purifying, transforming and updating new master index and in turn the codex and the entire chain of command of codex pages 0.0 MASTER INDEX 1.0

FIG. 15

SITE RANK CODEX SEARCH PATTERNS

CROSS REFERENCE TO RELATED APPLICATIONS

This Divisional Patent Application Claims the Benefit of:

U.S. patent application Ser. No. 17/752,412 filed on May 24, 2022, wherein U.S. patent application Ser. No. 17/752,412 is a Divisional claiming priority to U.S. patent application Ser. No. 16/802,526 filed on Feb. 26, 2020, wherein U.S. patent application Ser. No. 16/802,526 is a Continuation-In-Part claiming priority to U.S. patent application Ser. No. 16/129,784 filed on Sep. 12, 2018 (issued as U.S. Pat. No. 10,936,687 on Mar. 2, 2021), wherein U.S. patent application Ser. No. 16/129,784 is a Continuation-In-Part claiming priority to U.S. patent application Ser. No. 15/944,770 filed on Apr. 3, 2018, wherein U.S. patent application Ser. No. 15/944,770 is a Divisional Application claiming priority U.S. patent application Ser. No. 15/889,150 filed on Feb. 5, 2018 (issued as U.S. Pat. No. 11,048,765 on Jun. 29, 2021), wherein U.S. patent application Ser. No. 15/889,150 is a Divisional Application claiming priority U.S. patent application Ser. No. 15/829,963 filed on Dec. 3, 2017, wherein U.S. patent application Ser. No. 15/829,963 is a Divisional Application claiming priority U.S. patent application Ser. No. 15/829,916 filed on Dec. 2, 2017, wherein U.S. patent application Ser. No. 15/829,916 is a Divisional Application claiming priority U.S. patent application Ser. No. 15/708,122 filed on Sep. 18, 2017, wherein U.S. patent application Ser. No. 15/708,122 is a Divisional Application claiming priority to U.S. patent application Ser. No. 15/644,713 filed on Jul. 7, 2017, wherein U.S. patent application Ser. No. 15/644,713 is a Divisional Application claiming priority to U.S. patent application Ser. No. 15/494,497 filed on Apr. 22, 2017, wherein U.S. patent application Ser. No. 15/494,497 is a Divisional Application claiming priority to U.S. patent application Ser. No. 15/486,276 filed on Apr. 12, 2017 (issued as U.S. Pat. No. 10,922,363 on Feb. 16, 2021), wherein U.S. patent application Ser. No. 15/486,276 is a Continuation-In-Part claiming priority to U.S. patent application Ser. No. 15/390,713 filed on Dec. 26, 2016 (issued as U.S. Pat. No. 10,915,523 on Feb. 9, 2021), wherein U.S. patent application Ser. No. 15/390,713 is a Continuation-In-Part claiming priority to U.S. patent application Ser. No. 15/352,555 filed on Nov. 15, 2016, wherein U.S. patent application Ser. No. 15/352,555 is a Divisional Application claiming priority to U.S. patent application Ser. No. 15/264,996 filed on Sep. 14, 2016, wherein U.S. patent application Ser. No. 15/264,996 is a Divisional Application claiming priority to U.S. patent application Ser. No. 15/246,446 filed on Aug. 24, 2016 (issued as U.S. Pat. No. 10,959,090 on Mar. 23, 2021), wherein U.S. patent application Ser. No. 15/246,446 is a Divisional Application claiming priority to U.S. patent application Ser. No. 15/175,861 filed on Jun. 7, 2016 (issued as U.S. Pat. No. 11,281,664 on Mar. 22, 2022), wherein U.S. patent application Ser. No. 15/175,861 is a Divisional Application claiming priority to U.S. patent application Ser. No. 14/682,052 filed on Apr. 8, 2015, wherein U.S. patent application Ser. No. 14/682,052 is a Divisional Application claiming priority to U.S. patent application Ser. No. 14/623,559 filed on Feb. 17, 2015, wherein U.S. patent application Ser. No. 14/623,559 is a Divisional Application claiming priority to U.S. patent application Ser. No. 14/582,236 filed on Dec. 24, 2014, all of which are incorporated herein in their entireties.

FIELD OF THE INVENTION

The present invention relates generally to an Internet search engine system. More particularly, the present invention relates to a server side interface product, that is able to remove viral, spam and duplicate content, and an interface product that works independently and in parallel with a browser client and search engine supercomputer server architecture that gathers, analyzes, and distills interactive input. The optimizer transforms the input into a human knowledge search pattern with informatics set theory interpretations of natural variants comprising of key featured attributes or associations and nested dependencies using rules of transitivity that gain factor the value of the content and attenuate the confounding variables in order to stabilize and reduce sensitivity parameter variations due to the environment. For each search pattern the optimizer continuously maintains, and updates preprocessed best-fit responses.

BACKGROUND OF THE INVENTION

The limitations, drawbacks and/or disadvantages of technologies are as follows: Search engines are based on Boolean algebra eigenvector algorithms that are used to parse and filter information indices until the top page ranks are determined and displayed to the end user. Unfortunately, some specific keywords combinations may be too narrow and confound a search by hiding optimal results. Search engines are predominately configured to perform static search patterns. Each search is processed from the ground up without considering many requests belonging to one reply. A session consists of consecutive related and unrelated search requests to reach the destination.

The environment or Internet can be considered as a massive volume telecommunication network with billions of subscribers. Search engine supercomputers gather, analyze information of the environment estimated to be 30 billion unique pages for the English language, and using eigenvectors to measure large scale indices of information stored in databases to determine the most probable result pages with the end user's match criteria. As explained before U.S. Pat. No. 6,614,893 and its continuations teach as the size of the environment increases the level of redundancy and tax burden exponentially increases. For this reason, it will be object of this invention to perform the following improvements:

1) The HIVE cleans, simulates, and standardizes the Internet environment by continuously analyzing, distilling, managing, organizing and distributing the huge amount of information in a massive parallel distributed managerial hierarchical supercomputer commercial known as the HIVE that removes redundancy, latency and the organizational tax burden.
2) Once the Hive artificial intelligent computationally continuously process and filter the raw data of the Internet environment into primed data comprehensible for human monitoring and evaluation the system will be able to remove redundancy, increase throughput, and eliminate complexity exponential rate of growth associated with the size of the environment.
3) Prior art Search Engines are based on 'Boolean Algebra' eigenvector algorithms that are used to prorate and filter information indices until the top page ranks are determined and displayed to the end user. Furthermore, some specific keyword may be too bright and confound a search by hiding optimal results and the corporate value of each website is not considered.
4) Search Engines are predominately designed to perform one request to one reply search patterns. Each search pattern is performed from the ground up and does not merge several sequential requests to one reply patterns consisting of consecutive related and unrelated searches the end user typed to reach the destination while randomly surfing the environment.
5) Page ranks have serious limitation due to the Caesar's "divide and conquer" nature or 'Boolean Algebra' approach of deriving the top results. A system that recognizes keyword combinations and when incomplete supplies and inserts missing gaps of information, as taught in U.S. Pat. No. 6,614,893 where Vector CDR can be expressed as the summation of a plurality of valid vectors. The system correlates partial vectors to create a resultant vector representing a collection of top X page ranks that is certain with 100% accuracy. As taught in U.S. Pat. Nos. 7,809,659 and 7,908,263 teaches Site Rank, to those in the field IP Address, Sites, Websites, are ranked as a single object and then assigned a quality partition from 0 to 10.
6) The 'Boolean Algebra' approach maps searchable environment, that estimates valid resources that are available to figure out the optimal resources using the web page probabilities. As taught in 8,386,456, U.S. Pat. Nos. 8,868,535, 8,977,621 and 9,355,352 teaches Site Rank to cull and attenuate redundancy, spam and viral content that are removed immediately when the search engine, using the link database, maps an improved environment.

As taught in U.S. Pat. Nos. 8,386,456, 8,868,535, 8,977,621 and 9,355,352 a searchable environment is a Zero Significant Event with no independent variables as follows:

Mass=0(Logic_305_Basis=1 trillion) or 305!−(305−6)!/6! a

Mass=1(Logic_100_Basis=1,192,052,400) or 100!−(100−6)!/6! b

Mass=2(Logic_70_Basis=131,115,985) or 70!−(70−6)!/6! c

Mass=3(Logic_50_Basis=15,890,700) or 50!−(50−6)!/6! d

Mass=4(Logic_40_Basis=3,838,380) or 40!−(40−6)!/6! e

Mass=5(Logic_30_Basis=593,775) or 30!−(30−6)!/6! f

Mass=6(Logic_20_Basis=38,760) or 20!−(20−6)!/6! g

Mass=7(Logic_15_Basis=5,005) or 15!−(15−6)!/6! h

Mass=8(Logic_6_Basis=1) or final destination. i

As taught in U.S. Pat. Nos. 8,386,456, 8,868,535, 8,977,621 and 9,355,352 an improved environment is measured as a First Significant Event or (FSE), where duplicates are removed as confounding element of a search. Internet searchable environment (a, b, c, d, e, f) becomes (FSE, b, c, d, e, f) with one independent variable or IV as follows:

Mass=0 upon having a valid REGEX use Mass=1 to 8 a

Mass=1(Logic_100_IV_1 or 75,287,520) or (99!−94!)/5! b

Mass=2(Logic_70_IV_1 or 11,238,513) or (69!−64!)/5! c

Mass=3(Logic_50_IV_1 or 1,906,884) or (49!−44!)/5! d

Mass=4(Logic_40_IV_1 or 575,757) or (39!−34!)/5! e

Mass=5(Logic_30_IV_1 or 118,775) or (29!−24!)/5! f

Mass=6(Logic_20_IV_1 or 11,628) or (19!−14!)/5! g

Mass=7(Logic_15_IV_1 or 2,002) or (14!−9!)/5! h

Mass=8 is when input automatically maps the destination. i

As taught in U.S. Pat. Nos. 8,386,456, 8,868,535, 8,977,621 and 9,355,352 an improved environment is measured as a Second Significant Event (SSE), where non navigational, low-quality, duplicate, spam and viral content are removed as confounding element of a search. Internet searchable environment (a, b, c, d, e, f) becomes (FSE, SSE, c, d, e, f) with two independent variables or IV as follows:

Mass=0 upon having a valid REGEX use Mass=1 to 8 a

Mass=1(Logic_100_IV_2 or 3,612,280) or (98!−94!)/4! b

Mass=2(Logic_70_IV_2 or 814,385) or (68!−64!)/4! c

Mass=3(Logic_50_IV_2 or 194,580) or (48!−44!)/4! d

Mass=4(Logic_40_IV_2 or 73,815) or (38!−34!)/4! e

Mass=5(Logic_30_IV_2 or 20,475) or (28!−24!)/4! f

Mass=6(Logic_20_IV_2 or 3,060) or (18!−14!)/4! g

Mass=7(Logic_15_IV_2 or 715 or (13!−9!)/4! h

Mass=8 is when input automatically maps the destination. i

As taught in U.S. Pat. Nos. 8,386,456, 8,868,535, 8,977,621 and 9,355,352 an improved environment is measured as a Third Significant Event or (TSE) end user's idea, where using human knowledge to improve the quality of the search. Internet searchable environment (a, b, c, d, e, f) becomes (FSE, SSE, TSE, d, e, f) with three independent variables or IV as follows:

Mass=0 upon having a valid REGEX use Mass=1 to 8 a

Mass=1(Logic_100_IV_3 or 147,440) or (97!−94!)/3! b

Mass=2(Logic_70_IV_3 or 47,905) or (67!−64!)/3! c

Mass=3(Logic_50_IV_3 or 16,215) or (47!−44!)/3! d

Mass=4(Logic_40_IV_3 or 7,770) or (37!−34!)/3! e

Mass=5(Logic_30_IV_3 or 2,925) or (27!−24!)/3! f

Mass=6(Logic_20_IV_3 or 680) or (17!−14!)/3! g

Mass=7(Logic_15_IV_3 or 220 or (12!−9!)/3! h

Mass=8 is when input automatically maps the destination. i

As taught in U.S. Pat. Nos. 8,386,456, 8,868,535, 8,977,621 and 9,355,352 an improved environment is measured as a Quad Significant Event or QSE end user's idea, where using human wisdom to improve the quality of the search. Internet searchable environment (a, b, c, d, e, f) becomes (FSE, SSE, TSE, QSE, e, f) with four independent variables or IV as follows:

Mass=0 upon having a valid REGEX use Mass=1 to 8 a

Mass=1(Logic_100_IV_4 or 4,560) or (96!−94!)/2! b

Mass=2(Logic_70_IV_4 or 2,145) or (66!−64!)/2! c

Mass=3(Logic_50_IV_4 or 1,035) or (46!−44!)/2! d

Mass=4(Logic_40_IV_4 or 630) or (36!−34!)/2! e

Mass=5(Logic_30_IV_4 or 325) or (26!−24!)/2! f

Mass=6(Logic_20_IV_4 or 120) or (16!−14!)/2! g

Mass=7(Logic_15_IV_4 or 55) or (11!−9!)/2! h

Mass=8 is when input automatically maps the destination. i

As taught in U.S. Pat. Nos. 8,386,456, 8,868,535, 8,977,621 and 9,355,352 an optimal environment is measured as a Penta Significant Event or PSE end user's idea, where using human understanding to improve the quality of the search. Internet searchable environment (a, b, c, d, e, f) becomes (FSE, SSE, TSE, QSE, PSE, f) with five independent variables or IV as follows:

Mass=0 upon having a valid REGEX use Mass=1 to 8 a

Mass=1(Logic_100_IV_5 or 95) or (95!−94!)/1! b

Mass=2(Logic_70_IV_5 or 65) or (65!−64!)/1! c

Mass=3(Logic_50_IV_5 or 45) or (45!−44!)/1! d

Mass=4(Logic_40_IV_5 or 35) or (35!−34!)/1! e

Mass=5(Logic_30_IV_5 or 25) or (25!−24!)/1! f

Mass=6(Logic_20_IV_5 or 15) or (15!−14!)/1! g

Mass=7(Logic_15_IV_5 or 10 or (10!−9!)/1! h

Mass=8 is when input automatically maps the destination. i

As taught in U.S. Pat. Nos. 8,386,456, 8,868,535, 8,977,621 and 9,355,352 an optimal solution is measured as a Hexa Significant Event or HSE or check mate combination end user's idea, using human discernment to find the destination of the search. Internet searchable environment (a, b, c, d, e, f) becomes (FSE, SSE, TSE, QSE, PSE, HSE) with six independent variables or IV when input automatically maps the destination.

The present invention relates generally to the field of computer networks, data accessing and processing systems. As taught in U.S. Pat. No. 6,614,893 a system of computers linked into a neural simulation network, or hive, with neural elements at remote sites which mimics and is placed in parallel operation, switch by switch, with an existing call routing telecommunications network to simulate the operation of the telecommunications network. The system correlates the billing entity locally, so that the system finds and sends only the one real CDR that the system has determined to have all the valid call components. The remaining six CDR's are thereby eliminated locally and are not transmitted to a central computer since they are redundant, and six sevenths, or 86 percent of bandwidth is saved. The billing rate is estimated from the moment the call is initiated, and the accuracy of the estimate increases as the call progresses so that billing takes place in real time. This billing method is known as a "fuzzy system" because it takes partial data samples and continuously projects an estimated total in real time. The more data exchanged through system messages, that is through chaining, the more accurate the extrapolation becomes, until it reaches one hundred percent accuracy. The interactive simulation creates a data warehouse virtual environment.

The Hive

The Internet searchable environment or (U) can be construed as a complex network with billions of web pages. The Search engine supercomputer analyzes each web page, and then uses eigenvectors to determine the highest ranked pages from the end user's match criteria.

The Hive relates to a system of computers linked into a neural simulation network, the simulation network, which comprises a hive of relatively inexpensive, smaller computers, interlinked as a hierarchy and including parent and junction point simulation computers and, respectively, dedicated computers for performing specific tasks and other computers to provide processing power and still others at the peak of the command hierarchy to synchronize and delegate tasks among the various interlinked simulation computers with continuous automatic reevaluation and redirection in real time as taught in U.S. Pat. No. 6,614,893. U.S. Pat. No. 7,809,659 teaches the technology has evolved into a mission critical system that is commercially known as the Managerial Pyramid Switch® (hereinafter MPS®). U.S. Pat. No. 9,355,352 teaches the HIVE uses deductive reasoning to interpret interactive input as being part of an idea being formulated by both the left and the right sides of the brain. When a request is incomplete the HIVE probabilistically supplies and inserts missing gaps of information and correlates a plurality of partial vectors and creates a resultant vector containing the top (n) pages.

Set theory is the branch of mathematical logic that studies mathematical sets, which informally are collections of objects, fuzzy set theory or simply fuzzy logic to those in the field. In set theory an object is either a member of a set or not. In fuzzy set theory this condition was relaxed so an object has a degree of membership in a set, a number between 0 and 1. Algebra of set defines the properties and laws of sets is the set-theoretic analogue of the algebra of numbers just as arithmetic addition and multiplication are associative and commutative, so are set union and intersection, just as the arithmetic relation less than or equal is reflexive, anti-symmetric and transitive, so is the set relation of subset.

The Hive relates to a system of computers linked into a neural network which continuously scans and gathers information from, understands, and interacts with, an environment, a system of computers linked to form a neural network is disclosed, including a hive made up of a hierarchy of interlinked individual computers functioning as a unit, the hierarchy including dedicated computers which perform certain specific tasks, processing computers which provide processing power to the unified hive, and parent computers at the peak of the command hierarchy which synchronize and delegate tasks among the other interlinked computers and while providing continuous and automatic reevaluation and redirection in real time. The interlinking of the computers making up the Hive permits execution of strategies pre-set by the user and also permits user updating and changing of the strategies as new information becomes available. The synergistic interlinking of these several computers multiplies processing power to a level many magnitudes greater than that of a single computer running as taught in U.S. Pat. No. 7,058,601.

U.S. Pat. No. 9,355,352 teaches the evolving fuzzy system can be describes as: (EFS) can be defined as self-developing, self-learning fuzzy rule-based or neuro-fuzzy systems that have both their parameters but also (more importantly) their structure self-adapting on-line. They are usually associated with streaming data and on-line (often real-time) modes of operation. In a narrower sense they be adaptive or evolving fuzzy systems. The difference is that evolving fuzzy systems assume on-line adaptation of system structure in addition to the parameter adaptation, which is usually associated with the term adaptive or evolving. They also allow for adaptation of the learning mechanism. Therefore, evolving assumes a higher level of adaptation.

U.S. Pat. No. 9,355,352 teaches the Cherry Picking as the process to select the top (n) pages by reading, deciphering, analyzing the actual content, and the best response is la crème de la crème.

U.S. Pat. No. 7,908,263 teaches the CORE List as a data warehouse that stores billions of preprocessed and precalculated best responses for each of the superset of valid regular expressions.

The Hive Performs the Following:

(A) Transforms Data validates, verifies, cleanses, and standardizes the Internet environment by mapping and organizing the information into managerial hierarchy structure.

(B) Remove chaos and anarchy: Upon scrubbing, parsing and priming the Internet environment into human monitoring and evaluation indicia, the Hive, creates command messages that are also known as Summary Reports that coordinate and synchronize each node to operate at maximal output capacity. Each node operates without adversely affecting the network flow of data. The Hive maximizes available throughput and inhibits the exponential rate of growth of complexity as the size of the environment increases.

(C) Convert Requests into Ideas: Search Engines use Boolean algebra to generate a searchable and unique webpage probability scores to find the top results. In contrast, The Hive using deductive reasoning to interpret interactive input as being part of an idea being formulated by both the left and the right sides of the brain. When a request is incomplete the Hive probabilistically supplies and inserts missing gaps of information including Site Rank values.

U.S. Pat. No. 8,676,667 teaches a neural network with Subject Layers of refinement to the N(th).

U.S. Pat. No. 8,386,456 teaches the Codex is a comprehensive collection of search patterns that are stored in a managerial hierarchical manner. The HIVE *lingua* franca consists of a plurality of concurrently operating block domains, and the sum of all the blocks is the Internet.

Each computing device is in digital communication to search the Codex. The webpage database residing in the Codex stores in memory the master index and the partial master index for each valid interactive input regular expression request or element of the Codex:

Hot and cold analysis uses logic mathematics to estimate the size of the environment as the end user types interactive input.

Simulating the Human Brain:

Human Brain: Each linguistic Glyph is assigned to the [L] left side of the brain and each geospatial Glyph is assigned to the [R] right side of the brain and the Anchor is the best common denominator Glyph.

The dominant tendency of each request is given a [L] linguistic, and [R] geospatial tendency, and then Cholti reorganizes, maps and plots the Glyphs to create a managerial hierarchical relationship index.

Human Brain Intelligence: Transforms each search pattern and identifies independent variables based on mass partitions of the Internet and creates join, simple, hybrid, complex and optimal pyramids (layers of refinement).

Human Brain Wisdom: analyzes the top (n) pages and sites and expands each [AX], [BX] and [CX] Glyph equation with key featured association dependent variables.

As taught in U.S. patent application Ser. No. 13/247,964—Issued as U.S. Pat. No. 8,868,535 (a parent of this application and incorporated herein by reference)

Codex, using the benefit of U.S. patent application Ser. No. 12/764,934, filed on Apr. 21, 2010 (issued as U.S. Pat. No. 8,676,667 on Mar. 18, 2014), cleanses, validates, verifies, organizes, inventories, standardizes and mirror image of the existing Internet environment. Assigning a unique probability value to each Site and Webpage. The mirror image of the existing Internet environment is a neural network which continuously scans and gathers information from, understands, and interacts with, an environment and brings order to the Internet using several layers of refinement to eliminate the confounding elements of the search process, and furthermore, having Vector V that maps unique or independent links removing from calculation duplicate or redundant, low quality, spam and viral links using Site Rank values.

When referring to the destination: The global, regional and local scope may differ. For example: a (local) map may be valid, the (global) home page of the company and an (global) encyclopedia definition or (regional, local) news item, nevertheless if a checkmate combination is found, the user's intent is known.

As taught in U.S. patent application Ser. No. 13/777,775-Issued as U.S. Pat. No. 8,977,621 (a parent of this application and incorporated herein by reference)

Build the Summary Report Objects

A. The Hive neural network simulates the entire superset of valid interactive input regular expression construed during an Internet browser search and then organizes and distributes the searchable environment using at least one index relationship, and then hierarchically creates a chain of command comprising of super blocks, blocks, sub blocks, mini blocks and elements. The entire managerial hierarchical chain of command is index refined, wherein each position probabilistically maps an improved environment with a corresponding partial master index that ranks in order of value from highest to lowest each site and web page.

Transform Interactive Input into Search Patterns

B. Assigning to each unit (or position) of the chain of command a search pattern.

C. Storing each valid search pattern into the 'CORE List' database.

D. Setting a vector value to search pattern based on estimated environment size and the partitioning the interactive input into keywords and clusters that are transformed into Glyphs.

Transform input keywords and clusters into a Glyphs (vector) based search patterns. Assign a vector value to each Glyph depending if they are independent, dependent or complement variables. Independent variables are synonymous with index relationships.

Create the Improved Environments

E. Each position of the chain of command is a partition of the Internet searchable environment and can be referenced from the 'CORE List' using index relationships. The index relationships of each search pattern are used to create an improved environment.

F. For each element of the 'CORE List' statistically normalize and data integrate each site and web pages belonging to each improved environment into a partial master index.

Likelihood Analysis

G. Measures inductively each element of the 'CORE List' using the Likelihood Analysis applying associative and transitive relationships to synthesize linguistic and geospatial information key featured associations. The key featured attributes or associations and nested dependencies and complement variables gain factor the vector value of each page.

Relevancy Analysis

H. Measures deductively each element of the 'CORE List' using the Relevancy Analysis applying rules of association and transitivity to identify confounding variables. Assign to each unit object a feedback equation that attenuates content with confounding variables in order to stabilize and reduces sensitivity parameter variations due to the environment.

Storing and Updating the 'CORE List'

The Hive Stores the Latest Top (n) Results or the Summary Report in the 'CORE List' Database as Follows:

First when Interactive Input:

A. Identify each keyword and cluster interactively belonging to the input and immediately convert input into index relationships.

B. Query the 'CORE List' to map the most probable position (or unit object).

C. Display to end user the estimated environment size of the input and the improved environment size using the most probable position (or unit object).

(i) Static Output: Determine if the most probable position contains the destination and, if yes, then displays the summary report object to the end user. The output is readily available and preprocessed no further calculations are required.

(ii) Dynamic Output: Obtains the key featured association or feature attributes and dependencies and feedback equation of the most probable position (or unit object) and correlate the results. Set a vector value to each page, using the hot algorithm to gain factor feature attributes and dependencies and the cold algorithm to attenuates the vector value of each page.

D. Displays top (n) pages: Sends and displays the output in an order to the end user.

Second when Assisted Input:

A. Identify each keyword interactively and offer Assisted Input command instruction to the end user. Each Assisted input maps the index relationship belonging to a unit object.

B. Obtain decision from end user and the selected unit object from 'CORE List'

C. Display to end user the selected assisted input from the 'CORE List'

Third when Smart Input:

A. Obtain the right side of the brain check mate combination Global Positioning System (GPS) coordinates and identify the commercial Glyph of the interactive input. Then transform the commercial Glyph and GPS coordinates into smart input and derive the index relationship that maps a unit object.

B. Query the 'CORE List' to map the most probable position.

C. Display the 'CORE List' optimal output based on GPS coordinates.

D. Determine if a valid static output exist. If yes, the output is readily available, and no further calculations are required. If no creates the Dynamic Output and displays.

Fourth when Personal Input:

A. Identify interactive, assisted and smart input and convert input into an index relationship that maps a position (or unit object).

B. Query the 'CORE List' to map the most probable position.

C. Offer a Personal Input list of command instruction to the end user. Each element of the list is obtained by performing the Hot/Cold analysis of the most probable position.

D. Obtain Personal input decisions from end user.

E. Interactively display to end user the input and corresponding optimal output.

F. Once the confounding variables are eliminated display the final destination.

Improved Environment: A search pattern indexes the searchable environment using index relationships and removes low quality site rank pages, such as viral, spam and duplicate content to create an improved environment. The primary index relationship picks a relevant environment that is built using a reverse chaining algorithm to map between 1 and 2 billion pages. For example: Animal would include vertebrate or invertebrate, mammals or birds.

For example, when Tiger is selected at least one relevant environment is available, first is Animal relevant environment, another is the Military relevant environment, and finally the Sports relevant environment. Animal is [LL], Military is [LR], and Sports [RR] search patterns. Why do you ask? Well, [LL] is Tiger that is an animal, whereas [LR] is a tank that was used in WWII (1939-1945), whereas [RL] Detroit Tigers is a commercial Glyph or smart input that contains a right brain checkmate. Nevertheless, each unit objects of Tiger yield an improved environment, since each valid unit object is considered its own environment. Each improved environment has a partial master index that maps each page and site with a value.

Optimal Solution: Once a search pattern yields the final destination, the human brain has a left-side and right-side checkmate combination and thus a direct search.

As taught in U.S. patent application Ser. No. 14/028,508—Issued as U.S. Pat. No. 9,355,352 (a parent of this application and incorporated herein by reference)

Informatics Set Theory Constructs Based on Semantics and Human Knowledge

Core List Elements Rules

Before doing any calculations, existing inductive reasoning search engines partition the Internet based on language and then subdivide and optimize based on country.

Rule 1: Searchable Environment: Deriving zero index relationships and using the Internet (U) as the environment and ranking each web page to the master index. Therefore, each page belonging to Internet environment is normalized and probabilistically ranked.

Rule 2: Improved Environment: Using primary index relationship (I) to subdivide the Internet to create Block (I) to map an improved environment attenuating any page not belonging to block (I). For example: Block (I) is "AMERICAN CIVIL WAR".

Rule 3: Optimal Environment: Using primary index relationship (I) and then nesting secondary index relationship (J) to subdivide the Internet to create sub block (I, J) to map an optimal environment attenuating any page not belonging to sub block (I, J). For example: Sub Block (I, J) is "AMERICAN CIVIL WAR"+ROBERT E. LEE.

Rule 4: Optimal Dataset: Using primary index relationship (I) and then nesting secondary index relationship (J) and then nesting tertiary index relationship (K) to subdivide the Internet to create mini block (I, J, K) to map an optimal dataset attenuating any page not belonging to mini block (I, J). For example: Mini Block (I, J, K) is "AMERICAN CIVIL WAR"+ROBERT E. LEE+BATTE OF GETTYSBURG.

Rule 5: Partial Master Indices: Ranking for each partition each web page to a relative master index. For example: each Super Block relevant environment ranks 1 billion pages, each Block (I) improved environment 1 million pages, each Sub Block (I, J) optimal environment ranks 10,000 pages, and each Mini Block (I, J, K) optimal environment ranks 100 pages. U.S. Pat. No. 8,868,535 teaches a Super Block is a join layer of refinement, Block (I) is an Simple layer of refinement, a Sub Block (I, J) a Hybrid layer of refinement and Mini Block (I, J) is a complex layer of refinement, and the destination is an Answer layer of refinement.

Rule 6: Grouping of Concepts: Binding and mapping the block (I) into the Internet environment (U), the Sub Block (I, J) into the Block (I), and the Mini Block (I, J, K) into the Sub Block (I, J). Partitioning the Internet grouping each human knowledge concept applying rules of semantics and grammar of the specific language Internet (U).

Rule 7: Managerial Hierarchy of Concepts: Hierarchically subordinating each relative master index to their parent the relative master index and subordinating the chain of command to the master index. Each page belonging to a Block (I) belongs to their parent Super Block (U) that belongs to their specific language Internet (U). In a first example: Managerial hierarchy of concepts is Dogs (I)→Animals (U)→English Internet (U).

Rule 8: Geospatial partition: Each Block (I) is a geographic area. For example: USA (I)→North America (U)→World (U) and (North Miami Beach | 33160) (I, J, K)→Florida (I, J)→USA (I) used for smart input right side of the brain checkmate combinations.

In an example, organize all human laws and then store all of them in a single site, consisting millions of documents in multiple languages and belonging to a plurality of countries; and picking for each combination the top 1 million documents. The first step would be to subdivide based on category, in this case language, thus the Superblock of laws, would be categorized based on language and further subcategorized by country, thus (English+USA) laws.

Now, we want to further optimize (English+USA) laws side of the site, by organizing the documents into a managerial hierarchy using geospatial independent variables (I, J, K); where (I) represents USA and all federal laws; (J) represents state laws, such as Florida; and (K) represent local laws such as Miami. At this point a user could use his Managerial hierarchy of concepts to perform the following searches: FIRST: "FS" is translated into (I, J) or (USA, FLORIDA) for Florida Statutes. SECOND: The user adds the keyword "718" that is translated into Condominium law. THIRD: The user edits the request to FS 718.504 that maps the prospectus section, and then further refines the search to FS 718.506 1(d) to map statutes of limitations of publication of false and misleading information to yield the optimal output: "Under no circumstances shall a cause of action created or recognized under this section survive for a period of more than five (5) years after the closing of the transaction".

The State of Florida legislature organized the Florida Statues into a hierarchy of concepts. In this case FS is the block, 718 is the sub block, 718.506 is the mini blocks, and 718.506 1(d) is an element. Other hierarchy of concepts examples: the bible and encyclopedias.

Static Analysis Rules

Rule 9: Human Concepts (or Glyphs from U.S. patent application Ser. No. 12/146,420, filed on Jun. 25, 2008 (issued as U.S. Pat. No. 7,908,263 on Mar. 11, 2011)): Identifying a [L] left brain linguistic based checkmate combination when three (3) directly related linguistic index relationships (I, J, K) exist. In a first example: (1) "AMERICAN CIVIL WAR" (2) Add Robert E. Lee (3) Add Gettysburg. (1-3) becomes Historical Event BATTE OF GETTYSBURG. (1) Block (I) is "AMERICAN CIVIL WAR" (2) has ROBERT E. LEE as (J) and (3) has BATTE OF GETTYSBURG as (K). The Human Concept Gettysburg is not used for GPS coordinates (smart input), but instead for the American Civil War battle.

Rule 10: Geospatial Data: Analyzing using [R] right side of the brain to map and plot each recognized geospatial independent variables glyphs into index relationships and then establishing the primary filter as the primary index relationship (X), the secondary filter as the second index relationship (Y), and the tertiary filter as the third index relationship or (Z). For example: 33160 automatically becomes USA (X)+FL (Y)+ (33160 | North Miami Beach) (Z).

Rule 11: Vector Addition: Adding the vector value of each index relationship into a resultant geospatial vector value that determines the significance level. For example: The vector value of (USA, FL, North Miami Beach, 33160) is a precise search with 10,000 web pages.

Rule 12: Geospatial Vector Addition: Using the resultant geospatial vector value to determine the smallest partition of the Internet that will serves as point of origin for the search process. For example: Vector (USA, FL, North Miami Beach, 33160) or (x, y, z, w) is a subset of the visible environment (USA, FL) with 1,000,000 reasonable pages, that maps an improved environment with 10,000 probable pages, attenuating any page that is not close the computing device GPS coordinates of the center point of the zip code to render and display direction map.

Rule 13: Hot and Cold Algorithm (Usage Pattern of Behavior to find craving needs): Relevant keywords and concepts become independent variables, and attenuate irrelevant keywords and concepts. In a first example: Battle of Gettysburg, maps "American Civil War USA Pennsylvania Gettysburg July 1863" keywords as independent variables, and attenuates 1861, 1862, 1864 and 1865, knowledge of the facts makes them irrelevant.

Rule 14: Plotting Geospatial Vectors: Comparing the resultant geospatial vector value against mass limits to determine how many linguistic index relationships exist. In another example: The user types or says the keyword WALMART the input becomes a smart input and transforms the keyword WALMART into a commercial concept and uses the computing device GPS (X, Y, Z, W) components map an optimal search with four (4) independent variables.

Rule 15: Master Index: Deriving no index relationships and using the Internet (U) as the environment and using a popularity probability to rank each web page uniquely.

Rule 16: Partitioning: Deriving one (1) geospatial index relationship and subdividing the Internet using primary index relationship to create a block (X) to attenuate any page not belonging to block (X). For example: The geospatial keyword France attenuates any page that does not make reference to the keyword France (X).

Rule 17: Sub partitioning: Deriving a two (2) geospatial index relationship and subdividing the Internet nesting the primary and secondary index relationships to create a sub block (I, J) and attenuating any page not belonging to sub block (X, Y). For example: "USA+PA" as (I) and "GETTYSBURG" as (J) are joined to map Set (I, J) with 10,000 probable pages.

Rule 18: Index Refinement: Deriving a three (3) index relationship and subdividing the Internet nesting primary, secondary and tertiary index relationships to create a mini block (I, J, K) attenuating any web page not belonging to mini block (X, Y, Z). For example: When the three related independent variables: "AMERICAN CIVIL WAR" (I), "GENERAL ROBERT E. LEE" (J), and "GETTYSBURG" (K) are join together to create a search pattern, the geospatial keywords {USA, PA, Gettysburg} and the Date: Jul. 1-3, 1863 are used to gain factor pages in the analysis as being superior. U.S. Pat. No. 8,676,667 teaches Index Refinement to the (nth) level index relationship.

Dynamic Analysis Rules

Rule 19: Substitution: Substituting (I) when null with (X), substituting (J) when null with (Y), substituting (K) when null with (Z); For example: the user types "33160" is transformed into a smart input, and (I) maps "USA", (J) maps "FLORIDA", and (K) maps 33160, Aventura. A concept category may substitute (I) and subcategory (J) when null.

Rule 20: Smart Input: Identifying [R] right brain checkmate combinations when three index relationships or GPS (X, Y, Z) coordinates exists. For example: The computing device converts a "WALMART" search pattern into smart Input, by adding the GPS (X, Y, Z) coordinates, and renders a map using parameters" (USA, FL, Aventura, 33160).

Rule 21: Smart Search: Performing deductive reasoning by adding the index relationships of [LR] both sides of the brain to create a resultant equation vector value that determines the significance level. For example: smart input WALMART (USA, FL, Aventura, 33160) has four independent variables first "WALMART", second USA+FL, third City of Aventura and fourth Zip Code 33160, and the device console GPS (X, Y, Z) coordinates.

Rule 22: Smart Partitions: Using the resultant equation vector value to determine the smallest partition of the Internet that will serves as point of origin for the search process. For example: input WALMART (USA, FL, Aventura, 33160) has a partition comprising the valid pages that are located within X miles of the user's computing device GPS (X, Y, Z) coordinates.

Rule 23: Category: Assigning each index relationship to a concept (or Glyphs or feature attributes) relevant to the search category. For example: Input WALMART (USA, FL, Aventura, 33160). The category for "WALMART" is a commercial concept (or glyph or feature attributes) that yields direct sales via www.walmart.com, or by directing the user to the store addresses closest to the user's computing device GPS (X, Y, Z) coordinates. "WALMART" based on the encyclopedia human knowledge category is also related to its competitors "TARGET", and "BEST BUY", which are also commercial concepts (or Glyphs).

Rule 24: Rule of Relevancy: Identifying the most relevant codex pages based on the index relationship and obtain the top (n) web pages of each category and the optimal inventory control data structure containing "related objects". For example: "WALMART" becomes the commercial Glyph for the multinational store chain of supermarkets, and the human knowledge encyclopedia with display as output corporate information, mapping for computing devices, news, and www.walmart.com in order to be able to purchase online, in addition offer related searches. Rules of relevancy are what discover key featured or feature attribute associations.

Rule 25: Human Knowledge Related Concepts: Analyzing the related objects to find missing gaps of information. For example: When searching a Summary Report object displays the optimal dataset of a specific search pattern, whereas the related searches are similar objects that are trending or have similarly same characteristics, that might attract the end user's attention. Leonardo Di Vinci, will have as related searches Michelangelo, and Rafael Sanzio maestros, and the master pieces of Mona Lisa and the Last Supper paintings to name a few.

Rule 26: Events: Matching, mapping and mixing pair combinations of two categories against each other to determine direct relationships and relevancy between two (2) categories.

Rule 27: Hot Algorithm (Determining Craving needs): Emphasizing high probability categories combinations associated to the mathematical equation that yields the final destination.

Rule 28: Cold Algorithm (De-Satisficing or Churn): De-emphasizing low probability categories combinations associated to the mathematical equation that yields the final destination.

Rule 29: Assisted (Alternatives) Search: Integrating index relationships (I) and (X) into event (I!) and deriving the index relationships using the event (I!) to create element (I, J, K).

Rule 30: Smart Search: Integrating index relationship (J) and (Y) into event (J!) and deriving the index relationships using the event (J!) to create element (I, J, K) and Rule 31: Direct Search: Identifying [LR] left and right brain checkmate combinations when six index relationships or (I, J, K, X, Y, Z) exists.

Index Refine Rules

Rule 32: Normalizing Content (Cherry Picking): Reading, validating and confirming the content of top ranked valued (n) responses belonging to the optimal sized environment. To those in the art the Cherry Picking process describes how to select la crème de la crème response.

Rule 33: Inventorying Content: Validating the best responses based on content value. For example: Thorough analysis elucidates the page with the highest relevant content.

Rule 34: Organizing Knowledge: Selecting the best fit element subdivision to create the optimal sized environment. For example: When creating new elements to the chain of command picking the search pattern with the highest information certainty and thus accuracy.

Rule 35: Cherry Picking: Picking the best fit content and top ranked valued (n) responses as output. For example: Selecting the Summary Report containing the optimal dataset.

Rule 36: Arranging Output: Sending and displaying output to a user's terminal. For example: The output is sent to the end user's console device arranged in an order (highest first).

Renew Indices Rules

Rule 37: Respective (nth) Level Purification: Simulating for each codex page the optimal environment in real time and assigning a relative master index. For example: Each summary report object indexes the preprocessed optimal output comprising of the top (n) pages.

Rule 38: Respective (nth) Level Synchronizing: Continuously scanning the environment and updating each codex page as each new web page is identified having a higher value than the lowest value stored web pages; associate the new web page to the codex page; disassociate the lowest valued web page to the codex page; storing and updating changes in real time to the codex pages. For example: The content of the encyclopedia is updated in real time as significant new documents are detected keeping up to date all the preprocessed optimal output.

Rule 39: Real Time Encyclopedia: Continuously stores and updates in real time for each valid regular expression at least one collection of top (n) web pages, and the top (n) sites geospatial information. For example: To bypass the search engine capacities once the optimal output for a search pattern changes, the Encyclopedia database updates the summary report object with the latest information.

Rule 40: Respective (nth) Level Optimizing: Continuously storing and updating in real time relative master index belonging to each codex page. For example: Once an optimal dataset of the Codex changes the relative master index is updated in real time.

New Master Indices Rules

Rule 41: Master Index Scheduling: Determining at predefined time intervals or automatically (as fast as possible) the total number of web pages in the codex and for each codex page in its chain of command. For example: The system continuously verifies the entire content of the Internet, when a new master index is created. Once the new master index assigns new probabilities to each document and website, each relevant element of the Codex of human knowledge is updated if the optimal dataset changed.

Rule 42: Master Index Synchronization: Determining at predefined time intervals or automatically (as fast as possible) the total number of significant difference changes in the Internet and then revaluing each site that updated one of its top ranked (n) web pages. For example: When significant content changes trigger the creation of a new partial master index, the new documents not existing in the master index are incorporated, and each relevant element of the Codex is updated if the optimal dataset changed.

Rule 43: Master Index Trending: Purifying, mapping and plotting each element of the old master index into the new master index using the content value of the relative master index of the highest vector valued codex page. For example: Once the system scans, gathers, cleanses, trends and updates the (massive) latest significant difference changes of the Internet, the old master index is updated and transformed into a new master index reflecting the current conditions.

Rule 44: Master Index Renewal: Continuously creating, storing, synchronizing and updating in real time the (massive) new master index and relevant Codex summary report object.

Rule 45: Real time Master Index: mapping, transforming and updating new master index and in turn the codex and the entire (massive) chain of command of codex pages.

Variance Sampling of the Searchable Environment

[AX]: The Boolean algebra or Searchable environment analysis of the Internet environment eliminates from calculation any page without a valid Inventory.

Valid Inventory: Means that a page matches at least one keyword of a given search pattern, where based on the content, trending and quality of the site a given page can be consider to have a fuzzy state such as 1=improbable, 2=probable, 3=most probable, 4=reasonable and 5=final destination, while randomly surfing the Internet.

[BX]: A Gamma function measures the search pattern based on the number of independent variables to adjust the size of the environment. [BX] can be categorized as follows: (x) AS IS: classical inductive reasoning search for the past 40 years, (y) Assisted Input: matches exactly a human knowledge concept, idea or trending combination of keywords, (z) High quality search: use reference sites only, (w) Smart Input: right side of the brain checkmate combination using GPS coordinates, (+++) a direct search, where input automatically maps output.

[AX]: Eigenvectors eliminate irrelevant pages belonging to the Internet environment map a searchable environment for each search pattern object, and in turn becomes the new relevant Internet (U) that is further index refined to create the [BX, CX, DX, and EX] layers of refinement in order to inventory the content of each page and site.

[BX]: Gamma function attenuates improbable pages to create the improved environment that is a subset of the searchable environment after normalizing the probabilistic spatial environment to remove redundancy, spam and virus links. The Codex for each Search Pattern creates the [BX, CX, DX and EX] layers of refinement or "neural network set of intermediate reduction data structures" and stores the top (n) pages into a partial Master Index.

[CX]: First Index Refinement attenuates reasonable pages from calculation. [DX]: Second Index Refinement attenuate probable pages from calculation. [EX]: After [BX] performed the first variance sample size and then [CX] the second variance sample index refining of the improved environment based on a search pattern, can derive the optimal dataset as a third variance sample size. The system stores optimal dataset.

[EX]: Third (Nth) Index Refinement attenuates most probable pages from calculations and elucidates at least one final destination that belongs to the optimal dataset. The total number of valid final destinations equals third variance sample size, ergo only direct searches where input with certainty maps output have 1 final destination dataset. The system can keep tract of personalized activities and stores each valid output.

To Summarize [AX to EX] (neural network subject layer reductions): The [AX] search reduces the order of magnitude from billions to millions. The [BX] search reduces the order of magnitude from millions to 1,000,000. The [CX] search reduces the order of magnitude from 1,000,000 to 10,000. The [DX] search reduces the order of magnitude from 10,000 to 100 and finally the [EX] search has informational certainty and reduces the order of magnitude from 100 to 1 bypassing randomly surfing the web. Deep neural networks describe to the nth reductions.

Real Time Index Refinement

The HIVE or Codex updates partial changes of the Internet after analyzing discrete sample sizes of 100 to 1,000,000 pages based on the quality of the parent sites. For example: A 100-page sample size is used when the highest site rank is ≥8, a 10,000-page sample size when the highest site rank is ≥6, otherwise the sample size=1,000,000 pages.

First Index Refinement: A weighted sample of the Internet with first index refinement means that 1,000,000 low quality site weighted pages were analyzed and 1,000 or the square root of the weight will update the Codex. First Index Refinement=SQRT (1,000,000)=1,000.

Second Index Refinement: A weighted sample of the Internet with Second Index Refinement means that 10,000 medium quality site weighted pages were analyzed 32 and/or the square root of the weight will update the Codex. Second Index Refinement=(long) SQRT (First Index Refinement or 1,000)=32.

Third (Nth) Index Refinement: A weighted sample of the Internet with Third (Nth) Index Refinement means that 100 high site quality weighted pages were analyzed and 6 or the square root of the weight will update the Codex. Third (Nth) Index Refinement=(long) SQRT (Second Index Refinement or 32)=6. The Codex for each level of refinement stores and updates each optimal dataset in the encyclopedia.

Inductive Reasoning systems use the brute force approach and will compare all the documents like a chess program analyzing all the permutations, whereas Deductive Reasoning systems predict the sample size of probable, most probable and answer documents prior to any calculation as a search pattern, and thus minimizing the required throughput to perform the task.

Once the Codex knows the quality of the parent site for each document using rules of semantics, it can analyze the sample as a search pattern like chess grandmasters do and thus avoid tax burden calculations. Weighted samples: documents are given value based on the quality of the site, and furthermore of the frequency of same site documents within the sample.

TABLE 6

Weighted low site page value for First Index Refinement

| Site Frequency | Sample size approximately 1,000,000 weighted pages. | | | | | | | | | |
|---|---|---|---|---|---|---|---|---|---|---|
| Quality | 1 | 2 | 3 | 4 | 5 | 6 | 7 | 8 | 9 | 10+ |
| 6 | 1K | 1K | z | z | z | z | w | w* | | |
| 5 | 300 | 300 | 1K | 1K | z | z | z | z | w | w* |
| 4 | 1 | 2 | 4 | 10 | 25 | 60 | 130 | 350 | 700 | 300 |
| 3 | 1 | 1 | 3 | 3 | 3 | 50 | 510 | 300 | 600 | 100 |
| 2 | 1 | 1 | 1 | 3 | 3 | 3 | 10 | 10 | 10 | 30 |

TABLE 7

Weighted medium site page value for Second Index Refinement

| Site Frequency | Sample size approximately 10,000 weighted pages. | | | | | | | | | |
|---|---|---|---|---|---|---|---|---|---|---|
| Quality | 1 | 2 | 3 | 4 | 5 | 6 | 7 | 8 | 9 | 10+ |
| 8 | 300 | 300 | x | y* | | | | | | |
| 7 | 300 | 300 | x | x | y | y* | | | | |

TABLE 8

Weighted high site page value for Third (Nth) Index Refinement

| Site Frequency | Sample size approximately 100 weighted pages | | | | | | | | | |
|---|---|---|---|---|---|---|---|---|---|---|
| Quality | 1 | 2 | 3 | 4 | 5 | 6 | 7 | 8 | 9 | 10+ |
| 10 | n* | | | | | | | | | |
| 9 | 50 | n* | | | | | | | | |

(n) denotes limit = 1
(x) denotes limit = 100
(y) denotes limit = 1,000
(z) denotes limit = 10,000
(w) denotes limit = 100,000
*Stop adding pages to sample Index Refinement Examples Using Simplified Math Once the HIVE or Codex knows the quality of the parent site for each document using rules of semantics, it can analyze the sample as a search pattern like chess grandmasters do and thus For example: (x) As is classical inductive reasoning search the search pattern is "A+B+C" and maps a searchable environment of (2^28) or 268,435,456 pages and when converted into a search pattern using a gamma function maps an improved environment with 16,777,216 pages or (y) after normalizing the probabilistic spatial environment to eliminate redundancy, spam and virus links, from calculation as improbable pages. This means that 268,435,456−n=16,777,216 or n=251,658,240 pages, where eliminated from calculation.

The first index refinement for (x) yields 16,384 pages and for (y) yields 4,096 pages after eliminating from calculation reasonable pages.

The second index refinement for (x) yields 128 pages and for (y) yields 64 pages after eliminating from calculation probable pages.

The third (nth) index refinement for (x) yields 12 pages and for (y) yields 8 pages after eliminating from calculation most probable pages, and these pages are considered final destinations that belongs to the optimal output.

For example: (x) Assisted input using static analysis rules of semantics becomes transformed input "A+B+C" and maps a searchable environment of (2^28) or 268,435,456 pages, and when converted into a search pattern or (y) maps an improved environment, after normalizing the probabilistic spatial environment to eliminate redundancy, spam and virus links, with 524,288 pages. This means that 268,435,456−n=524,288 or n=267,911,168 pages, where eliminated from calculation.

The first index refinement (or subject layer) for (x) yields 16,384 pages and for (z) yields 725 pages after eliminating from calculation reasonable pages.

The second index refinement (or subject layer) for (x) yields 128 pages and for (z) yields 27 pages after eliminating from calculation probable pages.

The third (nth) index refinement (or subject layer) for (x) yields 12 pages and for (z) yields 6 pages after eliminating from calculation most probable pages, and these pages are considered final destinations that belongs to the optimal dataset. Thus, the assisted input is more accurate than a classical "AS IS" search and has less final destinations for (z) than (y).

For example: (x) Smart input using static analysis rules of semantics becomes transformed input "A" and maps a searchable environment of (2^28) or 268,435,456 pages and when converted into a search pattern or (y, w) using a GPS checkmate gamma function maps an improved environment after normalizing the probabilistic spatial environment to eliminate redundancy, spam and virus links, with 32,768 pages. This means that 268,435,456−n=32,768 or n=268,402,688 pages, where eliminated from calculation.

The first index refinement (or subject layer) for (x) yields 16,384 pages and for (w) yields 181 pages after eliminating from calculation reasonable pages.

The second index refinement (or subject layer) for (x) yields 128 pages and for (w) yields 14 pages after eliminating from calculation probable pages.

The third (nth) index refinement (or subject layer) for (x) yields 12 pages and for (w) yields 4 pages after eliminating from calculation most probable pages, and these pages are considered final destinations that belongs to the optimal output. Thus, the smart input is more accurate than assisted input and the classical "AS IS" search, and has fewer final destinations for (w) than (y) and (x).

For example: (+++) Direct search using static analysis rules of semantics becomes transformed input "A" and maps a searchable environment of (2^28) or 268,435,456 pages and when converted into a search pattern (y, z, w) after normalizing the probabilistic spatial environment to eliminate redundancy, spam and virus links, using a left brain and right checkmate combination gamma function maps an improved environment, (in this case an Optimal element (A) using the benefit of U.S. patent application Ser. No. 11/584,941 filed on Oct. 23, 2006 (issued as U.S. Pat. No. 7,809,659 on Oct. 5, 2010)), with 1 page or (+++) after removing from calculation all but 1 as improbable pages. This means that 268,435,455 pages, where eliminated from calculation. (+++) means informational certainty.

The first index refinement (or subject layer) for (x) yields 16,384 pages and for (+++) yields 1 page after eliminating from calculation reasonable pages.

The second index refinement (or subject layer) for (x) yields 128 pages and for (+++) yields 1 page after eliminating from calculation probable pages.

The third (nth) index refinement (or subject layer) for (x) yields 12 pages and for (+++) yields 1 page after eliminating from calculation most probable pages, and the input maps optimal output. Thus, a direct search with (+++) quality input maps exactly the output.

Real Time Index Refinement Concepts

The index refinement transforms the content of each page into Glyphs and uses valid keyword and clusters in order to identify key featured (featured attribute) associations and dependencies. Each default human knowledge concept and valid keyword regular expression object is index refined, by probabilistically and contextually identifying valid sub ordinates using positional branching and creates billions of smart input and shopping cart objects.

Normalization is the process to remove redundancy, and using the benefit of U.S. patent application Ser. No. 10/603,963, filed on Jun. 25, 2003 (issued as U.S. Pat. No. 6,614,893 on Sep. 2, 2003) the ambient intelligence analyzes all the links from mapping the page as vector V is progressively constructed for each individual call by forward chaining through the simulation computers, and using the benefit of U.S. patent application Ser. No. 12/146,420, filed on Jun. 25, 2008 (issued as U.S. Pat. No. 7,908,263 on Mar. 11, 2011) a Super Page for each request has a Deductive Reasoning W_Rank Basis value that ranges from 0.001 (no good) to 10 (awesome).

Positional, Probable, Plausible Branching

Each positional branching element of Codex can be further refined using another independent variable (n+1) to create probable branching objects, and further refined using independent variable (n+2) reasonable branching to create trillions of new objects.

Encyclopedia Superset of Summary Report Objects or Optimal Dataset

Each Superset (I), Set (I, J), Subset (I, J, K) have their own unit object in the superset of regular expression chain of command. Each element Summary Report object contains the top (n) results that become output and are displayed in an order from highest to lowest, and key featured attributes or associations and dependencies of related concepts or entities and feedback equations that permit deductive reasoning set theory constructs analysis.

Human Knowledge Superset ($I_n$) Expansions: Each Superset ($I_n$) can have subordinates by using associative entities as independent variables (J) and (K) each possessing their own unit object. For example: The Internet or Superset (U) can be subdivided by country domains.

Human Knowledge Set ($I_n$, $J_o$) Expansions: Each Set ($I_n$, $J_o$) can have subordinates by using key featured attributes or associations and dependencies as independent variables (I) (when null) and (K) sub filters each possessing their own unit object. For example: Battle of Gettysburg event can be part to Superset ("Historical Battles") or to Superset ("American Civil War").

Human Knowledge Subset ($I_n$, $J_o$, $K_p$) Expansions: Each Subset ($I_n$, $J_o$, $K_p$) can have subordinates by using key featured attributes or associations and dependencies as independent variables (I, J) (when null) sub filters each possessing their own unit object. For example: 33160 is an event that can be part to Superset ("Florida") and Set ("Florida", "Restaurant") and so forth.

For each Superset, Set and Subset object the Codex creates metadata and stores the human brain equation use both [L] left brain equation English language key featured attributes or associations, and [R] right brain equation geospatial key featured association, and then gain factors the Top Results, and then using deductive reasoning feedback Glyphs equation to attenuates content with confounding variables to stabilize variations due to the environment.

The Codex using Summary Reports dataset derived from Business Intelligence metadata and human brain equation can now display the highest satisficing advertisements to the user and thus yield direct sales. Satisficing is a decision-making strategy or cognitive heuristic that entails searching through the available alternatives until an acceptability threshold is met.

The Codex continuously scans, scans and gathers the environment. Using the human brain, the Internet environment has been broken down. [R] The right side of the brain partitions the Internet into a plurality of super blocks, blocks, sub blocks, mini blocks and elements, whereas [L] the left side of the brain performs the same task using rules of linguistics and semantics based on the frequency and direct relationships between keywords and term clusters.

Then mimicking the human brain to simulate deductive reasoning to create a language based equation, a geospatial based decision, a human decision equation to interpret numerical and text data into transform input that maps a search pattern representing the mathematical equation used to determine the optimal partition of the Internet.

To reach 100% accuracy and precision the confounding elements of the search must be eliminated. The optimizer system uses deductive reasoning means of the feedback Glyphs equation that attenuates content with confounding variables in order to stabilize and reduces sensitivity parameter variations due to the environment. Direct searches eliminate the randomly surfing the web process and in turn automatically yields the final destination output.

Proactively Intercepting New Event Items

FIRST: A Web Crawler navigate the Web and identifies a News Event Document and immediately converts the raw data into primed data by performing data mining and statistical analysis of the content reading the title, links and reading from the document each sentence and paragraph to identify relevant key featured or feature attribute associations and transitive relationships and thus eliminating most words of the document as being irrelevant. Upon receiving a significant difference document from the web crawler, the Codex proactively updates each end user profile that is tracking, trending or searching for relevant information.

Proactively Intercepting a Webpage or New Document

SECOND: A Web Crawler navigates the web and identifies a new webpage and immediately cleanses the raw data into primed data eliminating most words of the document as being irrelevant, the webpage is assigned a new page rank and all the relevant objects in the chain of command are updated. If the file is significant, the system for each position updates the optimal dataset and has a partial master index for each position of the chain of command. Finding multiple significant documents will trigger to renew the master index. Upon receiving a significant difference document from the web crawler, the Codex proactively updates each end user profile that is tracking, trending or searching for relevant information.

The system analyzes and indexes the webpage and then for each valid search pattern assigns a commercial, content, elasticity, popularity, trending and volatility values that determine what is relevant within the newly identified document.

Significant difference search patterns based on the newly derived elasticity and volatility values are geometrically gain factored, since the commercial, content and popularity values are mostly static. When the webpage is determined to be of significant difference, the webpage is proactively intercepted and is sent to the end user profile (interest graph) that is tracking or trending for a relevant search pattern. This automatic process is not a blind or brute force method instead it is a total quality management satisficing algorithm (avoid churn and identify craving needs) designed to minimize the output messages sent the end user.

Commercial Value: The Site commercial value for each new primed document.

Content Value: The quality and relevancy of each search pattern within the content.

Elasticity Value: Measures the frequency search patterns is updated.

Popularity Value: Measures the value of the links and citations.

Trending Value: Search patterns within the content that are currently popular.

Volatility Value measures how many end users have searched the site based on the elasticity value of the site. This value is gain factored with exponential increments.

The Commercial, Content, Elasticity, Trending and Volatility values are adjusted based on the size of the improved environment they belong, thus a Subset (I, J, K) with 100 pages that has a new significant difference event with be affected more dramatically, than a Superset (I) with 1,000,000 pages or the parent Super Block with 1 billion pages.

Positional Branching (Set Theory Interpretation of Human Knowledge Concepts)

FIRST: Each summary object has a unique position in the chain of command.

SECOND: Each index relationship has key featured attributes or associations and nested dependencies using rules of transitivity.

THIRD: Valid subordinates to each position are offered to the end user.

For example: USA would offer each of the fifty (50) States and corresponding counties and cities.

FOURTH: When a position is selected a new dataset is created.

For example: American Civil War is the search pattern selected from US History Superset (I) and then the user selects Robert E. Lee search pattern from US Military General Set (I, J). American Civil War becomes the first request and Robert E. Lee the second request. Now, the user picks Battle of Gettysburg from historical event Subset (I, J, K). The Battle of Gettysburg and its managerial hierarchical relationship indices becomes the third request, and the (feature attributes) Glyphs belonging to American Civil War and Robert E. Lee Glyphs become dependent variables. Glyphs are valid entities belonging to the human knowledge encyclopedia.

Search Pattern: This is obtained from the end user interactively typing or speaking letters or completed words and optionally selecting assisted function command instructions.

(1) American Civil War ($1^{st}$ search pattern)

(2) Robert E. Lee ($2^{nd}$ search pattern)+American Civil War Glyph.

(3) Battle of Gettysburg ($3^{rd}$ pattern)+American Civil War+Robert E. Lee Glyphs.

For example: Now, the user picks the commercial Glyph game command instruction.

FIFTH: Each position can have subordinates available such as commercial, and map objects. In this case, computer games command instructions related to the Battle of Gettysburg.

(4) Computer game (Assisted search command instruction) Battle of Gettysburg+American Civil War+Robert E Lee Glyphs.

Search Pattern: This is obtained from the end user interactively typing or speaking.

SIXTH: Analysis of the superset of keyword regular expression will elucidate for each position, input that requires, maps, directions and Shopping Cart interface objects that yield personal input. For example: The user picks a Computer Game, Battle of Gettysburg, (Product ISDN number 1234 . . . 123). (5) The Product ISDN number 1234 . . . 123 is a direct search.

The Codex Bitmaps the preprocessed top (n) pages is based on the type of environment Superset (I)=1,024, Set (I, J)=256 and Subset (I, J, K)=64. For each position branching of the chain of command exhaustively calculating all the permutations of the combination of each key featured attributes or associations and nested dependencies relationships.

Probable Branching (Set Theory Interpretations Using Associative Relationships)

Search Pattern: This is obtained from the end user interactively typing or speaking. The Codex analyzes the preprocessed top (n) pages by mapping each associative construct as a probable index relationship to the search pattern by attenuating pages not matching the index relationship and determines for each (feature attribute) associative construct if a new position exists when the number matches exceed the size of the next level (nth) object.

Probable objects: Superset (I) creates Set (I, J) with 256 pages, Set (I, J) creates Subset (I, J, K) with 64 pages and Subset (I, J, K) creates Elements (I, J, K, L) with 16 pages.

For example: When the Codex performs an informatics nesting such a Probable Branching Set (I, J)=American Civil War+Robert E. Lee. The Codex data mines relevant (feature attributes) associative and transitive concept entities to the Probable Branching object.

Plausible Branching (Set Theory Interpretations Using Transitivity Relationships)

Search Pattern: This is obtained from the end user interactively typing or speaking. In this case, transitive relationships are mapped to the plausible index relationship. For each valid probable branching position, the Codex promotes each transitive construct as a reasonable index relationship to the search pattern. The Codex exhaustively for each transitivity construct determines if a new position exists when the number matches exceed a threshold.

Likely (transitivity featured attribute) objects are as follows: Superset (I) creates Subset (I, J, K) with 64 pages, Set (I, J) creates Elements (I, J, K, L) with 16 web pages and Subset (I, J, K) creates Answers with 4 pages. For example: When the Codex performs an informatics nesting such as a Reasonable Branching of Subset (I, J, K) American Civil War+George Meade+Gettysburg. Each document of the American Civil War is likely to have Generals Robert E Lee and George Meade, but none would be able to construct an interpretation using set theory of both Generals with the Mexican America War within the 1861-1865 timeline.

Personalized Index Refinement

Search Pattern: This is obtained from the end user interactively typing or speaking The Codex personalizes the preprocessed top (n) responses belonging to the optimal dataset that are displayed as output in an order from highest to lowest.

FIRST: Promotes a key featured association as an index relationship. For example: End user selects American Civil War search pattern and then selects Gettysburg.

(1) American Civil War (First search pattern). End user's interactive input.

(2) Battle of Gettysburg (Second search pattern)+American Civil War.

If the Search Pattern does not Exist the Codex does as Follow:

SECOND: For example: Now, the end user exhaustively continues with the interactive input process (personalized index refinement) by selecting additional command instruction ((featured and transitivity attributes) or alternative query suggestions).

THIRD: This process attenuates each page not having the new index relationships.

FOURTH: Repeatedly, the end user adds new index relationships and attenuates pages not having the new index relationships until the size of the environment reaches one.

Assisted (alternative) Input: Exact search patterns based on human knowledge.

Smart Input: Search patterns that can incorporate GPS coordinates to render a map.

Personal Input: Input with the highest informational certainty that automatically map the output requiring no further calculations and bypassing search engine capacities.

The Optimizer Transforms Interactive Input into Search Patterns

Search Pattern: This is obtained from the end user interactively typing or speaking. The Optimizer system transforms the user's interactive input into search patterns. Each search pattern has a unique managerial hierarchical index and a set of natural variant command instructions (alternative or ((featured and transitivity attributes)) entities to aid the user improve the input and remove the confounding elements of the search process.

The Codex Bypasses Input Going to the Search Engine

Search Pattern: This is obtained from the end user interactively typing or speaking. When the optimizer system is absent, Codex preemptively analyzes interactive input and then transforms the input into Concepts (or Glyphs or Entities) and afterwards converts the ((featured and transitivity attributes)) to a search) Glyphs into a search pattern. Now, the Codex determines if a valid Summary Report optimal dataset exists by matching the search pattern index relationships. If yes, proactively sends the output to the end user in an order from highest to lowest. To those in the art featured attribute branching of dependencies or combinations uses the rules of transitivity, which describes if A equals B and B equals C then A equals to C.

The Codex Optimizes Input Going to the Search Engine

When the Optimizer system is absent and an exact match summary report object or optimal dataset does not exist the Codex performs the following:

FIRST: Replaces the input with the closest valid search pattern.

SECOND: Unused or Glyphs or Entities become filters of the search process.

THIRD: The search pattern equation becomes the basis for all calculations.

FOURTH: Maximizes (gain factors) unused Glyphs or Entities that have dynamic hot input values.

FIFTH: Minimizes (attenuates) unused Glyphs that have dynamic cold input values.

SIXTH: Sends the optimal input to the search engine.

As taught in U.S. patent application Ser. No. 14/028,508 (a parent of this application and incorporated herein by reference)

The HIVE or Codex Applies Indexing Refinement Using Set Theory

Now, that a valid summary report was found using informatics set theory branching means the preprocessed summary report object or optimal dataset can be gained factor and attenuated using the unused (scenario, alternative or feature attributes) glyphs.

The Optimizer system personalizes interactive, assisted and smart input into transform input using dynamic analysis rules of semantics. The ability to send optimal input to the search engine incorporates by reference the Optimizer Patented related art.

The Codex stores index refined human knowledge: Now, that human knowledge has been arranged in hierarchical distribution, each valid keyword and cluster search pattern object is created using the first independent variable that attenuates irrelevancy. The top results are stored and continuously optimized to bypass the search engine capacities. Each First Significant difference object maps a Superset (I) and has a weighted 1 million web pages. Each of these objects has a corresponding concise search equation with key featured (scenario, alternative or feature and transitive attributes) that map an improved environment.

Concise search equations map Superset (I) environments and belong to the simple layer of refinement. Precise search equations map Set (I, J) optimal environments and are stored in the hybrid layer of refinement. Now, we have 128 million summary report objects. Optimal search equations maps Subset (I, J, K) optimal solutions and are stored in the complex layer of refinement. Now, we have billions Summary Report objects. Further, index refinement or relevant ‘related objects’ or (feature and/or transitive attributes) permits the creation of trillions of positional, probable and plausible logical combination objects.

As taught in U.S. patent application Ser. No. 14/013,018 (a parent of this application and incorporated herein by reference)

Shopping Cart/Advertisement Subsystem.

The HIVE or Codex for direct search equations after receiving command instructions to remove the confounding elements of the search process and is able to put buyers and sellers together using X_FOB and Y_CDIF means. Direct searches are created with the end user's dynamic mathematical equation with six independent variables, and thus have Informational Certainty. Personalized Summary Report (interest graph) objects are stored in the user history.

Each summary report object visually is represented is like a Site managerial organization, by default has its own chain of command comprising of the most probable subordinates using informatics set theory branching that analyzes the best fit web pages of the search pattern mathematical equation derived improved environment. During the index refinement analysis of each search pattern, web pages that yield GPS and mapping information are gain factored and stored in the summary report object. Shopping cart information that yields X_FOB or Y_CDIF information is also gained factor. For example, the free content of the web page yields an intellectual property (music song) that the end user will want to watch or listen.

Each geospatial summary report object that represent a populated partition of the world geography is bound by a commercial chain of command template that is specific to country, state and county and its demographics. Each object subdivides the content as if to create a yellow and white pages phone book of the web pages that are bound to the improved environment, for example, restaurants, types of restaurant, specific restaurants, and then maps the information into smart input. End user's known IP Addresses and GPS coordinates are converted into ANI-like information and are also incorporated. The shopping cart also incorporates demographics and trending satisfactions dimensions. Using informatics set theory branching of each of the summary report objects yields trillions of probabilistic combinational natural variants with a vector value only and that may be stored. The Codex can furnish to the end user the optimal preprocessed results by having stored the trillions of possible permutations.

The Codex updates in real time each partial master index, summary report object (scenario, alternative or (feature and transitivity attributes)) using set theory branching.

As taught in U.S. patent application Ser. No. 15/486,276 (a parent of this application and incorporated herein by reference)

Legacy search engines mimic inductive reasoning popularity-based methods for finding the best results, whereas the HIVE or Codex solves for the optimal environment using deductive reasoning set theory constructs analysis to find the optimal dataset and best results. The Internet must be organized by the HIVE or Codex into a chain of command comprising of superblocks, blocks, sub blocks, mini blocks and elements (scenario, alternative or (feature and transitivity attributes)) depending on the amount of independent variables contained in each search pattern. Each position branching of the chain of command belonging to the entire superset of regular expressions is stored in the ‘CORE List’ database. The Codex upon detecting a new valid and unique input creates a new unit object in the ‘CORE List’ database.

The Optimizer interactively transforms input into a search pattern. The output is sent to the user browser and displays the top (n) results, in an order from highest to lowest, requiring no further calculation and bypassing the search engine capacities. Each unit object search pattern has a Summary Report object or optimal data with the preprocessed top (n) results or output.

The [L] left side of the brain equation uses index relationships (I, J, K), which maps the improved environment. The [R] right side of the brain equation uses geospatial (X, Y, Z) index relationships. The entire superset of keyword regular expressions and human knowledge is converted into search patterns object that possesses independent variables (I, J, K, X, Y, Z).

The ‘CORE List’: (hereinafter referred as the Encyclopedia) organizes human knowledge using categories and subcategories all unique keywords and clusters.

The HIVE or Codex: The Summary Report dataset of each entity objects stores the Top (n) Results, (or precalculated optimal dataset) using rules of linguistics and semantics. Upon identifying from the virtual environment significant difference trending data (interest graph), the Codex, updates the entire superset of (alternative or feature attribute) objects.

Positional Branching entity objects: the HIVE or Codex, index refines the virtual environment applying set theory interpretations using conditional probability calculations to create hundreds of millions positional branching objects (scenario, alternative or (feature and transitivity attributes)). Each Positional Branching object (I) is a Superset (I).

Probable Branching entity objects: The Codex index refining each positional branching entity object using set theory associative relationships (n+1) to create billions of probable branching objects (scenario, alternative or (feature and transitivity attributes)). Each Probable Branching object (J) is a Set ($I_n$, $J_o$) of Superset ($I_n$).

Plausible Branching entity objects: The Codex index refining each positional branching entity object using transitive relationships (n+2) to create trillions of plausible branching objects (scenario, alternative or feature attribute). Each Plausible Branching object (K) is a Subset ($I_n$, $J_o$, $K_p$) of a probabilistically nested parent Set ($I_n$, $J_o$) and nested grandparent Superset ($I_n$).

Web Crawlers: navigate and continuously scan, gather and parse information from the Internet and transform new file raw data into primed, normalized, and mapped data (hereinafter referred to as primed data), for human monitoring and evaluation (interest graph to avoid churn).

As taught in U.S. patent application Ser. No. 12/785,122, filed on May 21, 2010 (issued as U.S. Pat. No. 8,386,456 on Feb. 26, 2013) incorporated by reference The Codex summit cluster reevaluates, synchronizes and coordinates web crawlers to navigate the Web, and the information gathering cluster subsystem continuously distills and analyzes the Internet environment executing informatics set of instructions based on rules of semantics.

Primed Data: Validates each word of the input using rules of linguistics, semantics and human knowledge to assign a mathematical lingua franca meaning that becomes the optimal input. For example: Cat is mapped to Gato in Spanish and Chat in French.

Webpage database: Web Crawlers executes software instructions using rules of semantics to parse each new file and prime the content into data comprehensible for human monitoring and evaluation and then stores all index relationship combinations (scenario, alternative or feature attribute). Web Crawlers upon finding significant amount of primed data update the master index and the entire chain of command partial master indices. When the Codex actuates the Master Index, then all elements of the Encyclopedia are synchronized.

Search Pattern Matching: The Optimizer searches the Encyclopedia for a match and uses the corresponding partial master index to gain factors and attenuates pages to create a personalized optimal environment and to discover natural variants command instructions to help the user randomly surf the web. When the Search Pattern Matching is an exact match then the search process is bypassed, and the optimal dataset is automatically sent to the end user computing device and display as output in a order from highest to lowest.

Encyclopedia: Stores and updates the entire superset of human knowledge objects that are derived from index refining as follows:

(A) The searchable environment using positional branching, (B): The improved environment using probable branching and (C) The optimal environment using plausible branching.

The system upon discovering a search pattern can respond to interactive input sends the optimal dataset as output, bypassing the search engine and displays the output.

Rules of Semantics teaches how to build each element of the managerial hierarchy Encyclopedia. Static Analysis Rules teaches how to create search patterns for single requests, whereas Dynamic Analysis Rules apply for at least two requests. Index Refine Rules teaches how to update elements of the Encyclopedia and Renew Indices Rules teaches how using samples of significant difference the master index and partial master indices are updated in real time. Finally, the New Master Index Rules teaches how to actuate the Master Index.

Internet: described as a spatial virtual environment comprising billions of links that maps Site and Web Pages and associated group of audio, product, services and video resources.

Searchable Environment: A subset of the Internet using 'Boolean Algebra' to eliminates pages not having at least one word or concept of the interactive input.

Search Pattern: The optimizer maps and transforms the interactive input into a *lingua* franca mathematical search pattern and probabilistically maps the Improved Environment.

Improved Environment: The 'AFTER' after culling the searchable environment using the independent variables to probabilistically remove redundancy and improbable web pages.

Optimal Environment: A high quality small sample subset of the Improved Environment after mapping the Search Pattern and by gain factoring natural variants.

Optimal Dataset: Comprises of the top (n) results when using Static Analysis Rules, the best-fit results when using Dynamic Analysis Rules, and the final destination when information certainty exists, and the input automatically maps the output.

Natural Variants (feature attributes): Using rules of association, likelihood and relevancy, the optimal dataset is analyzed to offer command instructions to assist the search.

Interactive Input: As the end user types or speaks input comprising of letters, words and numbers that are mapped into relational entities upon searching the encyclopedia.

Transforms Input: The Optimizer maps the interactive input into an optimal input after find missing gaps of information, category, and index relationships.

Category: Each search is assigned a human knowledge category.

Sub-Category: Once a category is identified that maps an independent variable using informatics set theory branching assign a natural variant subcategory based on the search pattern and then determines the type of search and corresponding type of output. For example: WALMART becomes smart input that uses the GPS coordinates of the end user to render a map.

Media Value database: The Hive monetizes the financial value of the optimal dataset using the Shopping cart and Advertisement subsystem.

Virtual Maestro: Artificial intelligence entities that analyzes optimal input and pattern matches searching the Encyclopedia to find an optimal dataset. The summit cluster monetizes the dataset as the output permitting the virtual maestro to engage using a script in a substantive communication with the end user.

Script database: The virtual maestro uses the optimizer to discover a search pattern and then the Codex searches the Encyclopedia to identify natural variants in order to promote products and services using the monetized optimal dataset.

Interactive Output: the virtual maestro probabilistically maps as output each relevant relational entity response upon searching the encyclopedia and based on the analysis of best fit responses decides how to instantiate communication via a script with the end user.

Informatics Set Theory Branching of an Object

Informatics set theory branching creates (feature and transitive attributes) objects using layers of refinement and site quality partitions values to cull the searchable environment into exact size improved environments. To those in the art to cull the searchable environment describes remove duplicate, spam, viral, non-navigational, and invalid language content.

First, creates concise search objects with an environment of 1,000,000 pages.

Second, creates precise search objects with an environment of 10,000 pages.

Third, creates optimal search objects with an environment of 100 pages.

Natural Variants Objects: (scenario, alternative or (feature and transitivity attributes)) analysis of a search pattern improved environment using informatics set theory constructs discovers relevant knowledge branches or associations. For example: (1) American Civil War+Battle+Gettysburg, using interactive input will yield the same as (2) Gettysburg+July 1863 yields the Historical Event of the Battle of Gettysburg.

Usage Pattern of Behavior Profile (Interest Graph): Now, the order of the word, and the frequency of the words affect the vector value of each word or cluster using the Hot and Cold algorithm and informatics set theory branching to gain factor and attenuate the context of each page belonging to the optimal dataset during the cherry picking of personalizing the output.

Informatics Set Theory Branching: does not require to correlate spatial environments when the command instruction maps an existing object and can discover additional natural variations identified during the index refinement of an improved environment. Each natural variant (feature attribute) object is assigned to a corresponding layer of refinement.

Natural Variants (Feature and Transitivity Attributes) Belonging to an Object

Informatics set theory sub branching: from 'AFTER' improved environment further analysis creates natural variant objects as follows:

First, concise search variants with 100,000 pages.

Second, precise search variants with 1,000 pages.

Third, optimal search variants with 10 pages.

Command instruction dataset collection: The optimizer searches the Encyclopedia to discover probabilistic natural variant (scenario, alternative or (feature and transitivity attributes)) objects using trending, freshness and elasticity valuations (interest graph) of human knowledge concepts. The user controls, decides and picks how to refine the input.

User Selected refinement: For example: selecting a command instruction readily maps a concise, precise, optimal, direct search objects using knowledge discovery set theory constructs data extracts concise, precise and optimal search variants are offered to the end user.

[AX] is a low accuracy 'Boolean Algebra' search with an ambient size in the millions.

[BX] is a concise search with one assigned category and independent variable.

Thus, the 'BEFORE' is a vague search, and the 'AFTER' is a concise search that maps a human knowledge concept belonging to the Encyclopedia and has an optimal dataset.

[CX] is a precise search with one subcategory and 2 or 3 independent variables.

Thus, the 'AFTER' is a concise search that maps an improved environment, and the 'IMPROVED' after finding missing gaps of information is a precise search that maps a human knowledge concept that is part of the Encyclopedia and has an optimal dataset.

[DX] is an optimal search with many subcategories and 3 to 5 independent variables.

Thus, the 'IMPROVED' is a precise search that maps an optimal environment or Output that is a subset of the improved environment, and the 'OPTIMAL' after eliminating the confounding elements is a optimal search that maps a plurality of related human knowledge ideas and concepts belonging to the Encyclopedia, and has an optimal dataset.

[EX] is when the input automatically maps (mathematically in lieu of linguistics) the output, and the deductive reasoning checkmate combination is dissected to make the corresponding semantics and human knowledge equivalences that yield the final destination.

In a nutshell, the process of index refinement uses probabilities to eliminate pages from calculation [AX] uses 1, [BX] 2, whereas [EX] has the highest (N), where the greater the value for (N) the more accurate, reliable and robust the set theory constructs calculations.

Checkmate Combination where Input Maps Output

[EX] offers direct searches, where the input automatically maps the output. In some cases, the search process ends and instantiates a virtual maestro communication with the user.

Customer Satisfaction Business Intelligence Calculations

The system, performs analysis of the optimal dataset in order to offer natural variants command instructions, and then performs business intelligence set of informatics instructions to commercialize and monetize the dataset as output, and sends the output as a response to the user based on what is being said or typed interactively as input. The human makes the decisions used to measure behavior as interactive input is transformed into a personalized search pattern.

The virtual maestro analyzes both the personalized search pattern and the output, and then searches the script database to obtain the AI Script dataset, containing the informatics set of instructions of how to communicate with the end user. Alternatively, to engage in a dialogue.

For example: When the user transforms typing "AME" into "AMERICAN CIVIL WAR" by selecting a command instruction, the end user has selected a concise search and then user continues to type "BA" that becomes "AMERICAN CIVIL WAR BATTLES" by selecting a command instruction, the end user has selected a concise search natural variant; afterwards the user continues to type "GE" that becomes "AMERICAN CIVIL WAR BATTLES GETTYSBURG" by selecting a command instruction (alternative query suggestions), the user has selected a precise search, now the system analyzing the usage pattern identifies the Historical Event of the Battle of Gettysburg that occurred Jul. 1-3, 1863 that is an optimal search.

What is the difference between the searchable environment, improved environment, and the optimal environment? First the searchable environment is a 'Boolean algebra' estimation of the number of links belonging to a spatial virtual environment given a regular expression. The optimizer uses static analysis rules to transform interactive input comprising of words and numbers into a concept that becomes a search pattern. The system normalizes the searchable environment in order to remove redundancy, spam and viruses, and improve information certainty and maps an improved environment using W_RANK method of layers of index refinement. The optimal environment is a high-quality small sample subset of the improved environment that is updated in real time as significant difference changes occur in the Internet, and is stored as an optimal dataset, containing the optimal element (A) or final destination.

First example for the search pattern "American Civil War", the searchable environment has 200,000,000 links and displays as output. Does this mean the search engine eliminated 199,999,990 by actual reading them? No, the lion share is irrelevant from the searchable environment. How is this accomplished? First, spam and virus are eliminated. Second, normalizing duplicates to figure out from U.S. patent application Ser. No. 12/778,228, filed on May 12, 2010 (issued as U.S. Pat. No. 8,239,229 on Aug. 7, 2012) inventory in hand and V vector that represent the single version of the truth links, to map an improved environment of 1,000,000 reasonable pages that represents a concise search. Third, now using quality values any page beyond the first variance sample size is attenuated. In this, case SQRT (200,000,000) equals 14,142 pages. Fourth, the Codex creates a precise search object with 10,000 probable pages. U.S. patent application Ser. No. 14/028,508, filed on Sep. 16, 2013 (issued as U.S. Pat. No. 9,355,352 on May 31, 2016) improves the definition of V vector that represent a resultant vector comprising web crawlers navigate the respective unique or independent link and each dependent link or duplicate for each URL.

The resulting 10,000 probable pages are still too much. If an end user reads 1 paragraph from the top 10,000 results, they would have read the equivalent of the Bible. Fifth, probabilistically create an optimal environment with a second variance sample size or SQRT (10,000) or 100 most probable pages. Finally, the system figures out that potentially 10 final destinations exists based on the third variance sample size. This explains and justifies the need to perform EX index refinement to the nth layer that is SQRT (10) or 3 belonging to the third variance sample size, in order to recommend with certitude results after cherry picking the actual content that are satisfying to the end user based on business intelligence and content inspection.

U.S. Pat. No. 7,908,263 teaches: a plurality of searchable environment may exist during a session while randomly surfing the web. For each session an improved environment, and the optimal environment exist. First, the searchable environment is a 'Boolean algebra' estimation of the number of webpages belonging to the probabilistic spatial environment obtained from the session. The optimizer uses dynamically analyzes interactive input and transforms words and numbers into a concept that becomes a search pattern, the system normalizes the probabilistic spatial environment in order to remove redundancy and reach information certainty and maps a dynamic improved environment using W_RANK method of a plurality of layers of index refinement.

The optimal environment is a subset of the improved environment that is updated in real time as significant change is detected in the Internet, and is stored as an optimal dataset; then the optimizer performs the Hot algorithm to gain factor data and Cold algorithm to attenuate data based on usage pattern of behavior as follows: $1^{st}$: Continuously cleansing raw data into primed data comprehensible for human monitoring and evaluation as an optimal dataset. $2^{nd}$: Analyzes and parses through news events, trending and social media data, and new webpages in real time to determine portions thereof having relevance to the most recent primed data received. $3^{rd}$: executes a set of software instruction to compare the relevant primed data to the search pattern in real time. $4^{th}$: Proactively pattern matches the optimal environment, picks the optimal dataset including alternative suggestions as output and automatically sends the output in an order to the end user.

Sending Optimal Dataset to the End User

The system responds to direct input software instruction based on set theory branching by the Optimizer and takes both sides of the human brain checkmate combination to discover the optimal dataset and update the user with personalized final destinations.

Transforming Raw Documents into Primed Data for Monitoring and Evaluation

The Client software builds interactively input from the end user console devices and using rules of semantics to creates a search pattern, and the user's profile to find missing gaps of information to discover during the refinement process natural variations of the concept.

The system uses web crawlers to continuously gather, distill and analyze the Internet using Index Refine Rules to updated recent News and content Documents and then web crawler navigates, parses and primes into valid search pattern for human monitoring and evaluation. The system uses business intelligence to monetize content to trend data (Interest Graph).

Rules of Semantics to Store Entities into the Encyclopedia

The system stores hierarchically the entire superset of regular expressions and human knowledge search patterns into the encyclopedia data warehouse. Then the Optimizer uses human knowledge obtained from the encyclopedia to perform informatics Set Theory constructs by applying rules of semantics to transform interactive input into a search patterns, and dynamically adjusts values based on usage patterns of behavior, discovering Natural Variants.

The system proactively determine the freshness, volatility and elasticity of the significant difference changes in order to measure trending data, and then searches the Encyclopedia, and webpage database using informatics set theory constructs based on positional, probable, and plausible branching in order to find natural variant command instructions relevant to the interactive input and cull the searchable environment to map an improved environment.

The Web Crawlers upon detecting a significant difference News and/or webpage from the Internet, cleanse, parse, prime and map data and store them into the Webpage database. The system executing informatics instructions using Renew Indices Rules of semantics searches the Encyclopedia data warehouse trending data to discover human knowledge to gain factor the improved environment and probabilistically map each search pattern using the First Variance sample analysis to find positional branching to identify relevant, associative and transitive natural variant command instructions comprising of concise, precise, optimal searches objects.

The system upon finding a valid object in the Encyclopedia and responds with the optimal Output and offers as command instructions valid positional, probable and plausible branching Interactive Input alternatives, otherwise if a new optimal object is discovered, the system immediately index refines the searchable environment into a chain of command of subordinate natural variants consisting of (feature and/or transitive attributes) entities. The system sends the optimal dataset offered to the end user as part of the output.

The system when relevant adds the GPS coordinates of the computing device to the search pattern to respond with the optimal dataset that is display in an order as output. The system responds to direct input upon identifying a both sides of the human brain checkmate combination to discover the destination and update the user with personalized dataset.

The Web Crawlers attenuates the improved environment performing the Second Variance sample analysis to find probable branching natural variant command instructions comprising of concise, precise, optimal searches offered as (alternative or (feature or associative attributes)) ADDITIONAL KEYWORDS that aid the user to reach the destination.

The Web Crawlers inventories the improved environment, performing the Third Variance sample analysis to identify plausible branching in order create and store in the Encyclopedia the optimal dataset derived from the analysis of the optimal environment. The First, Second and Third Variance samples analysis probabilistically maps each interactive input transformed into a search pattern to create an optimal dataset that includes, page links, hyperlink to relevant human knowledge, advertisements, maps, and natural variants as (alternative suggestion) ADDITIONAL KEYWORDS that aid the end user to further index refine the search.

The system updates and renews the plurality of partial master indices and automatically as fast as possible actuates the New Master Index that contains the most current significant changes in the environment.

The software permits user updates and change strategies as new information becomes available as (feature attributes or alternative suggestion to the query) ADDITIONAL KEYWORDS, as defined in U.S. Pat. Nos. 7,809,659, and 7,908,263. "Related objects" such as Peoples names, telephone numbers, particular copyrighted titles and links to downloadable audio media devices such music, and copyrighted pictures that belong to Super Sites are examples of Objects as defined in U.S. Pat. No. 8,386,456, and personal input command instruction eliminate the confounding elements of the search as defined in U.S. Pat. No. 8,977,621.

Thus, the system, identifies search patterns using rules of semantics and dynamically correlates data with knowledge branching to offer nested entity command instructions based on usage patterns of behavior. And offers direct search natural variants objects having a checkmate combination and with certainty automatically map the destination.

The system correlates data by gain factoring most probable pages and attenuating reasonable and probable pages using variance sample sizes to create the optimal environment. The system has billions of optimal datasets saved as preprocessed output, and acts as an interceptor of messages to bypass the search engine and eliminating repetitive.

The system performs index refinement to the nth word and updates the Encyclopedia. In this case, dynamically assigns the independent variables to a search pattern, and then using human knowledge offers natural variants command instructions based on the user's decisions.

The system finds: (1) Superset ($I_n$) performing positional branching to discover nested entity objects, (2) Set ($I_n$, $J_o$) performing probable branching finds key featured associations natural variants objects, (3) Subset ($I_n$, $J_o$, $K_p$) performing plausible branching using rules of transitivity to create the optimal datasets where input automatically maps and formats precalculated and preprocessed output, and displays the output to the user bypassing the search capacities. Finally, the system updates ambient changes to renews the plurality of partial indices within a predefined time (or automatically based on available throughput) to create a new master index.

The system uses rules of semantics to cleanse and parse documents and upon determining portions thereof having relevance to monitoring and valuation from the primed data to measures freshness, volatility and elasticity of the significant difference changes as trending data executes software instructions based on business intelligence to maps and updates entities objects and natural variants in the Codex. The system updates and renews the plurality of partial indices and proactively build datasets using the Codex, and Webpage database, and performs historical analysis and automatically updates personalized output to the end user.

The system pattern matching the primed data and trending data to the end user's recognized Search Pattern in order to proactively generate optimal input using the benefit of U.S. Pat. No. 8,977,621 gain factors associative and transitive natural variant of the entities object as relevant and likely and attenuate irrelevant and unlikely to probabilistically map the optimal spatial environment or dataset and pick the personalized output hat is sent to the user. The system keeps record of each end user's Search Pattern for human monitoring and evaluation.

The system commercializing and monetizing the user's search patterns using the Media Value database when using the Shopping Cart and Advertisement subsystem. U.S. Ser. No. 09/819,174 teaches the virtual maestro engages in a substantive communication with the user using the script database in order to promote products and services. Using the benefit of U.S. Pat. No. 8,386,456 the system synchronizes all virtual maestro residing on the user console device to obtain interactively input to permit the artificial intelligence entities to instantiate substantive communication with users and promote as product licensed audio and video intellectual property. U.S. Ser. No. 09/819,174 teaches "The virtual maestro is a product of artificial intelligence can also select and play televised or radio broadcast sports events selected by the individual subscriber, these events are stored in the system memory as they are broadcast from their source, so that the subscriber has the option of having a time delay introduced." Using the benefit of U.S. Pat. No. 8,386,456 the virtual maestro obtains from the Optimizer the optimal input and from the Codex the optimal dataset, and then searches the Script database using the "profile stored for the individual subscriber" to communicate with the user and sell licensed intellectual property.

The system uses the optimal input to pattern match the Encyclopedia to obtain the optimal dataset of an entity object, and related Positional, Probable and Plausible branching command instructions offered as natural variants entities to aid the end user in a search. The virtual maestro using the Script database to communicate updates to the output and offers ADDITIONAL KEYWORDS that aid the end user as associative and transitive natural variant entities to enhance the communication and "seem smart as if a human".

U.S. Ser. No. 09/819,174 teaches "The selection of works by each subscriber is recorded and stored for marketing purposes and for automatic selection of works for the subscriber, such as by a virtual maestro. This information is used in part to customize the advertising displayed for the subscriber during playing of subsequently selected works. One such form of customized advertising is song or video previews which seem to fit within the established and individualized pattern of individual subscriber access. The accessed and played works also help a subscriber decide whether to purchase a compact disk or audio tape of a musical selection, or a digital video disk or video tape of a movie or music video. Such purchase is optionally offered through the supplier. In this way the system boosts rather than competes with compact disk and video sales." using the benefit of U.S. Pat. Nos. 8,239,229 and 8,676,667 the supplier is the Hive that is searched by the plurality of artificial intelligence virtual maestro performing business intelligence statistics.

The system has rules of semantics for personalized objects by executing software instructions keeps track of each user's search pattern for human monitoring and evaluation. Proactively, the system upon detecting a significant difference change to relevant search pattern automatically communicates (alternative suggestion to the query) to the user.

The system commercializes and monetizes the optimal dataset adding Shopping Cart and Advertisement functionalities using the Media Value database, now the virtual maestro executes software instructions to analyze the output with the Script database to instantiate communication with the user knowing and understanding what they are searching by possessing their trending data and personalized input probabilistic spatial environment inventoried as a collection of additional keywords (feature attributes or natural variant) entity objects.

Virtual Maestro Interaction with the End User.

For Example: When the user transforms saying or typing "BIL" into "BILLY JOEL" by selecting a command instruction, the end user has selected a entity object and then the end user continues to type or say "JU" that becomes "BILLY JOEL JUST THE WAY YOU ARE" by selecting a command instruction, the end user has selected a natural variant (alternative suggestion, or feature attribute, or natural variant to the query) object; afterwards the user continues to type "HD" as in high definition quality that becomes "HD BILLY JOEL JUST THE WAY YOU ARE", the user has selected a nested entity object, now the system analyzes the end user' profile usage patterns of behavior to identify a copyrighted product. Now the virtual maestro upon validating and licensing may display the intellectual property!

For Example: The virtual maestro creates the simulation input using the historical search usage pattern of behavior, and licensing and transactional information. During the interactions with the user obtains demographics, and measures level of satisfaction given a simulation output. The user asks the virtual maestro to monitor and update the World Cup qualifiers, immediately the question will be what type of event and offers a list of possibilities, otherwise the system would inundate the human with too much trivia simulation input. The user forgets to place a restriction and virtual maestro says player X got a yellow card, player Y is about to shoot a corner kick . . . , after a while of being overwhelmed with the simulation output . . . the user says just update goals and final scores and let me see all the related video highlights for the Mexico—Germany game. U.S. Pat. No. 7,058,601 teaches "continuously scans and gathers information from, understands, and interacts" and using the benefit of U.S. Pat. No. 8,977,621 automatically detects the optimal dataset and engages in a direct communication with the human.

This means the system licenses, monetizes and commercializes all intellectual property presented to the end user by the virtual maestro as simulated output. The virtual maestro uses the scripting software residing in the memory of the device console and executes software instructions to analyze simulation input, comment or critique from its own perspective, using demographic, trending and usage patterns to identify craving needs and avoid churn.

First Preferred Embodiment: Virtual Maestro Codex Search Patterns (U.S. Ser. No. 16/129,784)

Second Preferred Embodiment: Site Rank Codex Search Patterns

Figure 6:
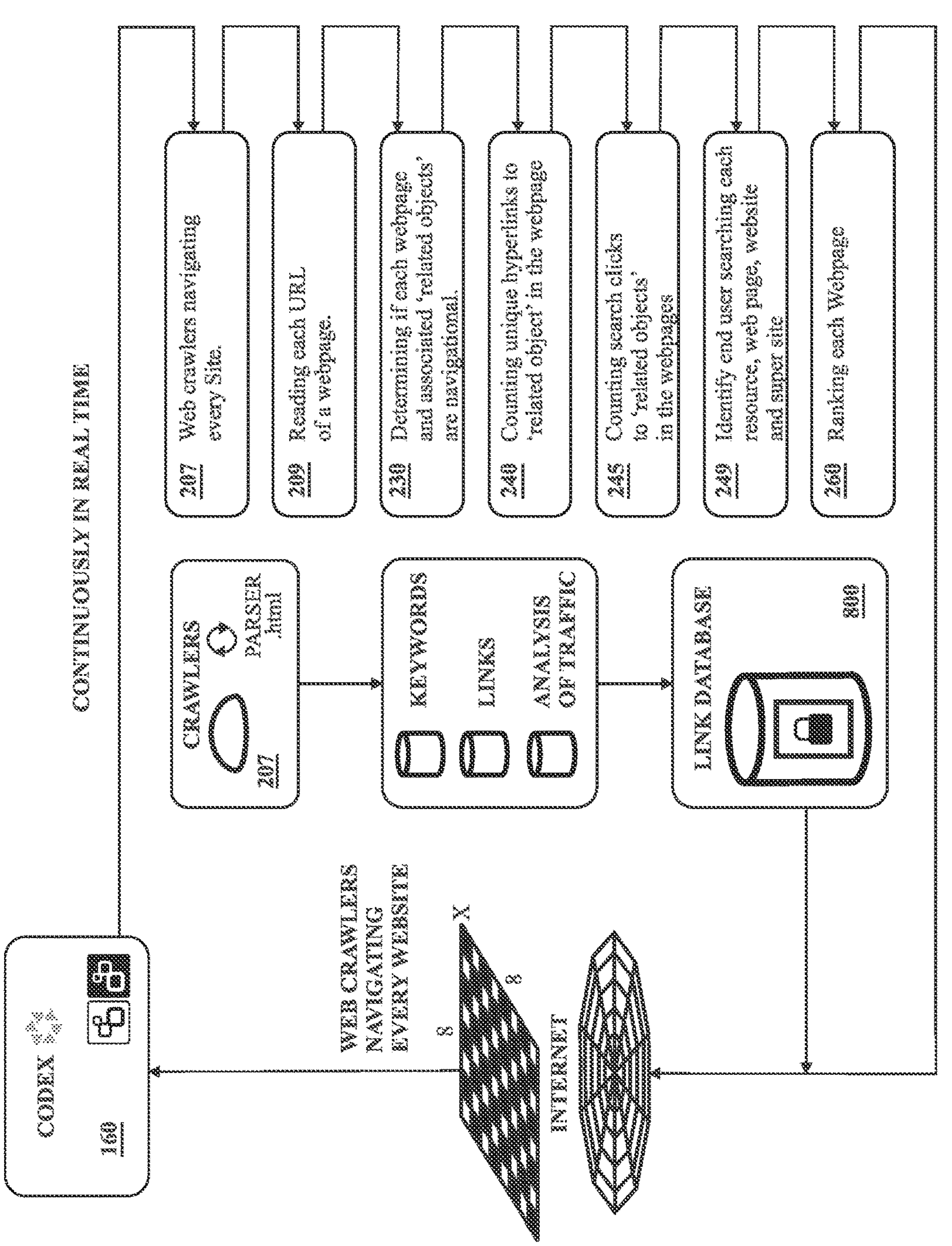

FIG. 6 Codex continuously replicates the Internet

Figure 7:
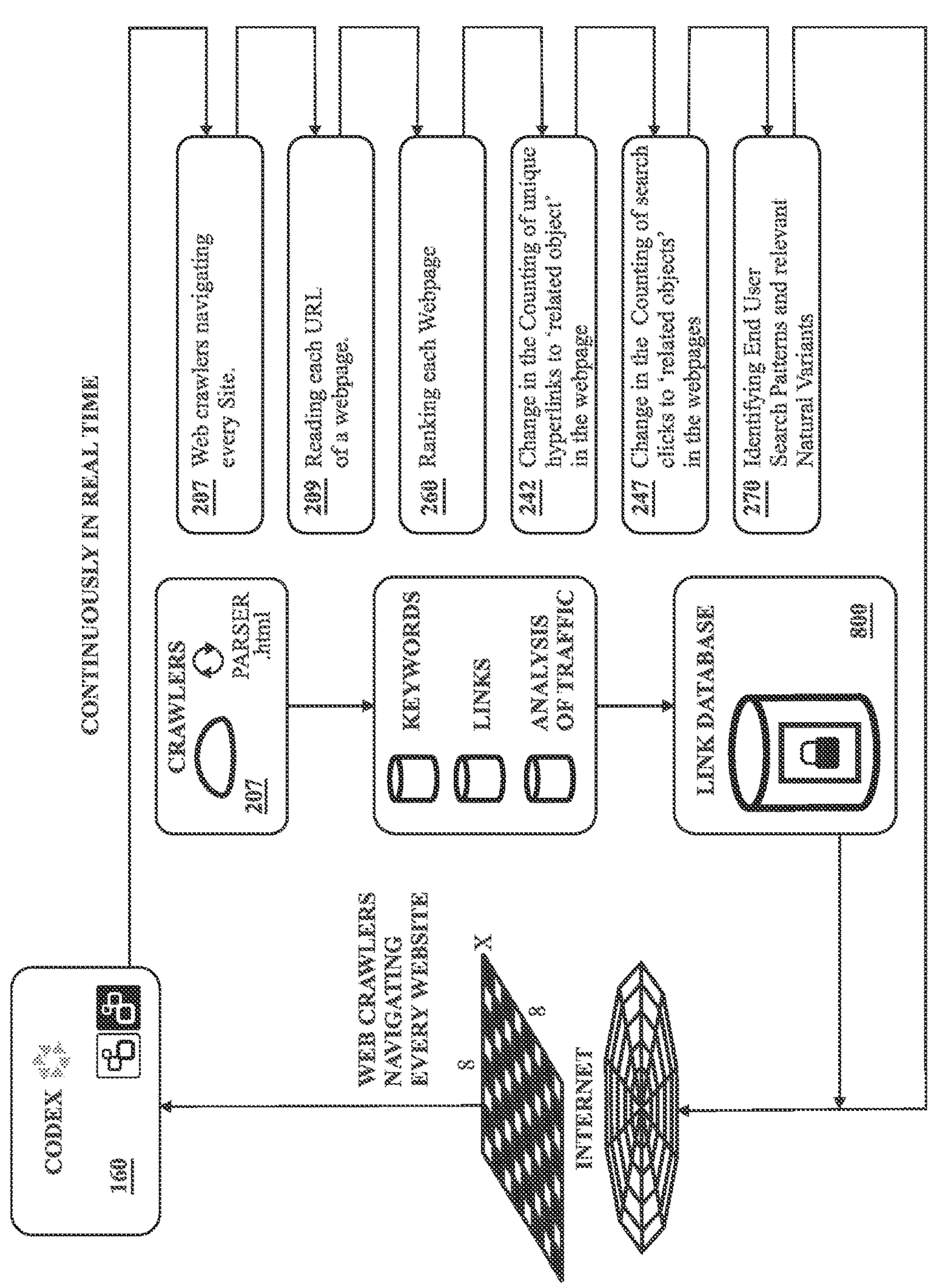

FIG. 7 Codex updates the link database as web crawlers navigating every webpage.

Figure 8:
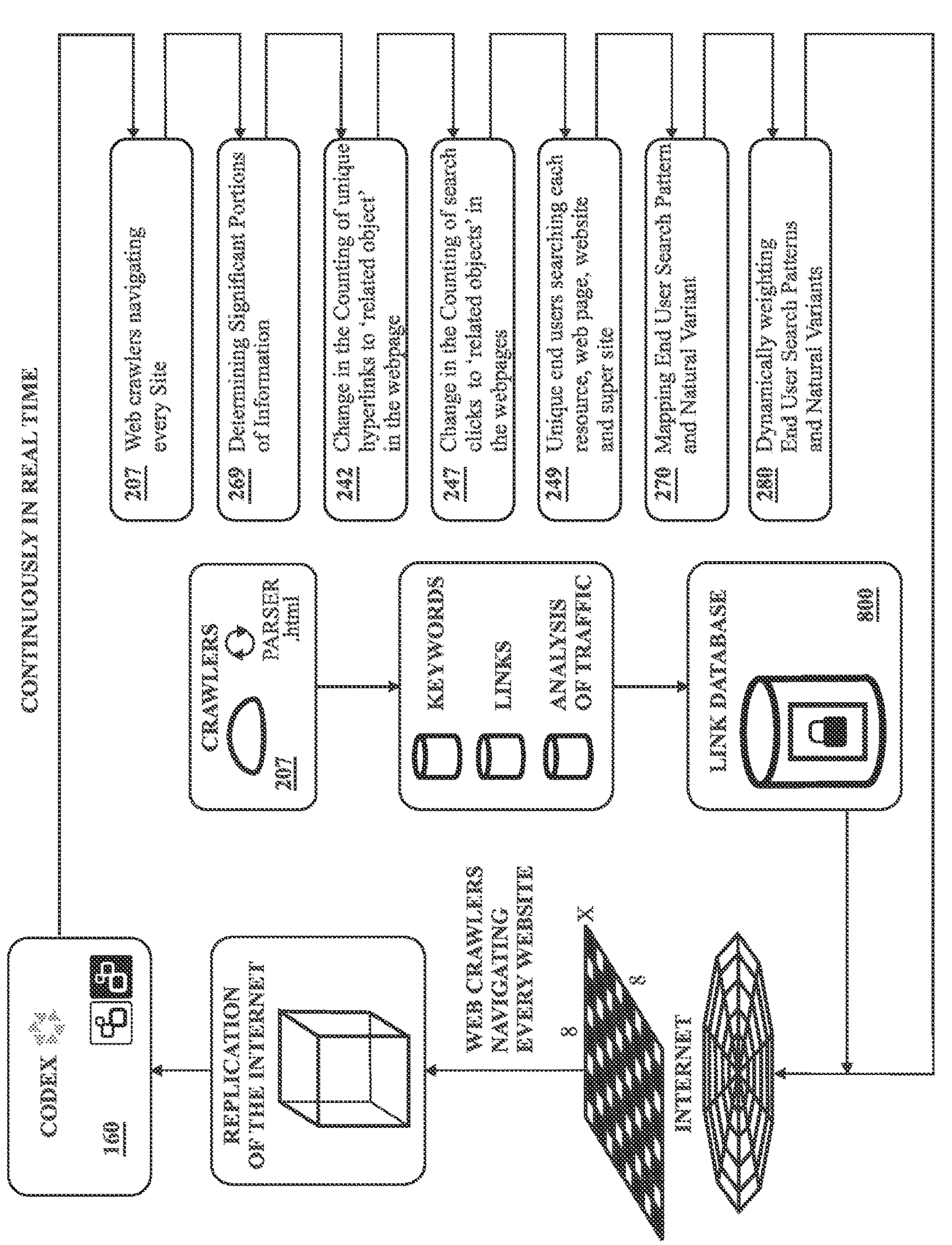

FIG. 8 Codex updates the link database as web crawlers navigating every website.

Figure 9:
Figure 9:
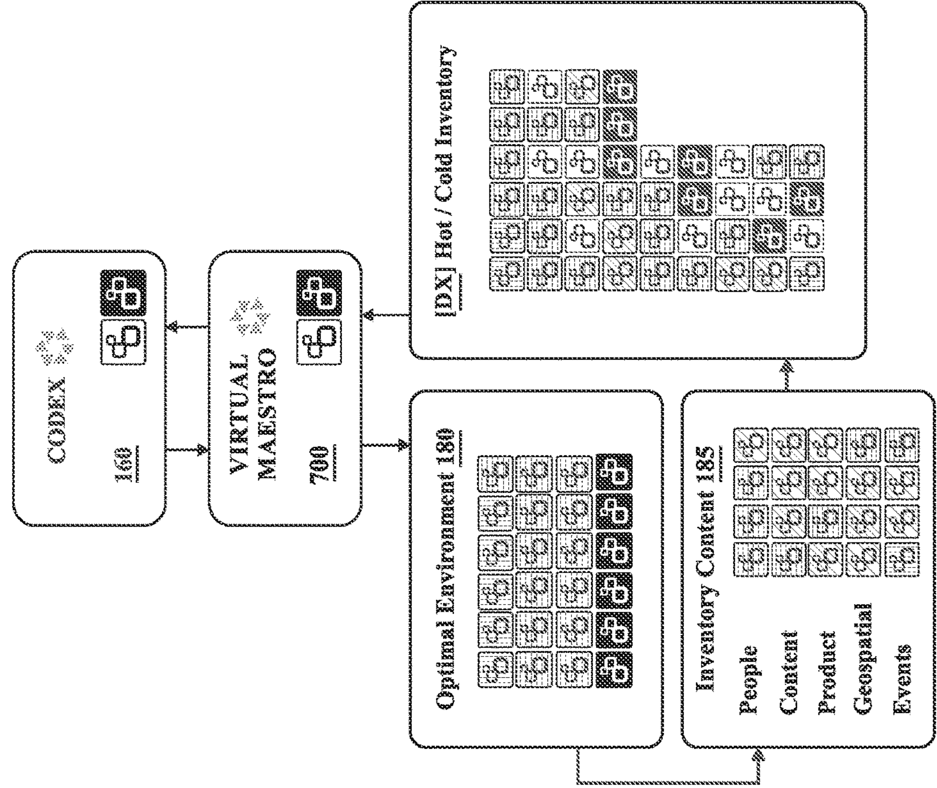

FIG. 9 End User and Virtual Maestro Historical Profiles

Figure 10:
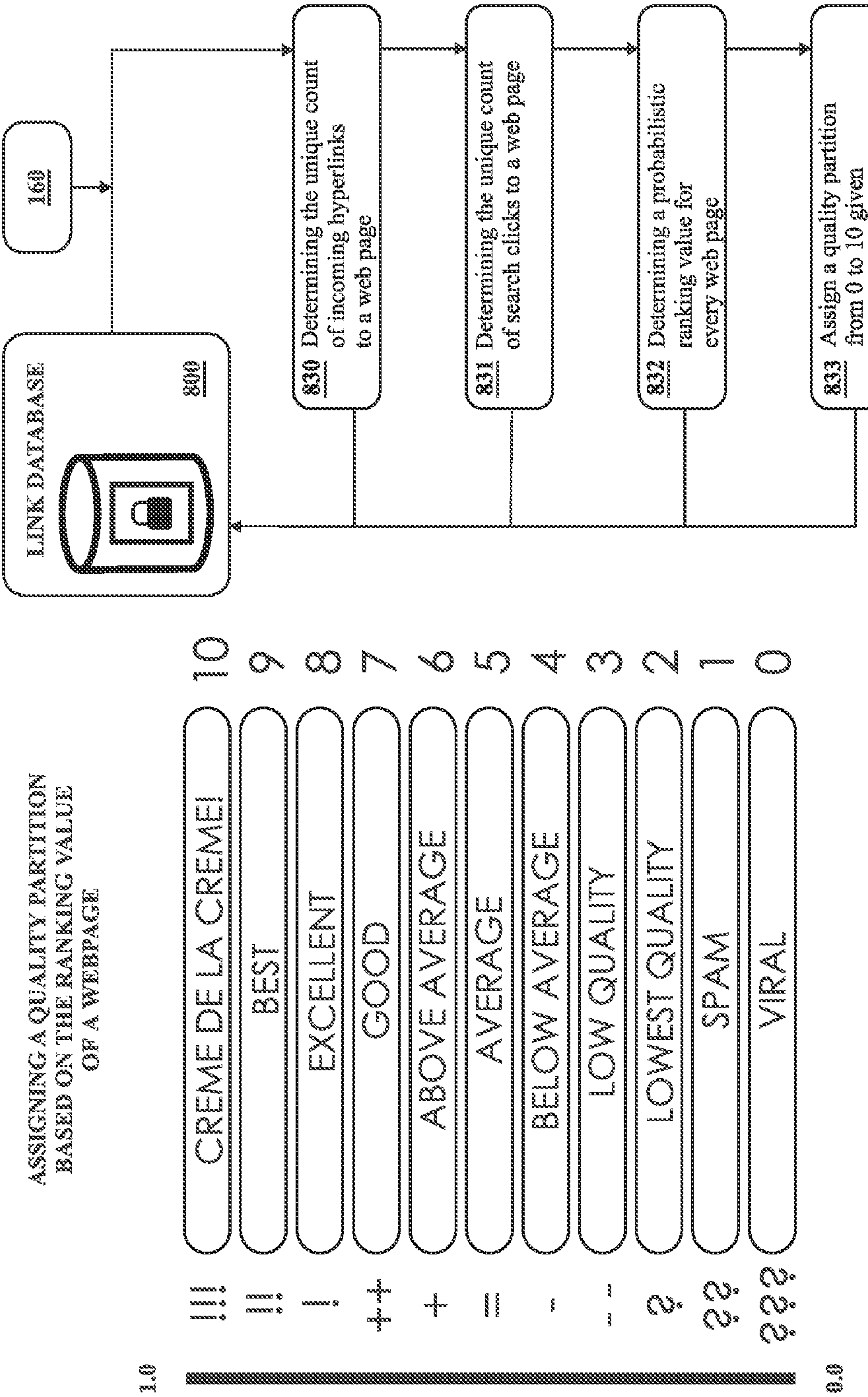

FIG. 10 Codex updates every End User and Virtual Maestro Profile.

Figure 11:
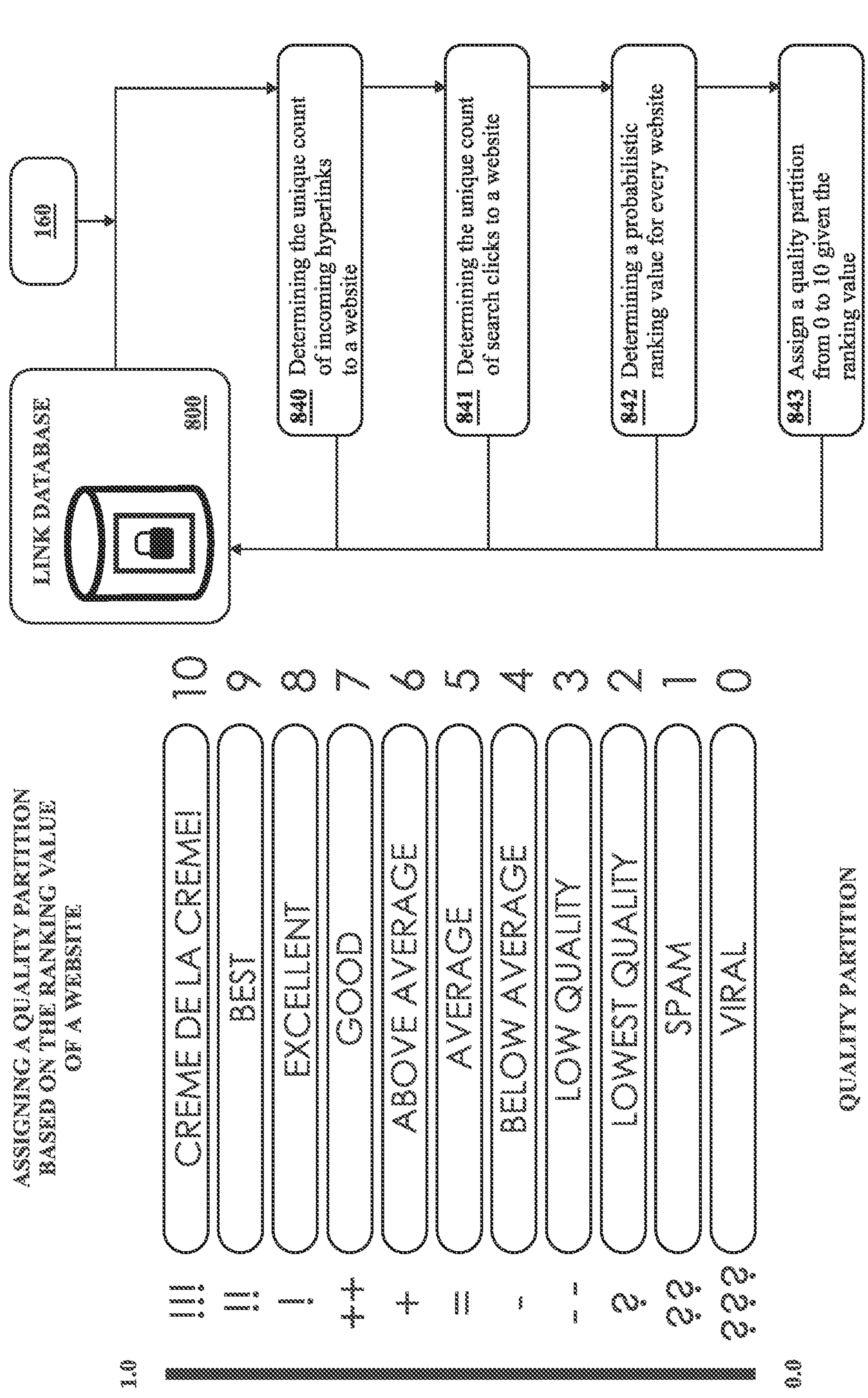

FIG. 11 Codex continuously updates each webpage with the link database

Figure 12:
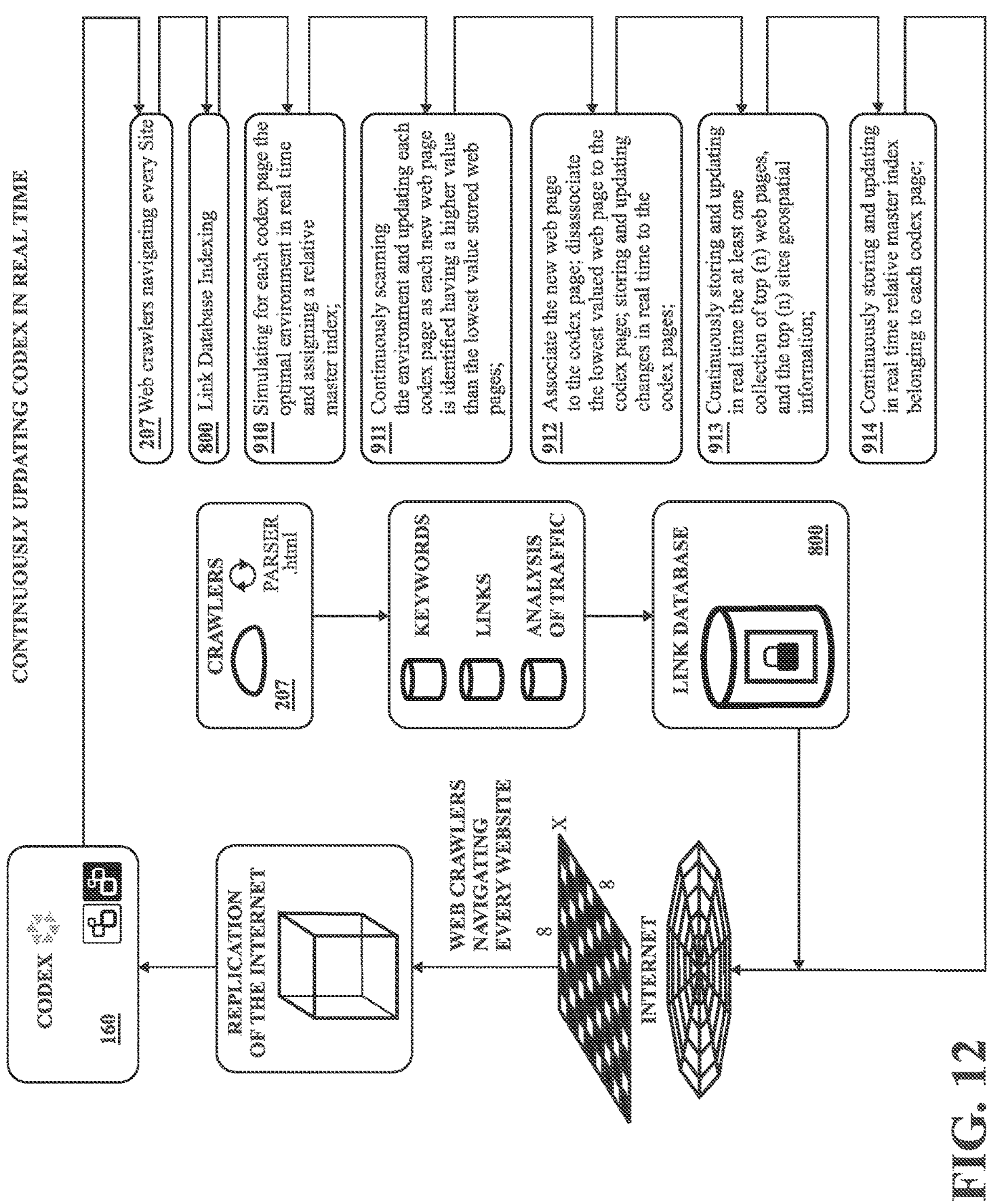

FIG. 12 Codex continuously updates each website with the link database

Figure 13:
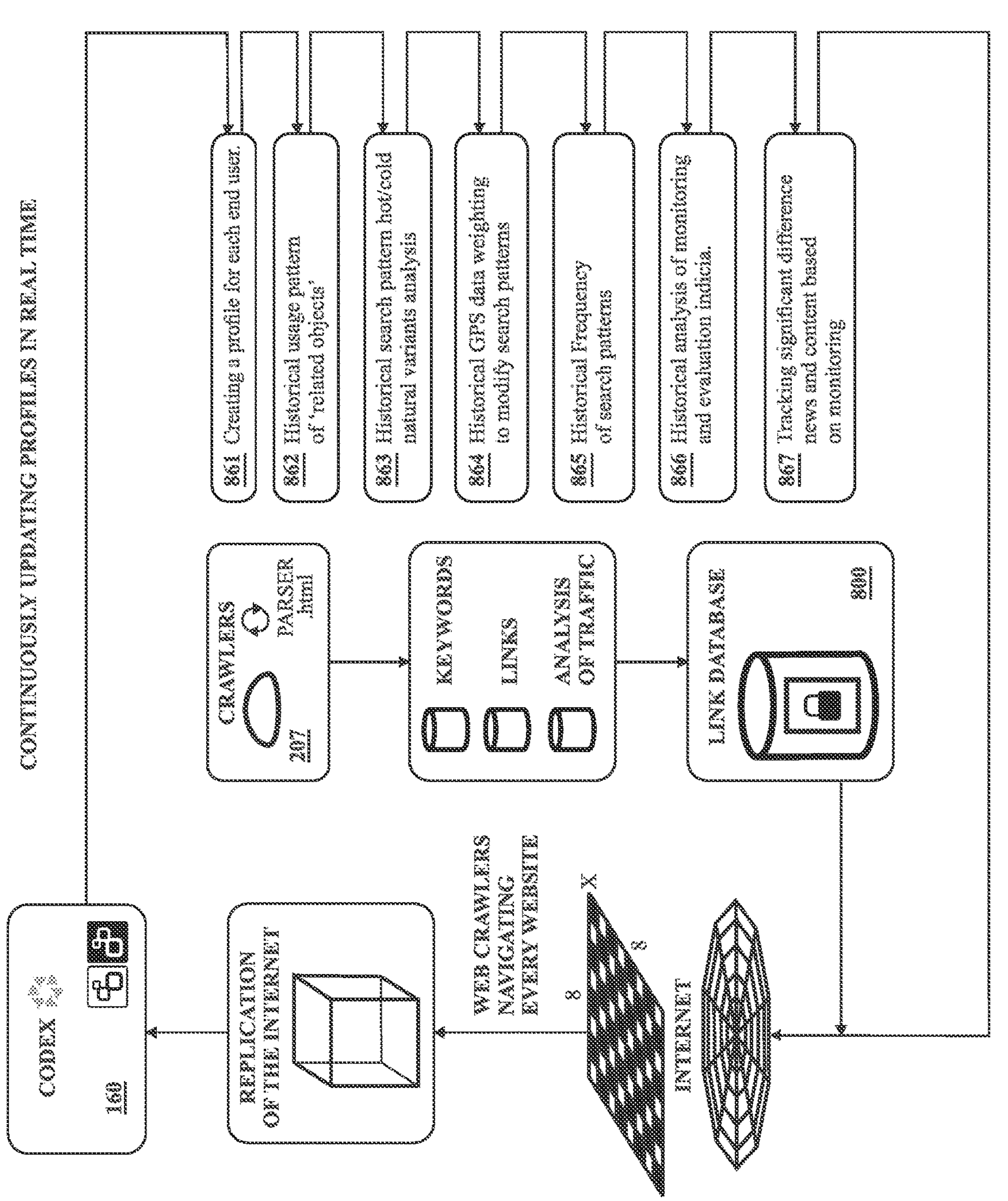

FIG. 13 Codex continuously updating profiles with the latest trending data

Figure 14:
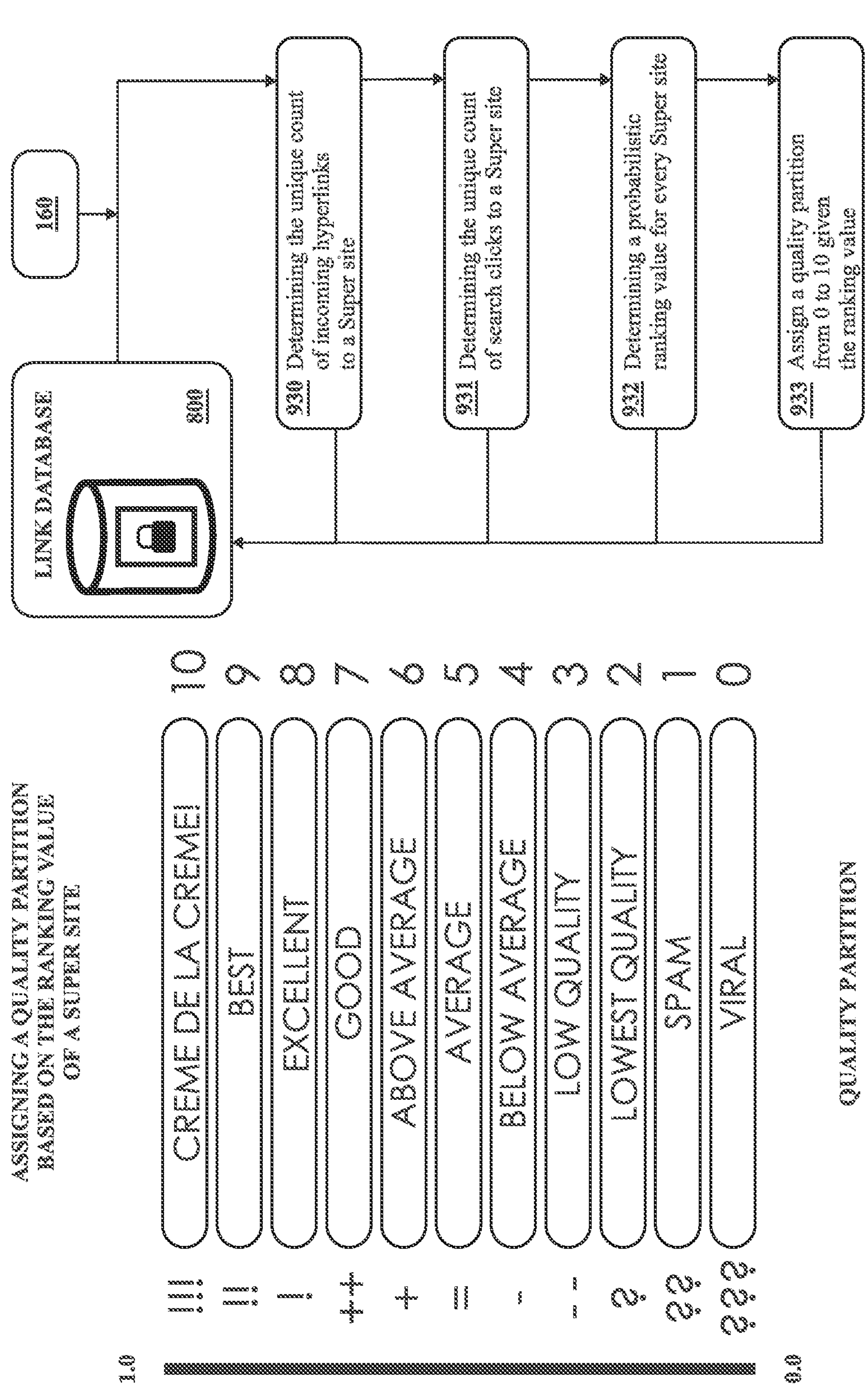

FIG. 14 Codex updates the link database as web crawlers navigating every supersite.

FIG. 15 Codex parses news, financial exchanges, social media interactions and trending data as human monitoring and evaluation indicia to update every supersite.

DETAILED DESCRIPTION

First Preferred Embodiment: Virtual Maestro Codex Search Patterns (U.S. Ser. No. 16/129,784)

Figure 1:
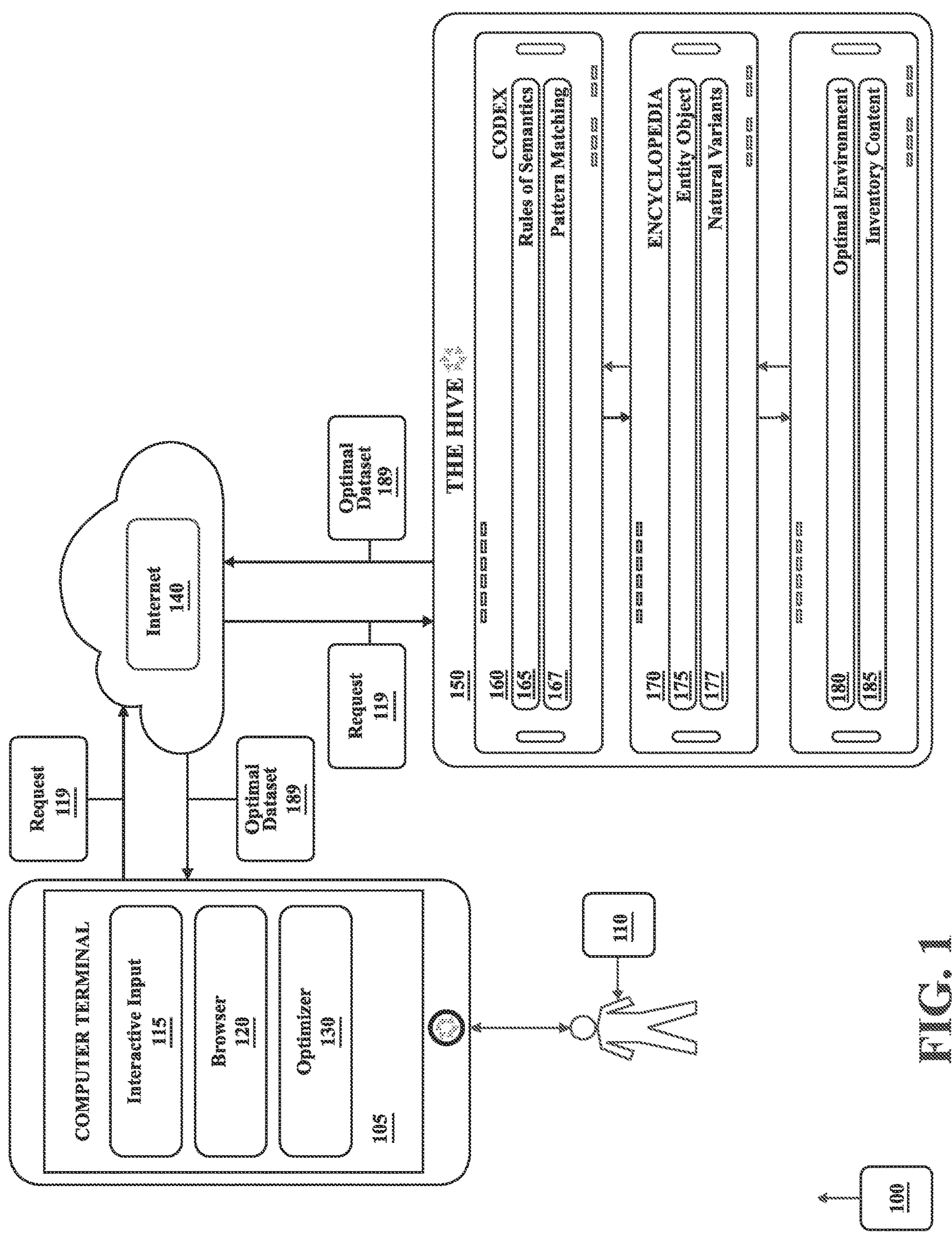
FIG. 1 Multilingual Search System

FIG. 1 Users 110 having a computer terminal or subscriber device 105, in digital communication with the Internet 140 and the Hive 150, a browser 120, and an artificial intelligence computer program 130 residing in memory executing a set of instructions to transform interactive input 115 into a request 119 using rules of semantics 165 to find missing gaps of information and pattern matching 167 the Codex 160 to find an Entity Object 175.

U.S. Pat. No. 7,809,659 teaches an Entity Object 175 is bound to a simple layer of refinement or Superset (I) upon removing redundancy of the searchable environment, and subordinated associative Entity Object 175 are bound to a hybrid layer of refinement or Set (I, J), and that each subordinated transitive Entity Object 175 are bound to a complex layer of refinement or Subset (I, J, K), where I, J and K are independent variables. The top weighted results become the optimal dataset 189 that becomes the output sent to users 110 computer terminal 105.

U.S. Pat. No. 7,809,659 teaches: W_RANK: Electronic Files, Internet links and the associated HTML content can be standardized, organized and transformed into geospatial information. W_RANK: uses eigenvectors to identify the value of each link and its content, and the system must normalize this information into a compatible Partial Vector CDR. The lion share of the conversion and normalization is done by the specialized programming of the system 150, which gathers, distills and analyzes the virtual environment by mapping, standardizing, organizing and transforming the information into logical groups and sets (knowledge graphs) to make them compatible and can also be personalized when using a historical end user profile.

U.S. Pat. No. 8,977,621 teaches the collection of relevant top pages becomes the optimal dataset 189 that probabilistically maps an optimal environment 180, and each page and portions thereof having relevance to the Entity Object 175, 177 becomes Inventory Content 185 that are offered as ADDITIONAL KEYWORDS (Suggestions) that aid the end user to reach the destination.

Figure 2:
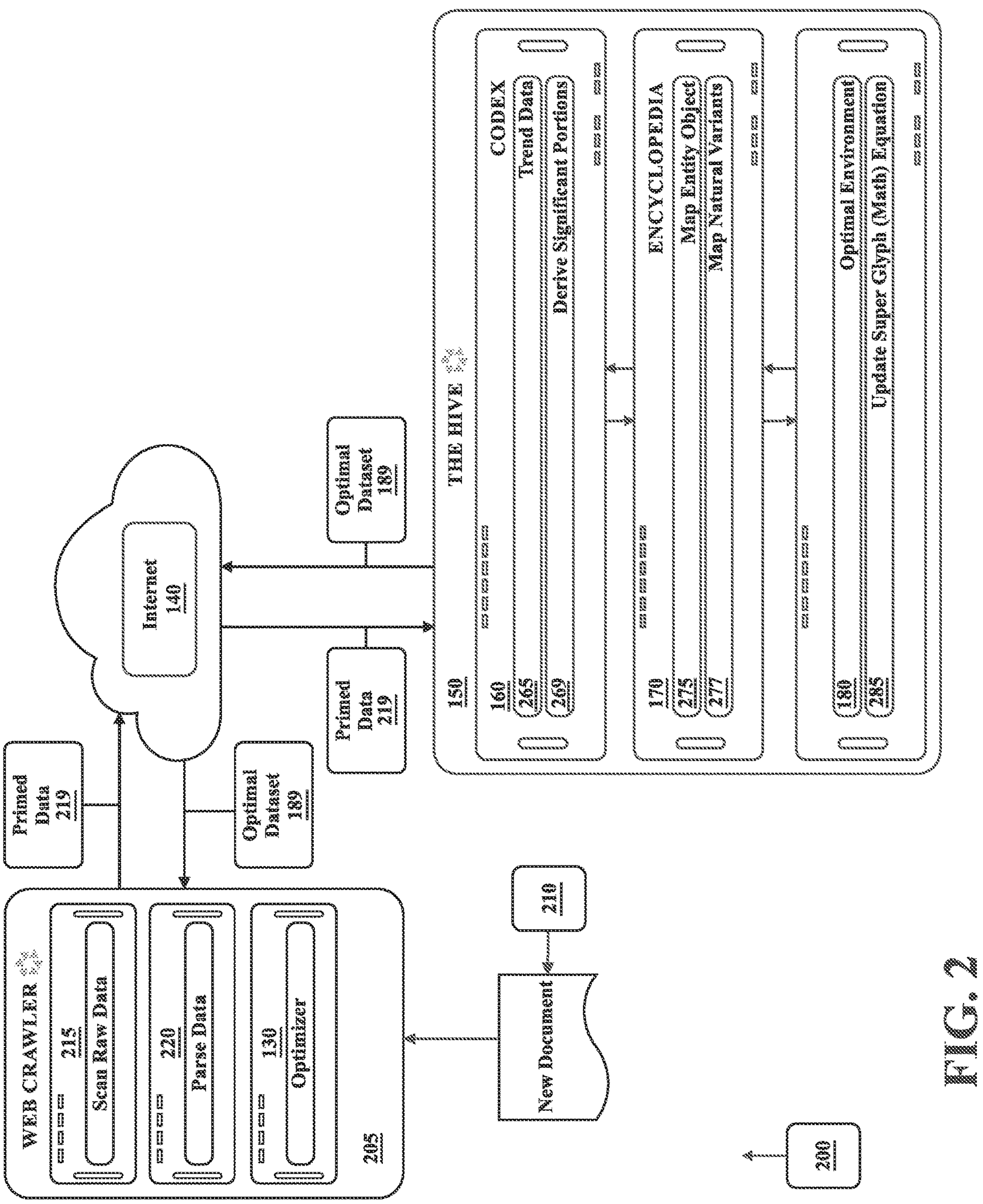
FIG. 2 Updating the Multilingual Human Knowledge Encyclopedia

FIG. 2 The Web Crawler sub system 200 continuously monitors and scans changes in the Internet 140, coordinating Web Crawlers 205, to identify new webpages 210 and then using an artificial intelligence computer program 130 to parse data 220 using rules of grammar and semantics to process, validate, verify, and cleanse raw data 215, into primed data 219 comprehensible for human monitoring and evaluation and sends the primed data to the HIVE 150.

U.S. Pat. No. 8,386,456 teaches the HIVE 150 continuously updates the Codex 160 with the primed data 219 to determine patterns of behavior or trend data 265 fluctuations that identify changes in the virtual environment and then derives significant portions 269 of the content to update in real time the Encyclopedia 170 and map entity objects 275 and subordinated layer of refinement natural variants 277. For each mapped (feature attributes and alternative suggestions) entity object 275, 277 belonging to a layer of refinement, the human knowledge encyclopedia 170 updates the corresponding optimal environment 180 and super glyph mathematical equation 285 is used to select the output that is sent to the end user. U.S. Pat. No. 7,809,659 teaches each (initial search query) entity object 275 has a join, simple, hybrid, complex and optimal layers of refinement, wherein the subject layers corresponding to the managerial hierarchical partition (alternative suggestions) sub partition for a given keyword search. And U.S. Pat. No. 7,908,263 teaches how to transform the keyword search into a mathematical *lingua* franca search pattern, and for each entity object corresponding layer of refinement the top (n) results become the optimal environment 180.

Figure 3:
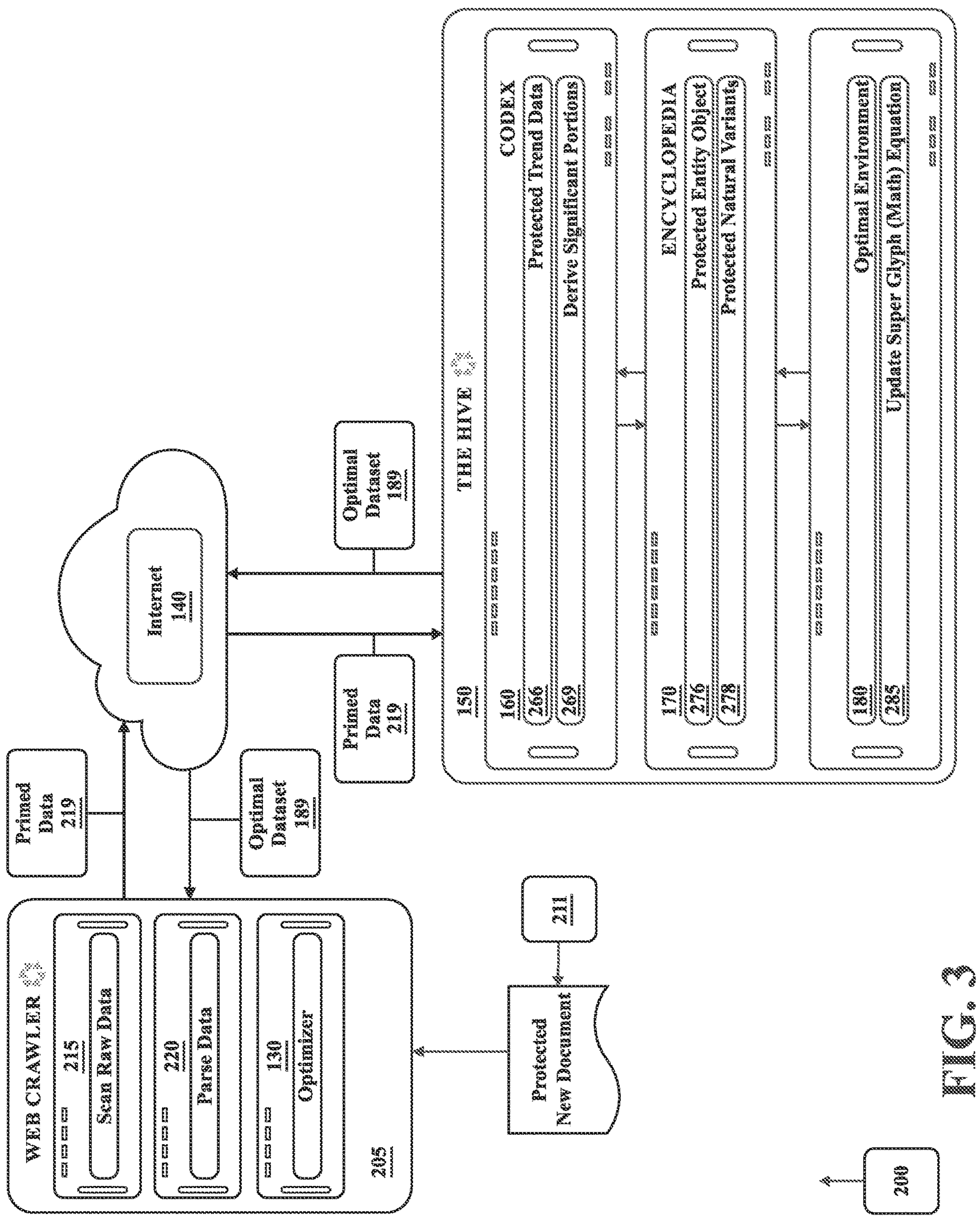
FIG. 3 Updating the Surveillance Human Knowledge Encyclopedia

FIG. 3 The Web Crawler sub system 200 continuously monitors and scans changes in the virtual environment or the Internet 140, coordinating a plurality of Web Crawlers 205, to identify protected New Documents 211 and then using an artificial intelligence computer program 130 to parse data 220 using rules of grammar to cleanse the raw data 215, into primed data 219 comprehensible for human monitoring and evaluation and sends the primed data to the Hive 150.

The Hive 150 continuously updates the Codex 160 inventory control system with the primed data 219 to determine patterns of behavior or protected trend data 266 fluctuations to identify changes in the Internet. Then derives significant portions 269 of the content to update in real time the Encyclopedia 170 and map protected entity objects 276 and subordinated layer of refinement protected natural variants 278. For each protected mapped entity object 276, 278 belonging to a layer of refinement the Encyclopedia 170 updates the optimal environment 180 and super glyph map equation 285 used to derive the output that is sent to the end user.

U.S. Pat. No. 7,809,659 teaches for each entity object 275 given a regular expression has a join, simple, hybrid, complex and optimal layers of refinement managerial hierarchical nested partitions for a given keyword search. U.S. Pat. No. 7,908,263 teaches transforms the keyword search into a mathematical lingua franca search pattern, and for each entity object corresponding layer of refinement the top (n) results become the optimal environment 180.

Figure 4:
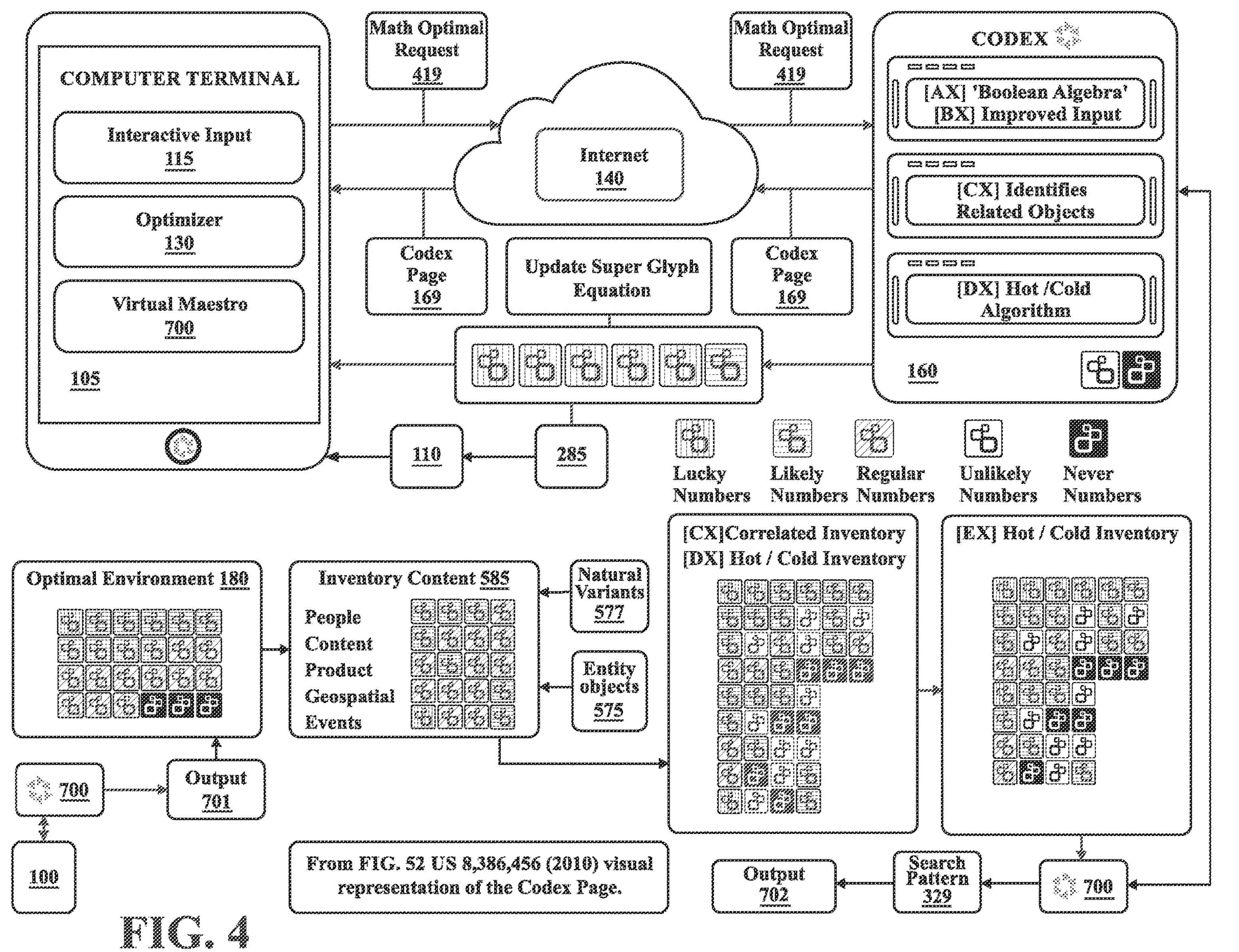
FIG. 4 Virtual Maestro transforming input and mapping Entity object
Figure 5:
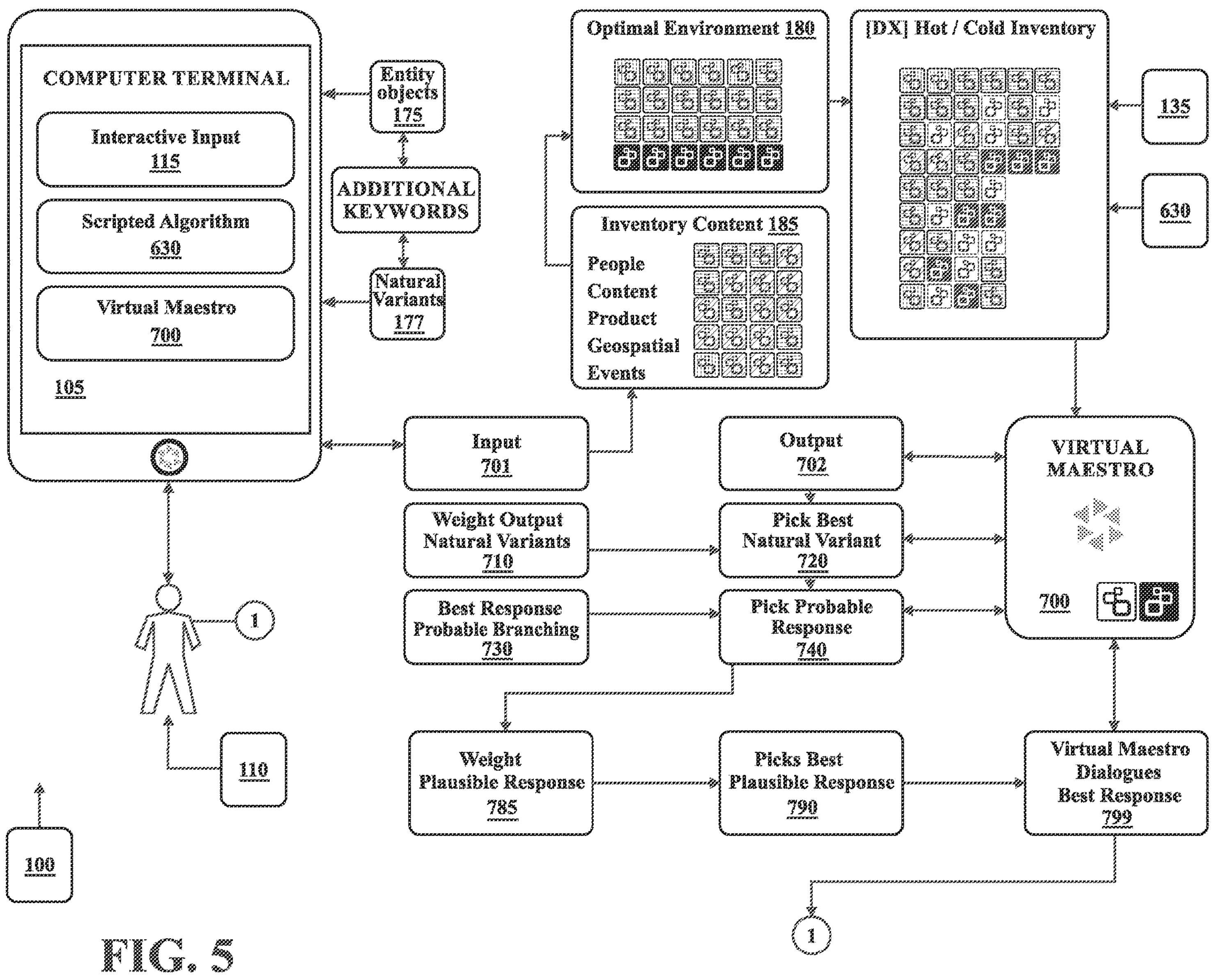
FIG. 5 Virtual Maestro proactively dialogues

FIG. 4 and FIG. 5 teaches how the Virtual Maestro continuously scans and gathers information from the virtual environment, and engages in a scripted dialogue with the end users, as it understands and is able to interact proactively thanks to the simulation input environmental bitmaps using the three samples approach is able to update an inverse ad hoc query as follows:

(A) Monitoring Learns, helps, assists and teaches how to find something specific.

(B) Reactive Smart input 4 independent variables by removes confounding elements.

(C) Proactive Personal input 5 independent variables and makes the user decision.

(D) Dialogue Direct input 6 independent variables engages in a dialogue as if alive.

FIG. 4 Virtual Maestro transforming input and mapping Entity objects. The Hive 150 based on the math optimal request 419 trending and monetary values of the probabilistic spatial environment maps commercial Entity Objects 575, and Natural Variants 577, which is how the bills are paid, and $3^{rd}$ parties compete to displays advertisements, creates a consolidated Inventory Control 585 comprising the Intertwining of ideas and concepts by gain factoring relevancy and attenuating irrelevancy and weighting input or commercial levels of satisfaction (needs) and interest (wants), demographic and geospatial data aiding the end user reach the final destination.

For each single request the Virtual Maestro 700 continues to update the Super Glyph (Mathematical) Equation 285 as the user continues to select Inventory Content 185 command instructions and dynamically measures a plurality of optimal environments. Performing as follows: $1^{st}$ [CX]: dynamically correlates 'Related Objects' belonging to the Input probabilistic spatial environment 701 and creates a dataset of commercialized Entity objects 575 and Natural Variants 577 offered as ADDITIONAL KEYWORDS that aid the end user to reach the destination.

$2^{nd}$ [DX]: performs Hot/Cold algorithm calculations of the related objects to identify Regular, Likely and Lucky probability entity objects variables that significantly improve a search pattern. $3^{rd}$ [EX]: Cherry picks the top probable combination from Inventory Content 185 from the Input probabilistic spatial environment 701. $4^{th}$ analyzes: each "as if the user has selected a particular" Codex Page 169 to enable data mining discovering. 5th the Scripted Algorithm 630 correlates: each Codex Page 169 and weights the Commercial Inventory Content 185. $6^{th}$: Virtual Maestro 700 continues to simulate input until a reaching combination that yields the destination.

FIG. 5 Virtual Maestro proactively dialogues executing a set of informatics using the Scripted Algorithm computer program 630 to determine the Best Probable Branching responses 730 and picks the Best Probable (Associative)

Response 740 to communicate with the user 110 based on the interactive input 115 as follows:

(A) When Interactive Input Offers Natural Variants 750

(B) When Assisted Input Communicates Best Response 760

(C) When Smart Input Communicates Best Response 770

(D) When Personalized Input Communicates Best Response 780

The Virtual Maestro 700 proactively dialogues executing a set of informatics using the Scripted Algorithm computer program 630 to Weight Plausible Responses 785 and Picks Best Plausible (Transitive or Nth) Responses 790 and updates the Output 702 based on its own deductive reasoning check mate decision of how to dialogue with the user 110 and now, based on the Nth or Best Plausible Response 790, the Virtual Maestro 700 knows the final destination (input and output) and can dialogue 799 with the user 110 'as if alive' or sentient!

The scripted algorithm computer program 630 measures the valid collection set of Inventory Content 185, (comprising of the simulation environment input (based on an individual, group of related people or trending data, demographics for advertisement means, or similarly same subject matter requests) entity objects 175 and associative and transitive collection of natural variants 177). For example, once an event occurs many people will ask the same question, or make comments that the virtual maestro 700 will transform into trending and demographic input data. Based on the knowledge of a given event and their interaction about the same, the virtual maestro 700 can probabilistically reverse engineer a trending high frequency response (output) made by the request of plurality set of users into a personalized dialogue to a specific individual.

Second Preferred Embodiment: Site Rank Codex Search Patterns

FIG. 6 Codex 160 continuously replicates, scans, scrubs, filters and distill data from the Internet and then updates 800 the link database with statistics of each resource, web page, website and supersite, and whether they are navigational or searchable. Determining unique source, non-duplicate, spam, viral and cookie trap content, and then parsing using rules of semantics each sentence, paragraph structure, and then verifying the meta keyword tags reflect the structure and semantics of the content and are not useless to the search. As the Codex continuously spawns 207 crawlers to web navigates the Internet, 209 reach each URL of a webpage, 230 determining if each webpage and associated 'related objects are navigational and store the latest information of each object into 800 the link database. Each 'related object' or resource, webpage or page, website or site, and supersite are objects.

Web crawlers 207 count unique incoming hyperlinks based on valid navigational URL (Uniform Resource Locator), and request Codex 160 data warehouses, for historical statistics 245 measuring traffic patterns and unique search clicks to URL belonging to a common denominator Website and Supersite. The Link Database 800 stores unique end user, virtual maestro, resources or 'related objects', web pages, websites or sites and super sites to determine SQL unique values when creating a table and SQL distinct values when updating a table. The Codex 260 ranks each supersite, site, and webpage with a probability (0.00 irrelevant to 1.00).

FIG. 7 Codex 160 updates 800 the link database as web crawlers 207 navigate every webpage. U.S. Pat. No. 7,908,263 teaches Artificial Intelligence Spiders or web crawlers 207 "consists of automated programs that are designed to continuously gather, distill and analyze the environment in real time. The program after gathering information identifies new content to the known environment. For each page the program determines if the file has been deleted, moved, updated or is new", then reads and parses documents to determine "SIGNIFICANT Data" that is deemed "NEW Data" or is identified as a change or "UPDATE Data" or modification of the URL as "MODIFY or MOVE" or the removal of an URL or "DELETE" when compared to the last version a web crawler navigated the webpage into 800 the link database. Codex 160 then 260 Ranks each webpage based on the "SIGNIFICANT DATA", on 242 the change in the count of distinct hyperlinks to 'related object' in the webpage and 247 change in the frequency of search clicks to 'related objects' in the webpages. Then requests the 160 Codex, to identify 249 each user searching each resource, webpage, website and super site, and identify navigational 270 user Search Patterns and relevant Natural Variants. Upon detecting "SIGNIFICANT Data" deemed and stored as comprehensible human monitoring and evaluation data into 800 the link database. "SIGNIFICANT Data" or significant portions of the web page is 269 is not included.

FIG. 8 Codex 160 updates 800 the link database as web crawlers 207 navigating every Site. U.S. Pat. No. 7,908,263 teaches the Artificial Intelligence Spiders or web crawlers 207 "consists of automated programs that are designed to continuously gather, distill and analyze the environment in real time. The program after gathering information identifies new content to the known environment. For every Site the program determines if a file has been deleted, moved, updated or is new", then reads and parses documents to determine "SIGNIFICANT Data" that is deemed "NEW Data" or is identified as a change or "UPDATE Data" or modification of the URL as "MODIFY or MOVE" or the removal of an URL or "DELETE" when compared to the last version a web crawler navigated the webpage into 800 the link database. Codex 160 then 260 Ranks each webpage based on the "SIGNIFICANT DATA", on 242 the change in the count of distinct hyperlinks to 'related object' in the webpage and 247 change in the frequency of search clicks to related objects' in the webpages. Then requests the 160 Codex, to identify 249 each user searching each resource, webpage, website and super site, and identify navigational 270 user Search Patterns and relevant Natural Variants. Upon detecting "SIGNIFICANT Data" deemed and stored as comprehensible human monitoring and evaluation data into 800 the link database, in order to adjust the values of the indices and thus updating real time responses. Detecting, cleansing and determining, "SIGNIFICANT Data" 269 or significant portions of data in the webpage is the primary objective of web navigating a Site 207, 209.

FIG. 9 End User and Virtual Maestro Historical Profiles. The 160 Codex and 700 Virtual Maestro for each search pattern determine 180 an optimal environment and the 185 inventory content of 'related objects' such as people, keywords in the content, products such as audio, video, and shopping cart items, geospatial such as addresses, ANI (or telephones) and events such as news, financial, and sporting trending monitoring and evaluation indicia, and then based on the [DX] Hot/Cold Inventory sample update the historical end user profile for each valid Codex Page hierarchical set of corresponding human monitoring and evaluation indicia, which in turn the virtual maestro stores to be able to track as significant inventory content 185.

FIG. 10 Assigning Quality partition based ranking value of a Webpage, the 160 Codex continuously updates the 800 Link Database upon 830 determining the unique count of incoming hyperlinks to a web page and 831 determining the unique count of search clicks to a web page in order to 832 determining a probabilistic ranking value for every web page and then 833 assign a quality partition from 0 to 10 given the webpage ranking value.

FIG. 11 Assigning Quality partition based ranking value of a Website, the 160 Codex continuously updates the 800 Link Database upon 840 determining the unique count of incoming hyperlinks to a web page and 841 determining the unique count of search clicks to a web page in order to 842 determining a probabilistic ranking value for every web page and then 843 assign a quality partition from 0 to 10 given the website ranking value.

FIG. 12 Codex updating each codex page in real time trending data, The Codex 160 upon updating the Link database performs the following tasks: 1$^{st}$: 801 simulating for each codex page the optimal environment in real time and assigning a relative master index. 2$^{nd}$: 802 continuously scanning the environment and updating each codex page as each new web page is identified having a higher value than the lowest value stored web pages. 3$^{rd}$: 803 associates the new webpage and 'related objects' to the codex page and disassociate the lowest valued web page to the codex page and stores and updates changes in real time to the codex pages. 4$^{th}$: 804 continuously stores and updates in real time the at least one collection of top (n) web pages, and the top (n) sites geospatial information and 5$^{th}$: 805 continuously stores and updates in real time relative master index belonging to each codex page and then updates all the profiles.

FIG. 13 Codex continuously updating profiles with the latest trending data. The Codex 160 upon finding significant difference trending data performs the following: First: 821 After each search updates the profile for each end user and virtual maestro. Second: 822 calibrates historical usage pattern of 'related objects' Third: 823 weights historical search pattern hot/cold natural variants analysis. Fourth: 824 updates historical GPS data weighting to modify search patterns. Fifth: 825 determines historical frequency of search patterns. Sixth: 826 performs historical analysis of monitoring and evaluation indicia. Finally: 827 Tracks significant difference news and content based on monitoring to keep all profiles current.

FIG. 14 Assigning Quality partition based ranking value of a Supersite, the 160 Codex continuously updates the 800 Link Database upon 840 determining the unique count of incoming hyperlinks to a supersite and 841 determining the unique count of search clicks to a supersite in order to 842 determining a probabilistic ranking value for every supersite and then 843 assign a quality partition from 0 to 10 given the supersite ranking value.

FIG. 15 Codex parses news, financial exchanges, social media interactions and trending data as human monitoring and evaluation indicia to update every supersite upon performing the following task: 1$^{st}$: 806 determining at predefined time intervals the total number of web pages in the codex and for each codex page in its chain of command. 2$^{nd}$: 807 determining at predefined time intervals the total number of significant difference changes in the Internet and then revaluing each site that updated one of its top ranked (n) web pages. 3$^{rd}$: 808 cleansing or purifying data, mapping and plotting each element of the old master index into the new master index using the content value of the relative master index of the highest vector valued codex page. 4$^{th}$: 809 continuously creating, storing, synchronizing and updating in real time the new master index that reflect the latest condition of the environment that is derived from the continuously detected significant changes and adjustments made to the codex. 5$^{th}$: 899 Cleansing or purifying data, transforming and updating new master index and in turn the codex and the entire chain of command of codex pages. Once the Codex 160 creates a new master index and has all the relevant codex pages chain of command relative master indices, 800 the link database is able to attenuate using join SQL queries to remove from calculation websites and super site that are below the first threshold, the marks anything that fails the test as irrelevancy. Finally, using join SQL queries to 'cherry picking' from the output websites and super site that are above the Nth threshold, the marks anything that passes the test as la crème de la crème or optimal website.

First Preferred Embodiment: Virtual Maestro Codex Search Patterns (U.S. Ser. No. 16/129,784)

Example 1. Virtual Maestro 700 as a Customer Service Representative: U.S. Pat. No. 7,058,601 teaches "the virtual environment optionally includes an internet chat room which provides real time communication among multiple users and between users and a broker". U.S. Pat. No. 9/819,174 teaches "the virtual maestro is a product of artificial intelligence, since it would be impractical to provide a real person to process personal selections for each subscriber. The virtual maestro is represented by a virtual image, either of Beethoven or Mozart, in the virtual concert hall and will play specific song or video requests of an individual subscriber, on a pay per view basis. The profile is assembled from information the subscriber provides to become a subscriber and from a history of selections made by the subscriber through the system, and the profile is in effect how the particular subscriber is clothed in the virtual world."

The interaction between two humans not speaking the same language is buffered by the Virtual Maestro 700 using the Scripted Algorithm 630 formatted communications. Pierre speaks in French, the input is formatted into a script in the English (business *lingua* franca) and French, customer service receives the English script and the point of sale is populated by the artificial intelligence using the users profile information, the representative responds in English, the text is sent to Pierre's Virtual Maestro 700 that responds with a texted response in French. The transaction, trouble ticket or request for help is made between two humans not speaking in the same language (nor are they required to understand or speak both) using the Virtual Maestro 700 to be the medium of their communication. It is the object of the present invention to improve the Virtual Maestro 700 to act as a multilingual Customer Service Representative using Big Data.

Example 2 Virtual Maestro 700 Acts as a Optimizer Communication Medium: The user 110 using a computing terminal 105 with a Virtual Maestro 700 in memory that executes informatics to transform the input 115 into a search pattern 329, and searches the Encyclopedia 170 to find the Codex Page 169, with the corresponding optimal dataset. In parallel the Virtual Maestro 700 receives the text information and communicates the highest valued reference source to the user 110. As the user 110 types or speaks "TIGER" the Virtual Maestro 700 uses the Script_Say(TIGER, "en.wikipedia.org"), to speak over the audio devices or as text "The tiger (*Panthera tigris*) is the largest cat species, most recognizable for their pattern of dark vertical stripes on reddish-orange fur with a lighter underside. The species is classified in the genus *Panthera* with the lion, leopard, and jaguar", and offers images and videos of a TIGER, and also Panther, Lion, Leopard, and Jaguar, as additional keyword 175,177.

Example 3: Virtual Maestro 700 multilingual communication: the end user searches for an incomplete search such as "THE" using the GIGO mantra the optimizer improve the quality from (???) to (?!) by matching the request to the English grammar meaning of a definition, which can then be used to respond in an language using similarly same semantics constructs such as Script_Say ("DUDE", ENGLISH, USA), or Script_Say ("GUEY", SPANISH, MEX). The Virtual Maestro 700 selects the best content to communicate with the user.

Example 4. Advertisement Surveillance each time the Virtual Maestro 700 determines an user 110 wants to view or listen to licensed protected data such as audio or video, the software runs a script to determine if available credits exists to purchase licensing of the digital files or products, or alternatively using purchasing patterns, demographics and profile and social network characteristics can offer personalized, the system 100 offers the user 110 credits for mass media or automatically embedded advertisements for the purchase of licensed product.

Example 5. Transactional Surveillance each time the Virtual Maestro 700 determines an user 110 has decided to perform a licensed transaction to view or listen protected data such as audio or video, the software runs a script to uses available credits or monies to purchase licensing of the digital files or products, or alternatively using purchasing patterns, demographics and profile and social network characteristics can offer personalized, mass media or automatically embedded advertisement to pay the licensee royalties or purchase product.

Example 6. Virtual Maestro creates the Input Spatial Environment: the user 110 performs a valid search 1. "AMERICAN CIVIL WAR" and Superset (I) and the Virtual Maestro 700 identifies the type of search as assisted input, and maps an input spatial environment using US History, in particular events that occurred between 1861 and 1865, where geospatial data is USA and a list of valid States such as Virginia or Maryland. At this point, the encyclopedia subject events that belong to the historical events such as the Siege of Vicksburg, Battle of Gettysburg, or President Abraham Lincoln are probabilistically mapped as Input that can be offered to the user 110 using the benefit of U.S. Pat. No. 7,809,659 FIG. 80 as additional keywords or Entity Object 175 and Natural Variants 177 that can aid in reaching the final destination.

For each entity object 175,177 associated to the concept and idea "American Civil War" the Virtual Maestro 700 searches the system using probable branching any nested transitive command decision, assuming the entity object will be selected by the end user. Each associative and transitive entity object is probabilistically mapped as the Input Spatial Environment 701.

Example 7. Virtual Maestro creates the Output Spatial Environment: the end user searches 1. "AMERICAN CIVIL WAR" as Superset (I), and the Virtual Maestro 700 identifies the search as assisted input or scripted as Is Assisted. Upon building the Input Spatial Environment 701 the Virtual Maestro 700 executes software instructions using the scripted algorithm 630 and database to determine the best way to communicate with the end user.

Using the basic Script Say: the system 100 determines the end user 110 search is an assisted input and exists and possesses a preprocessed and precalculated Codex Page 169 and corresponding optimal dataset 189. The Virtual Maestro 700 identifies the content paragraph that maps probabilistically the first independent variable Superset ("AMERICAN CIVIL WAR") as the response and probable encyclopedia subject subordinates as J the 2nd independent variables Set ("Siege of Vicksburg, 1863"), ("Battle of Gettysburg", 1863) and (US President (Abraham Lincoln, "1861-1865) to name a few. Then maps probable branching entity objects 175 best responses for each Set ("American Civil War", J), as K subordinate probable branching Natural Variants 177 Subset ("American Civil War", J, K) as the Output Spatial Environment, such as J being Set ("Battle of Gettysburg", 1863) and K as Subset ("Pickett's Charge", July 3,1863).

The output using the benefit of U.S. Pat. No. 8,676,667 that index refines to the Nth has preprocessed and precalculated the probability of each response belonging to the output, and using the benefit of U.S. Pat. No. 8,386,456 incorporates as the output the best response for each entity object 175,177 belonging to the Output Spatial Environment 702. The first best response or personalized dataset 199 is determined by Scripted Algorithm 630 using the end user's profile, and the latest values of the Hot/Cold Super Glyph equation, where Hot denotes relevant and trending ideas that are gained factored, and Cold denotes irrelevant and no longer valid based on the personalized vectors such as relevant GPS coordinates that are attenuated. The Virtual Maestro 700 uses the Output Spatial Environment 702 to communicate with the end user 110.

Example 8. The Virtual Maestro dialogues using the Input Spatial Environment: The end user searches 1. "AMERICAN CIVIL WAR", then adds by selecting 2. BATTLE OF GETTYSBURG, then adds by selecting "PICKETT'S CHARGE, then add by selecting 4. "HISTORICAL QUOTE", and the Virtual Maestro 700 identifies the type of session as personal input. Where, the independent variables are as follows: I="AMERICAN CIVIL WAR", J="BATTLE OF GETTYSBURG", K="PICKETT'S CHARGE", and L="HISTORICAL QUOTE", and with the valid geospatial data US, PA, Gettysburg, Jul. 3, 1863.

In this, case the end user built using the "AMERICAN CIVIL WAR" and then by selecting additional keywords, to map the different layers of refinement (Simple, Hybrid, Complex and Answer) General Pickett informing his commanding officer "General Lee I have no division", Example 9. The Virtual Maestro dialogues using Output Spatial Environment: the end user searches 1. "WAL-MART", then the virtual maestro using the GPS coordinates from the subscriber device adding 2. US, Florida, North Miami Beach, 33160, and the Virtual Maestro 700 identifies a smart search and renders a map based on the closest stores (A, B and C).

Example 10. Virtual Maestro helps to eliminate confounding elements of the search: continuing with Example 17. the Virtual Maestro 700 dialogues using the Script Verify Location. First, determines using GPS of the interface device to know the user's present location, home or office, in this example from the user's home. Second, creates a dialogue based on the user's profile and present location the most probable stores selecting A and C. Third, the Virtual Maestro 700 dialogues with the user, asking: Are going to Store A or Store C from your present location? The user says Yes, from here to Store C. Alternatively, No, from my office to Store B. The dialogue with the user's help eliminates the confounding elements of the search!

Second Preferred Embodiment: Site Rank Codex Search Patterns

Example 11: Creating the searchable environment: The end user makes a request that is transformed into a search pattern. The Codex 160 using 800 the link database counts any webpage and resource where the search pattern condition is true. Using simplified numbers, marketing, the searchable environment has 100,000,000 valid resources. The searchable environment is described as a zero significant difference gamma factor equation (n−1!)−(n−6)!)/6!

Example 12: Creating the improve environment: The Codex 160 using 800 the link data base calculating any webpage and resource where the search pattern condition is true and valid and the website value is greater than first threshold. Using simplified numbers, marketing, the improved environment has 10,000,000 valid resources. To those in the art the improved environment is described as a $1^{st}$ significant difference gamma factor equation ((n−1!)−(n−6)!)/5!

Example 13: Creating the $1^{st}$ intermediate reduction calculation: The Codex 160 using 800 the link data base calculating any webpage and resource where the search pattern condition is true is valid and the website value is greater than first threshold. Then using human knowledge performs the $1^{st}$ intermediate reduction calculation using subject matter as the second threshold test to the search Using simplified numbers, marketing, the improved environment has 1,000,000 valid resources. To those in the art the $1^{st}$ intermediate reduction calculation is described as a $2^{nd}$ significant difference gamma factor equation ((n−2!)−(n−6)!)/4! It is the object of the present invention to improve over U.S. Pat. No. 7,809,659 teaching the $1^{st}$ intermediate reduction calculation using subject matter is how to build a Simple Subject Layer of refinement.

Example 14: Creating the $2^{nd}$ intermediate reduction calculation: The Codex 160 using 800 the link data base calculating any webpage and resource where the search pattern condition is true is valid and the website value is greater than first threshold. Then using human wisdom performs the $2^{nd}$ intermediate reduction calculation using subject matter as the third threshold test to the search using simplified numbers, marketing, the improved environment has 10,000 valid resources. To those in the art the $2^{nd}$ intermediate reduction calculation is described as a $3^{rd}$ significant difference gamma factor equation ((n−3!)−(n−6)!)/3! It is the object of the present invention to improve over U.S. Pat. No. 7,809,659 teaching the $2^{nd}$ intermediate reduction calculation using subject matter how to build a Hybrid Subject Layer of refinement.

Example 15: Creating the $3^{rd}$ intermediate reduction calculation: The Codex 160 using 800 the link data base calculating any webpage and resource where the search pattern condition is true is valid and the website value is greater than first threshold. Then using human understanding performs the $3^{rd}$ intermediate reduction calculation using subject matter as the fourth threshold test to the search using simplified numbers, marketing, the improved environment has 100 valid resources. To those in the art the $3^{rd}$ intermediate reduction calculation is described as a $4^{th}$ significant difference gamma factor equation ((n−4!)−(n−6)!)/2! It is the object of the present invention to improve over U.S. Pat. No. 7,809,659 teaching the $3^{rd}$ intermediate reduction calculation using subject matter how to build a Complex Subject Layer of refinement.

Example 16: Creating the nth intermediate reduction calculation: The Codex 160 using 800 the link data base calculating any webpage and resource where the search pattern condition is true is valid and the website value is greater than first threshold. Then using human discernment performs the nth intermediate reduction calculation using subject matter as the nth threshold test to the search using simplified numbers, marketing, the optimal environment that has 100 valid resources. To those in the art the nth intermediate reduction calculation is described as a 5th significant difference gamma factor equation ((n−5!)−(n−6)!)/1! It is the object of the present invention to improve over U.S. Pat. No. 8,676,667 teaching nth intermediate reduction calculation using subject matter how to build an Answer Subject Layer of refinement.

Example 17: Using the nth intermediate reduction calculation to cherry pick la crème de la crème: The Codex 160 using 800 the link database performed a set of intermediate reduction calculating using the interactive input search pattern from the end user. To those in the art the interactive search pattern is the (I) or input, and the subject matter or(S) intermediate reduction calculations are better improvement using human knowledge, wisdom, understanding and discernment. To those in the art(S) subject matter describes (T) topicality scores. Once the Codex 160 performs all the neural network calculations to the nth, the output is sent to the 'Cherry Picking' process of the 700 Virtual Maestro weights 185 inventory content of 'related objects' such as people, keywords in the content, products such as audio, video, and shopping cart items, geospatial such as addresses and ANI (or telephones) and events such as news, financial, and sporting trending monitoring and evaluation indicia, and then based on the [DX] Hot/Cold Inventory sample update the historical end user profile for each valid Codex Page hierarchical set of the human monitoring and evaluation indicia being tracked selects la crème de la crème. To those in the art la crème de la crème is the destination or optimal response given the REGEX.

Example 18: From input to search pattern to la creme de la creme: Using the benefit of U.S. Pat. No. 7,809,659 subject layers of refinement, U.S. Pat. Nos. 7,908,263, 8,868,535, 8,977,621 gamma factor mathematics, U.S. Pat. No. 8,386,456 Codex and U.S. Pat. No. 9,355,352 personalized results starting from interactive input "AMERICAN CIVIL WAR" to the optimal dataset as follows:

ZSD searchable environment has 100,000,000 valid resources everything is 'Boolean' valid.

FSD improved environment has 10,000,000 attenuated spam and duplicates.

SSD improved environment has 1,000,000 attenuated using human knowledge.

TSD improved environment has 10,000 attenuated using human wisdom.

QSD improved environment has 100 attenuate using human understanding.

PSD optimal environment has 10 attenuate using human discernment.

HSD optimal response has 1 or la crème de la crème upon 'Cherry Picking the output.

Codex Search Patterns 2020

Big Data Indexing: Codex Search Patterns is now updated based on Big Data Indexing as follows "Big data is a field that treats ways to analyze, systematically extract information from, or otherwise deal with data sets that are too large or complex to be dealt with, by traditional data-processing application software. Data with many cases (rows) offer greater statistical power, while data with higher complexity (more attributes or columns) may lead to a higher false discovery rate. Big data challenges include capturing data, data storage, data analysis, search, sharing, transfer, visualization, querying, updating, information privacy and data source. Big data was originally associated with three key concepts: volume, variety, and velocity."

Rule 1: Volume: "The quantity of generated and stored data."

Rule 2: Velocity: "The speed at which the data is generated and processed to meet the demands and challenges that lie in the path of growth and development."

Rule 3: Veracity: "It is the extended definition for big data, which refers to the data quality and the data value."

Rule 4: Value: "The utility that can be extracted from the data."

Rule 5: Variability: "It refers to data whose value or other characteristics are shifting in relation to the context they are being generated." en.wikipedia.org Rule 6: The volume is massive and complex since it is the Internet.

Virtual Maestro as an Interface Device

Rule 7: The Codex has real time velocity, where 95% of the responses and the lion share of the remaining responses occur under 1 second, and humanlike scripted communications and dialogue interaction execute software instruction with delays in the seconds.

Rule 8: The Codex Encyclopedia and subject layers of index refinement describe veracity making sure that geospatial and semantics consistency exists in the best responses.

Rule 9: Each resource is assigned, a Supersite rank, site rank probability value in an order from highest to lowest, where Supersite rank is used to identify of the quality value of la crème de la crème and Site rank is used to attenuate viral, spam and duplicates as irrelevancy.

Rule 10: Search Patterns measure usage patterns of behavior, trending and live human monitoring and evaluation indicia, which describes to those in the art variability.

Evolving System Equivalencies

Rule 11: Virtual environment using the benefit of U.S. Pat. No. 9,355,352 The evolving fuzzy system can be describes as: (EFS) can be defined as self-developing, self-learning fuzzy rule-based or neuro-fuzzy systems that have both their parameters but also (more importantly) their structure self-adapting on-line. They are usually associated with streaming data and on-line (often real-time) modes of operation. In a narrower sense they can be seen as adaptive or evolving fuzzy systems. The difference is that evolving fuzzy systems assume on-line adaptation of system structure in addition to the parameter adaptation, which is usually associated with the term adaptive or evolving. They also allow for adaptation of the learning mechanism. Therefore, evolving assumes a higher level of adaptation of a virtual environment.

Rule 12: Virtual Metadata can be described as; "is structured information that describes, explains, locates, or otherwise makes it easier to retrieve, use, or manage an information resource. Metadata is often called data about data or information about information." "An important reason for creating descriptive metadata is to facilitate discovery of relevant information. In addition to resource discovery, metadata can help organize electronic resources, facilitate interoperability and legacy resource integration, provide digital identification, and support archiving and preservation." Virtual Metadata serves the same functions in resource discovery as good cataloging does by allowing resources to be found by relevant criteria; identifying resources; bringing similar resources together; distinguishing dissimilar resources and giving location information."

Rule 13: Virtual Jesus: supercomputer command intelligent data warehouses, that transform input into a question and then search based on subject matter to improve the responses. The 2020 version is referred hereinafter as Virtual da Vinci 900 that is ubiquitous and does not makes responses in "red font" as describing the divinity and omnipresence of our Lord Jesus Christ. The magnifico instead transforms input into a search pattern with vector components such as geospatial, human knowledge, wisdom, understanding and discernment to make the search pattern into a high-quality question-answer response, where answers are communicated audibly.

Environment and Statistical Object Definitions

Rule 14: Internet environment: comprises all of the 'related objects', webpages, sites and super sites that are navigational in the latest master index.

Rule 15: Searchable environment: comprises all navigational 'related objects', webpages, sites and super sites given the search pattern a map a Superset (U) or ZSD.

Rule 16: Improved environment: comprises all navigational 'related objects', webpages, sites and super sites given the search pattern a map a Superset (I) or SSD upon removing duplicates and using Site Rank to remove spam, viral content and redirection threats.

Rule 17: Relevant environment: comprises the first sample or the square root of the size of the searchable environment, that is stored as the Superset (I) partial master index Rule 18: Subject Matter: comprises searching using data warehousing using business intelligence, statistical analysis and big data indexing of each valid Codex Page and hierarchical set of natural variants.

Rule 19: Codex Page is the Superset given the search pattern 180 that comprises the searchable environment, that is attenuated/gain factored by Site ranking probabilities and further adjusted when corporate organization have Super ranking probabilities and real time news and exchange human monitoring and evaluation indicia, or alternatively social media, trending and reference subject matter collections data values.

Rule 20: Super Sites are continuously updated as real time news events and financial exchange information is processed into primed data human monitoring and evaluation indicia Rule 21: Super Sites data is primed into human monitoring and evaluation indicia by web crawlers and the Virtual Da Vinci 900 upon receiving the primed data compares to social media, trending and reference subject matter collections data values to automatically update virtual maestros 700 that are tracking what is the craving need and of interest to the end user.

Rule 22: Natural Variants 720 are Superset ($I_n$) given the search pattern that comprises valid subject matter associative attributes using rules of semantics, when big data indexing.

Rule 23: Probable Responses 740 are the Set ($I_n$, $J_o$) given the search pattern that comprises probable associative attributes using rules of semantics, when big data indexing.

Rule 24: Plausible Responses 790 are the Subset ($I_n$, $J_o$, $K_p$) given the search pattern that comprises probable associative attributes using rules of semantics, when big data indexing.

2020 Virtual Maestro and Virtual Da Vinci Expanding Big Data Indexing

Rule 25: 'Vueno, Vonito y Varato', Spanglish marketing term, the evolving system must be good (informational certain), real time quality data and cheap or inexpensive to produce.

Rule 26: Vim the virtual maestro is programmed to have vim, is no longer an interface device that monitors interactively input into a search pattern. Now, with vim or full of energy the virtual maestro continuously scans, gathers, cleanse, verifies, validates, distills and primes data and also tracks subject matter patterns, trending, social media, news, sport and entertainment events and financial exchanges data to communicate with the end user. Vim is what the evolving system intelligence ambience emulates to behaves as if a living organism.

Rule 27: Vigor the virtual maestro is programmed to have vigor, as in vitality to grow and learn that monitors interactively changes in the environment, and determines, what is significant in order to highlight subject matter patterns, trending, social media, news, sport and entertainment events and financial exchanges data that could be probabilistically satisficing or of interest to the end user. Thus, the evolving system is with vim and vigor.

Rule 28: Variant the virtual maestro performs for each search pattern a hierarchical dataset after performing subject matter big data indexing of the improved environment to identify the natural variants to the search. Natural variants are forecasted or alternative queries offered to the end user that are considered Superset (I) subordinates of the Superset (U) improved environment given a search pattern after removing redundancy, spam, viral content and low quality sites that fail to pass the (Page*Site probability) Superset ($I_n$) threshold or top (n).

Rule 29: Variant the virtual maestro performs for each search pattern a hierarchical dataset after performing subject matter big data indexing of the improved environment to identify the probable branching to each natural variant to the search. Probable branching natural variants are forecasts or alternative queries offered to the end user and are considered Set ($I_n$, $J_o$) subordinates of the Superset (U) improved environment given a search pattern removing results that fail the (Page*Site probability) Set ($I_n$, $J_o$) threshold.

Rule 30: Variant the virtual maestro performs for each search pattern a hierarchical dataset after performing subject matter big data indexing of the improved environment to identify the plausible branching to each natural variant to the search. Plausible branching natural variants are forecasts or alternative queries offered to the end user and are considered Subset ($I_n$, $J_o$, $K_p$) subordinates of the Superset (U) improved environment given a search pattern removing results that fail to pass the (Page*Site probability) Subset ($I_n$, $J_o$, $K_p$) threshold.

Rule 31: Multivariant hierarchical datasets, where the big data indexing stores as the Superset ($I_n$) threshold the $1^{st}$ sample or sqrt of the searchable environment, and Set ($I_n$, $J_o$) is threshold the $2^{nd}$ sample or $2^{nd}$ sqrt of the searchable environment, and Subset ($I_n$, $J_o$, $K_p$) threshold the $3^{rd}$ sample or $3^{rd}$ sqrt of the searchable environment or optimal responses given the search.

Rule 32: Figures out a dialogue: the system analyzes the multivariant hierarchical datasets and upon identifying a significant difference change in the environment, triggers a communication or dialogue event. The software determines if and how the information should be transmitted to the end user based on personal, craving needs values, and humanlike vim and vigor script guidelines. Avoiding trivial data and sending optimal satisficing data.

Rule 33: Pattern matching thresholds: the virtual maestro 700 interface communicates using interactive input exact pattern matching threshold to respond to valid request. The natural variant communication threshold is 80% to respond given an exact pattern matching after searching thousands of combinations. The scripted reactive probable branching natural variant communications 90% likely threshold after searching millions of combinations. The scripted proactive dialogue 95% likely threshold after searching billions of combinations.

Rule 34: Command and control computers: comprising virtual da Vinci 900 analyzes trillions of pertinent and relevant combination in real time to the end user's personal, social group, and/or demographic satisficing and interest big data indexing historical profile level values applying significant difference $1^{st}$, $2^{nd}$ and $3^{rd}$ samples variances. 1st: when applying a demographic dimension uses $1^{st}$ sample variances. $2^{nd}$ when also including end user social media friends use $2^{nd}$ sample variances. $3^{rd}$: when including the 'vueno, vonito and varato' algorithm using demographic, social group, news events, trending data and the user personal historical tracking of craving needs, satisficing and interest values uses $3^{rd}$ sample variances.

Rule 35: Financial News Events: Upon determining from financial exchange or news sources that a stock has a significant news in view of its market cap value and demographic and social group, the system can notify the information as a natural variant given a personal historical tracking of craving needs, satisficing and interest values hierarchical set.

Rule 36: Automatic notification: the system can notify the information as a probable branching natural variant given a personal historical tracking of craving needs, satisficing and interest values hierarchical set. For example: notify the end user upon determining a craving need, in this case, the Miami Dolphins won their first game of their lackluster 2019 season.

Rule 37: Automatic responses: the system using the 'Vueno, Vonito y Varato' personalized mantra can notify the information as a plausible branching natural variant given a personal historical tracking of craving needs, satisficing and interest values hierarchical set. For example: notifying the user upon determining that Cristiano Ronaldo (craving need) scored a goal.

Rule 38: Artificial Intelligence: Virtual Da Vinci, 900 upon sending a response to the virtual maestro to communicate with the end user, this action triggers an update of the virtual maestro and end user's profile, and the reverse engineering of the combination of vector component belonging to the search pattern to match the corresponding big data indexing Codex Page.

Third Preferred Embodiment: Virtual Da Vinci Supercomputer Simplifications

Harmony, Balance and Proportion W_RANK Hierarchical Sets for Small Samples

Rule 39: Zero Clusters the following applies: the searchable environment is set to 210, the improved environment size=100, the optimal environment size=10 and the optimal element size=4. The Superset (I) size=16, Set (I, J) size=4, and the Subset (I, J, K) size=2.

Rule 40: Small sample calculations consider Site Quality Partitions 0 to 2 as irrelevant.

Rule 41: When the searchable environment ⇐1,000 the following applies: the improved environment size=100, the optimal environment size=10 and the optimal element size=4. The Superset (I) size=20, Set (I, J) size=6, and the Subset (I, J, K) size=3.

Rule 42: When the searchable environment ⇐10,000 the following applies: the improved environment size=100, the optimal environment size=10 and the optimal element size=4. The Superset (I) size=32, Set (I, J) size=8, and the Subset (I, J, K) size=4.

Rule 43: When the searchable environment ⇐100,000 the following applies: the improved environment size=128, the optimal environment size=16 and the optimal element size=5 The Superset (I) size=64, Set (I, J) size=10, and the Subset (I, J, K) size=5.

Rule 44: When the searchable environment ⇐1,000,000 the following applies: the improved environment size=256, the optimal environment size=32 and the optimal element size=6. The Superset (I) size=100, Set (I, J) size=16, and the Subset (I, J, K) size=6.

Harmony, Balance and Proportion W_RANK Hierarchical Sets for Medium Samples

Rule 45: Medium size calculations considering Site Quality Partitions <4 as irrelevant.

Rule 46: When the searchable environment ⇐10,000,000 the following applies: the improved environment size=316, the optimal environment size=40 and the optimal element size=10. The Superset (I) size=128, Set (I, J) size=20, and the Subset (I, J, K) size=8.

Rule 47: When the searchable environment ⇐100,000,000 the following applies: the improved environment size=512, the optimal environment size=64 and the optimal element size=12. The Superset (I) size=200, Set (I, J) size=32 and the Subset (I, J, K) size=10.

Rule 48: When the searchable environment ⇐1 Billion the following applies: the improved environment size=1024, the optimal environment size=128 and the optimal element size=16. The Superset (I) size=256, Set (I, J) size=40 and the Subset (I, J, K) size 14.

Harmony, Balance and Proportion W_RANK Hierarchical Sets for Large Samples

Rule 49: Large sample size consider Site Quality Partitions <5 as irrelevant

Rule 50: The searchable environment ⇐10 billion the following applies: the improved environment size 2048, the optimal environment size=256 and the optimal element size=32. The Superset (I) size=316, Set (I, J) size=50, and the Subset (I, J, K) size=18.

Rule 51: The searchable environment ⇐100 billion the following applies: the improved environment size 4,096, the optimal environment size=64 and the optimal element size=24. The Superset (I) size=512, Set (I, J) size=64, and the Subset (I, J, K) size=24.

Rule 52: The searchable environment ⇐1 trillion has the following applies: the improved environment size=10,000, the optimal environment size=1000 and the optimal element size=100. The Superset (I) size=1,024, Set (I, J) size=128, and the Subset (I, J, K) size 32.

Rule 53: Huge sample size consider Site Quality Partitions <6 as irrelevant

Rule 54: The searchable environment ⇐100 trillion the following applies: the improved environment size=100,000, the optimal environment size=10,000 and the optimal element size=1000. The Superset (I) size=2,048, Set (I, J) size=256, and the Subset (I, J, K) size 64.

Rule 55: Massive sample size consider Site Quality Partitions <7 as irrelevant.

Rule 56: The searchable environment ⇐10,000 trillion the following applies: the improved environment=1,000,000, the optimal environment=100,000 and the optimal element=10,000. The Superset (I) size=4,096, Set (I, J) size=512, and the Subset (I, J, K) size=128.

Big Data Indexing Reference Subject Matter Layers of Refinement

Rule 57: Big Data Indexing given the searchable environment performs subject layer of index refinement to remove irrelevancy and identify a Superset (U) given the search pattern.

Rule 58: Big Data Indexing given the searchable environment performs the first subject layer of index refinement to identify a plurality of Natural Variants Superset ($I_n$).

Rule 59: Big Data Indexing given the optimal environment performs the second subject layer of index refinement to identify a plurality of probable branching Set ($I_n$, $J_o$).

Rule 60: Big Data Indexing given the optimal element performing the third subject layer of index refinement to identify a plurality of plausible branching Subset ($I_n$, $J_o$, $K_p$).

Minimum Super Site Quality Partition Given the Market Value in USD (2020)

Rule 61: Super Site with a market value >1 trillion USD are 10.

Rule 62: Super Site with a market value >500 billion USD are 9++.

Rule 63: Super Site with a market value >200 billion USD are 9+.

Rule 64: Super Site with a market value >100 billion USD are 9.

Rule 65: Super Site with a market value >10 billion USD are 8.

Rule 66: Super Site with a market value >1 billion USD are 7+.

Rule 67: Super Site with a market value >500 million USD are 7.

Rule 68: Super Site with a market value >200 million USD are 6+.

Rule 69: Super Site with a market value >100 million USD are 6.

Rule 70: Big Data Indexing given the Super Site 6+ or better are never automatically removed from calculation as irrelevancy.

Rule 71: Big Data Indexing given a searchable environment ⇐1000 remove from calculation Site Quality <3.

Rule 72: Big Data Indexing given a searchable environment ⇐1 million remove from calculation Site Quality <4.

Rule 73: Big Data Indexing given a searchable environment ⇐1 billion remove from calculation Site Quality <5.

Rule 74: Big Data Indexing given a searchable environment ⇐1 trillion remove from calculation Site Quality <6.

Rule 75: Big Data Indexing given a searchable environment >=10 trillion remove from calculation Site Quality <7. In otherwise, only calculate using high quality Super Sites.

Rule 76: Big Data Indexing given a searchable environment from a valid search pattern and the corresponding mapping of subject matter hierarchical set uses Site and Super Site quality partition values to create the chain of command of entity knowledge objects.

Virtual Da Vinci Valorization of the Hierarchical Set of Entity Knowledge Objects Rule 77: Superset (U) count distinct Super Site with value >6 from the searchable environment given a search pattern to select the best fit Codex Page when more than 1.

Rule 78: Superset ($I_n$) count distinct Super Site with value >6 from the improved environment given a search pattern to select the best fit Natural Variants.

Rule 79: Set ($I_n$, $J_o$) count distinct Super Site with value >6 from the optimal environment given a search pattern to select the best fit probable branching Natural Variants.

Rule 80: Subset ($I_n$, $J_o$, $K_p$) count distinct Super Site with value >6 from the optimal environment given a search pattern to select the best fit probable branching Natural Variants.

Rule 81: Search pattern environments with a count=0 are deemed irrelevant.

Rule 82: Search pattern environments with a count=1 with a Super Site=10 are always deemed satisfying. To those in the art best fit describes the high probable alternative.

Rule 83: W_RANK for search pattern environments such as Superset (U), Superset (I), Set (I, J) and Subject (I, J, K) objects is the total (Super Site Value) for the respective optimal element size. The highest valued W_RANK object is deemed of greater interest or satisfaction.

Rule 84: W_CHANGE for search pattern environments such as Superset (U), Superset (I), Set (I, J) and Subject (I, J, K) objects at predefined time interval measures total difference (count of unique request to a Super Site webpage response value) for the respective optimal element size. The highest W_CHANGE object is deemed of the greatest usage and trend value.

Rule 85: W_CHANGE=10, when it deemed of significant difference and great importance given the quality of Super Sites and unique end user.

Rule 86: W_CHANGE <5 when the object is probabilistically deemed COLD given the end user's historical profile is considered irrelevant and skipped from further calculation.

Rule 87: W_CHANGE >5 when the object is probabilistically deemed HOT given the end user's historical profile is consider relevant and skipped from further calculation. If W_CHANGE is 9+, 9++, and or 10, the virtual Maestro knows a la crème de la crème quality forecasted, or alternative query recommendation or direct communication was found.

Example 19: Virtual Da Vinci detecting Breaking News: The Codex 160 using 900 Virtual da Vinci that searches link database 800 at predefined time intervals detects a new Master Index. Immediately, determines which Superset (U), Superset (I), Set (I, J) and Subject (I, J, K) objects have W_CHANGE value. The highest values are deemed Breaking News, and the frequency of change is deemed a 10 (from 0 to 10 basis) given the time interval. During the next World Cup 2022, lets assumer the final goes to a penalty kick shootout, Virtual Da Vinci, will immediately detect when the winner is determined. The result is followed by millions of people, and upon occurring will be updated to the end user's that have a craving need for this information.

Example 20 Super Site News events triggers automatic response to the end user: When the W_CHANGE value=10, the virtual Maestro searches the end user's profile and upon pattern matching a tracking object will automatically respond to the end user. Otherwise, probabilistically, will start a script given the set of the W_CHANGE value objects and determine, if the end user want to receive the real time updates via text or audio and video if available. The W_CHANGE value can also be modified by the usage pattern of behavior of the end user profile, and the advertisement monies given the end user versus the advertiser promotional value. The same condition applies for non-trending responses using W_RANK value of the objects.

Why is the Supersite probability value required? The Supersite is required when Corporate identification comprising a plurality of website, in order to replace the count of unique hyperlinks to a website and unique search clicks to resources to the website, with the count of distinct hyperlink to a supersite and distinct search clicks to resources to the website. Thus, when a supersite comprising a spam site over inflates the lion share of as duplicate and dependent hyperlinks to resources to supersite but not to each unique site when analyzed as a resultant vector given the same Corporate identification. The evolving system main objective is to remove redundancy when web master intent is hype the unique count of hyperlinks to a resource.

LIST OF ELEMENTS

100 Search Engine System
105 Computer Terminal, Subscriber Device or Smart Input Device
110 End User or Subscriber
115 Interactive Input
119 Request
120 Browser
130 Optimizer
135 Personal input
140 Internet
150 The Hive
155 HIVE SMP (Symmetric Multi-Processing) Artificial Intelligence Software
160 Codex Inventory Control System
165 Rules of Semantics
167 Pattern Matching
169 Codex Page
170 Human Knowledge Encyclopedia
175 Entity Object
177 Natural Variants
180 Optimal Environment
185 Inventory Control Content
189 Optimal Dataset
199 Personalized Dataset
200 Web Crawler Sub System
205 Web Crawler
207 Web Crawler navigating every Site
209 Reading each URL of a webpage
210 New Document
215 Raw Data
219 Primed Data (for human monitoring and evaluation)
220 Parse Data (using rules of grammar and semantics)
230 Determining if each webpage and associated 'related objects' are navigational
240 Counting unique hyperlinks to 'related objects' in the webpage.
242 Change in the count of distinct hyperlinks to 'related objects' in the webpage

245 Counting search clicks to 'related objects' in the web page
247 Counting the frequency of search clicks to 'related objects' in the web page
249 Identifying end users searching each resource, webpage, website and super site.
250 Determining for each resource a 'related object' type
260 Ranking each webpage
265 Trend Data (measures pattern of behavior)
266 Protected Trend Data (measures pattern of behavior)
269 Derive Significant Portions of Information
270 Identifying end user search patterns and relevant natural variants.
275 Map Entity Object
276 Protected Entity Object
277 Map Natural Variant
278 Protected Natural Variant
280 Mapping valid search pattern combinations given the 'related object' type
285 Update Super Glyph (Mathematical) Equation
630 Scripted Algorithm and Database
700 Virtual Maestro (artificial intelligence computer program product)
701 Input Probabilistic Spatial Environment
702 Output Probabilistic Spatial Environment
710 Weighted Output Natural Variants (feature attributes, or alternatives)
720 Pick Best Natural Variant
730 Best Response Probable Branching
740 Pick Best Probable Branching Response
785 Weighted Plausible Responses
790 Pick Best Plausible Response
799 Dialogue Best Plausible Responses with the End User
800 Link Database
810 End User Historical Profile given a valid Search Pattern
820 Virtual Maestro Profile given a valid Search Pattern
830 Determining the unique count of incoming hyperlinks to a web page
831 Determining the unique count of search clicks to a web page
832 Determining a probabilistic ranking value for every web page
833 Assign a quality partition from 0 to 10 given the web page ranking value
840 Determining the unique count of incoming hyperlinks to a website
841 Determining the unique count of search clicks to a website
842 Determining a probabilistic ranking value for every website
843 Assign a quality partition from 0 to 10 given the website ranking value
900 Virtual Da Vinci supercomputer artificial intelligence program device
910 Simulating for each codex page the optimal environment
911 Updating each codex page upon identifying a higher value webpage
912 Associate the new web page to the codex page storing and updating changes
913 Continuously updating at least one collection of top (n) web pages, and the top (n) sites geospatial information
914 continuously update relative master index belonging to each codex page
915 determining at predefined time intervals the total number of web pages in the codex and for each codex page in its chain of command
916 determining at predefined time intervals the total number of significant difference changes in the Internet and then revaluing each site that updated its top ranked (n) web pages
917 cleansing, mapping and plotting the old master index into the new master index using the content value of the relative master index of the highest vector valued codex page
918 continuously synchronize in real time the new master index that reflect the latest condition of the environment
919 cleansing, mapping and plotting the new master index and the Codex and the entire chain of command of codex pages
930 Determining the unique count of incoming hyperlinks to a Super site
931 Determining the unique count of search clicks to a Super site
932 Determining a probabilistic ranking value for every Super site
933 Assign a quality partition from 0 to 10 given the ranking value

I claim:

1. An evolving system, comprising supercomputer clusters having supercomputer cluster subject layer searching capabilities, that continuously scans and gathers information from, understands, and interacts with the Internet environment, each cluster comprising one or more computers and one or more data warehouses executing a Codex comprising a set of informatics instructions to perform operations forming a distributed massive scale subject layer neural network knowledge database, storing each recognized English language search pattern, and each recognized geospatial search pattern used to parse and filter the Internet, the system comprising:

a plurality of web crawler per supercomputer cluster converting in real time the raw data of each Page into primed data for monitoring and evaluation;

a search engine;

at least one Link Database assigning a unique content and ranking probability value to each nonduplicative website, and page on the Internet;

at least one historical profile for each end user;

a Codex comprising an instruction set adapted to be executed by the evolving system, wherein the Codex instructs the evolving system to automatically perform operations coordinating a plurality of non-transitory end user computing devices storage media encoded with an artificial intelligence Search Engine Optimizer (SEO), comprising the steps of:

interactively interpreting and transforming numerical and text data and recognized human based decisions into a search pattern, by the SEO;

determining, an optimal search pattern, by searching said Codex is:

(i) assisted input: comprising the first subject layer of index refinement by searching the link database and automatically removing from the calculation web pages not belonging to one of reference source and statistically significant quality sites;

(ii) smart input: comprising the second subject layer of index refinement by performing a set of instructions, by the SEO based on the computing device latitude and longitude that determines geospatial data in a hierarchical format that cause the evolving system, to remove from the calculation web pages based on actual distance and adjusting webpages Site rank based actual distance; and (iii) personal input: comprising the Nth subject layer of index refinement: performing a set of instructions, by the evolving system, adjusting webpages Site probability based on the content matching usage pattern of behavior of the end user's historical profile;

determining, by the search engine given the optimal search pattern, an output comprising the highest value webpages, and sites, in an order from highest to lowest to the end user and the SEO interactively providing in response to the search pattern including:

performing a set of instructions, by the SEO, that cause the SEO to generate search interface resource that includes a search pattern input field; and determining, by the evolving system, search pattern suggestions, by searching said Codex given the optimal search pattern, wherein each suggestion, upon user selection from the search interface resource, is processed by the Evolving System as an end user one of communication, dialogue and usage pattern of behavior, and wherein the search pattern suggestions are provided to the client device with the search interface resource without a request for the search patterns suggestions from the computing device SEO client program.

2. The system of claim 1, wherein the set of computers further performs the steps of:

determining an optimal search pattern, interactively interpreting and transforming the input by the computing device SEO, to one of autocomplete, inserting missing gaps of information, and correcting the search pattern by searching the computing device SEQ local database; and upon a positive determination, generating a search interface resource that includes the optimal search pattern input field.

3. The system of claim 2, wherein further performing the steps of:

determining, an optimal search pattern, interactively interpreting and transforming the input by the computing device SEO to a personal input, by searching the end user profile; and upon a positive determination, generating a search interface resource that includes an optimal search pattern input field.

4. The system of claim 1, wherein further performing the steps of:

determining an optimal search pattern, interactively interpreting and transforming the input, by the evolving system, to one of autocomplete, insert missing gaps of information, and correcting the search pattern by searching said Codex;

and upon a positive determination, generating a search interface resource that includes one of autocomplete, inserting missing gaps of information, and correcting the optimal search pattern input field.

5. The system of claim 1, wherein further performing the steps of:

analyzing the output, by the evolving system given the optimal search pattern first subject layer of index refinement, from the highest value webpages, and sites:

determining from the output valid categories by searching said knowledge database;

interpreting and transforming, the optimal search pattern using set theory interpretations based on categories to identify statistically significant search pattern natural variants suggestions; and providing statistically significant search pattern natural variants suggestions to the client device with the search interface resource without a request for the search pattern natural variants suggestions from the computing device SEO.

6. The system of claim 1, wherein comprising further performing the steps of:

analyzing the output, by the evolving system given the optimal search pattern second subject layer of index refinement, from the highest value webpages, and sites:

setting end user's computing device GPS coordinates as the center point to render and display direction map objects;

interpreting and transforming using set theory and distance, the optimal search pattern to map objects using location specific GPS coordinates and identifying statistically significant optimal search pattern natural variant suggestions; and providing the optimal search pattern natural variants suggestions to the client device with the search interface resource without a request for the optimal search pattern natural variants suggestions from the end user's computing device.

7. The system of claim 6, wherein further performing the steps of:

analyzing the output, by the evolving system given the optimal search pattern third subject layer of index refinement, from the highest value webpages, and sites:

setting end user's computing device GPS coordinates as the center point to render and display direction map objects using one of transportation means and shopping cart time sensitive conditions;

providing optimal search pattern natural variant suggestions to the client device with the search interface resource without a request for one of the search pattern and natural variants suggestions from the end user's computing device.

8. A method of simulating an evolving system, comprising:

supercomputer clusters having supercomputer cluster subject layer searching capabilities, that continuously scans and gathers information from, understands, and interacts with the Internet environment, each cluster comprising one or more computers and one or more data warehouses executing a Codex comprising a set of informatics instructions to perform operations forming a distributed massive scale subject layer neural network knowledge database—storing each recognized English language search pattern, and each recognized geospatial search pattern used to parse and filter the Internet, the system comprising:

a plurality of web crawler per supercomputer cluster converting in real time the raw data of each Page into primed data for monitoring and evaluation;

a search engine;

at least one Link Database and assigning a unique content and ranking to each nonduplicative website, and page on the Internet;

at least one historical profile for each end user;

Codex comprising an instruction set adapted to be executed by the evolving system, wherein the Codex instructs the evolving system to automatically perform operations coordinating a plurality of non-transitory end user computing devices storage media encoded with an artificial intelligence Search Engine Optimizer, (SEO), comprising the steps of:

interactively interpreting and transforming numerical and text data and recognized human based decisions into a search pattern, by the SEO;

determining; an optimal search pattern, by searching said Codex is:

(i) one of assisted input and first subject layer of index refinement;

(ii) one of smart input and second subject layer of index refinement; and (iii) one of personal input and Nth subject layer of index refinement;

determining and furnishing, by the search engine given one of the optimal search pattern and natural variants, an output comprising the highest value webpages, and sites, in an order from highest to lowest to the end user and the SEO interactively providing-in response one of the search pattern and natural variants including:

performing a set of instructions, by the SEO, that cause the SEO—to generate search interface resource that includes a one of the search pattern input field; and determining, by the evolving system, one of the search pattern and natural variants suggestions, by searching said Codex, wherein each one of the search pattern and natural variants suggestion, upon user selection from the search interface resource, is processed by the evolving system as an end user one of communication, dialogue and usage pattern of behavior, and wherein the one of the search pattern and natural variants suggestions are provided to the client device with the search interface resource without a request for the one of the search pattern and natural variants suggestions from the computing device SEO.

9. The method of claim 8, wherein further performing the steps of:

determining, an optimal search pattern, interactively interpreting and transforming the input by the computing device SEO, to one of autocomplete, inserting missing gaps of information, and correcting the search pattern by searching the computing device SEO local database; and upon a positive determination, generating a search interface resource that includes a the optimal search pattern input field.

10. The method of claim 8 wherein further performing the steps of:

determining an optimal search pattern, interactively interpreting and transforming the input by the evolving system to one of autocomplete, insert missing gaps of information, and correcting the search pattern by searching said Codex; and upon a positive determination, generating a search interface resource that includes the optimal search pattern input field.

11. The method of claim 10, wherein further performing the steps of:

determining, by the evolving system, a natural variant given the search pattern by searching said Codex is one of:

(i) one of assisted input and first subject layer of index refinement: by automatically removing from the calculation web pages not belonging to reference sources;

(ii) one of smart input and second subject layer of index refinement: inserting the real time GPS coordinates, that cause the evolving system, removing from the calculation web pages based on actual distance and adjusting webpages Site rank probability based one of actual distance and significant time sensitive conditions; and (iii) one of personal input and Nth subject layer of index refinement: adjusting webpages Site rank probability based on the content matching usage pattern of behavior of the end user's historical profile.

12. The method of claim 11, wherein further performing the steps of:

determining from the output valid categories—by searching said Codex;

interpreting and transforming, the assisted input using set theory interpretations based on categories to identify statistically significant search pattern suggestions; and providing search pattern suggestions to the client device with the search interface resource without a request for the search patterns suggestions from the computing device SEO.

13. The method of claim 11, wherein further performing the steps of:

setting end user's computing device GPS coordinates as the center point to render and display direction map objects;

interpreting and transforming using set theory and distance, the search pattern to map objects using location specific GPS coordinates and identifying statistically significant one of the search pattern and natural variants suggestions; and providing the one of search pattern and natural variants suggestions to the client device with the search resource without a request for the search patterns suggestions from the end user's computing device.

14. The method of claim 13, wherein further performing the steps of:

setting end user's computing device GPS coordinates as the center point to render and display direction map objects;

assigning map objects using one of transportation means and shopping cart time sensitive conditions; and providing one of the search pattern and natural variants suggestions to the client device with the search resource without a request for one of the search pattern and natural variants suggestions from the end user's computing device.

15. An evolving system, comprising supercomputer clusters having supercomputer cluster subject layer searching capabilities, that continuously scans and gathers information from, understands, and interacts with the Internet environment, each cluster comprising one or more computers and one or more data warehouses executing a Codex comprising a set of informatics instructions to perform operations forming a distributed massive scale subject layer neural network knowledge database, storing each recognized English language search pattern, and each recognized geospatial search pattern used to parse and filter the Internet, the system comprising:

a plurality of web crawler per supercomputer cluster converting in real time the raw data of each Page into primed data for monitoring and evaluation;

a search engine;

at least one Link Database and assigning, a unique content and ranking to each nonduplicative supersite, website, and page on the Internet;

at least one historical profile for each end user;

Codex comprising an instruction set adapted to be executed by the evolving system, wherein the Codex instructs the evolving system to automatically perform operations coordinating a plurality of non-transitory end user computing devices storage media encoded with an artificial intelligence Search Engine Optimizer, (SEO), comprising the steps of:

interactively interpreting and transforming numerical and text data and recognized human based decisions into one of a search pattern and corresponding natural variants;

determining and furnishing, by the search engine given one of the search pattern and natural variants, an output comprising the highest value webpages, and sites, in an order from highest to lowest to the end user and the evolving system interactively providing to the SEO in response one of the search pattern and natural variants including:

performing a set of instructions, by the computing device SEO, that cause the computing device SEO, to generate search interface resource that includes a one of the search pattern and natural variants input field;

performing by the evolving system using topological semantics, given a search pattern, searching said Codex and performing the steps of:

(i) assigning at least one relevant category;

(ii) mapping statistically significant topological semantic constructs using rules of likelihood from the First Variance sample analysis of the top (n) results to identify search pattern suggestions;

(iii) mapping statistically significant topological semantic constructs using rules of associative analysis to identify keyword associations;

(iv) from the Second Variance sample analysis of the top (n) results that become natural variants of the search;

(v) mapping statistically significant topological semantic constructs using rules of transitivity that gain factor the value of the content based on the Third Variance sample analysis that become natural variants;

determining, by the evolving system, one of the search pattern and natural variants suggestions, by searching said Codex, wherein each one of the search pattern and natural variants suggestion, upon user selection from the search interface resource, is processed by the evolving system as an end user one of communication, dialogue and usage pattern of behavior, and wherein the one of the search pattern and natural variants suggestions are provided to the client device with the search resource without a request for the one of the search pattern and natural variants suggestions from the computing device SEO.

16. The system of claim 15, wherein further performing the steps of:

identifying an assisted input search pattern;

setting webpages that are located in statistically significant site quality partitions as relevancy and removing all webpages from calculation that are irrelevancy; and determining, by the search engine given the search pattern, an output comprising the highest adjusted webpage value, and sites, in an order from highest to lowest to the end user.

17. The system of claim 15, wherein further performing the steps of:

identifying a smart input search pattern and setting the end user's computing device GPS coordinates as the center point to render and display direction map objects;

setting webpages that are located beyond X miles of the user's computing device GPS (X, Y, Z) coordinates as one of non-statistically significant and irrelevancy;

determining the adjusted webpage value that are located within X miles of the user's computing device GPS (X, Y, Z) coordinates given a search pattern performing the steps of:

(i) scaling a site rank probability based on map objects proximity;

(ii) scaling a site rank probability based on map objects content value probability;

(iii) scaling a site rank probability based on map objects trending value probability; and determining and furnishing, by the search engine given the search pattern, an output comprising the highest adjusted value webpages, and sites, in an order from highest to lowest to the end user.

18. The system of claim 15, wherein further performing the steps of:

identifying a personal input search pattern;

setting webpages that are located in statistically significant site quality partitions as relevancy and removing all webpages from calculation that are irrelevancy;

performing a set of instructions, by the evolving system, adjusted webpage value based on the content matching usage pattern of behavior of the end user's historical profile; and determining, by the search engine given the search pattern, an output comprising the highest adjusted value webpages, and sites, in an order from highest to lowest to the end user.

19. The system of claim 15, wherein further performing the steps of:

determining, by the search engine, the First Variance sample analysis of the top (n) results given a search pattern an output comprising the highest adjusted webpage value, and sites, in an order from highest to lowest to the end user performing by the evolving system using topological semantics, given a search pattern, searching said knowledge database and performing the steps of:

(i) assigning at least one relevant category;

(ii) mapping statistically significant topological semantic constructs using rules of likelihood from the First Variance sample analysis of the top (n) results using likelihood analysis to identify search pattern suggestions; and processing, by the evolving system, upon user selection from the search interface resource, is as an end user one of communication, dialogue and usage pattern of behavior, and wherein the search pattern suggestions are provided to the client device with the search resource without a request for the search pattern suggestions from the computing device client program.

20. The system of claim 19, wherein further performing the steps of:

performing by the evolving system using topological semantics, given a search pattern, searching said knowledge database and performing the steps of:

(iii) mapping statistically significant topological semantic constructs—from the Second Variance sample analysis of the top (n) results given a search pattern that become natural variants of the search;

(iv) mapping statistically significant semantic constructs—from the Third Variance sample analysis given a search pattern become natural variants;

processing, by the evolving system, upon user selection from the search interface resource, is as an end user one of communication, dialogue and usage pattern of behavior and wherein the one of the search pattern and natural variants suggestions are provided to the client device with the search resource without a request for the one of the search pattern and natural variants suggestions from the computing device SEO.

* * * * *